US007327683B2

(12) United States Patent
Ogier et al.

(10) Patent No.: US 7,327,683 B2
(45) Date of Patent: Feb. 5, 2008

(54) METHOD AND APPARATUS FOR DISSEMINATING TOPOLOGY INFORMATION AND FOR DISCOVERING NEW NEIGHBORING NODES

(75) Inventors: Richard G. Ogier, Half Moon Bay, CA (US); Fred L. Templin, Portola Valley, CA (US); Mark G. Lewis, Emerald Hills, CA (US)

(73) Assignee: SRI International, Menlo Park, CA (US)

( * ) Notice: Subject to any disclaimer, the term of this patent is extended or adjusted under 35 U.S.C. 154(b) by 1077 days.

(21) Appl. No.: 10/307,267

(22) Filed: Nov. 29, 2002

(65) Prior Publication Data

US 2003/0179742 A1    Sep. 25, 2003

Related U.S. Application Data

(63) Continuation-in-part of application No. 09/728,211, filed on Dec. 1, 2000, now Pat. No. 6,845,091.

(60) Provisional application No. 60/334,141, filed on Nov. 28, 2001, provisional application No. 60/190,358, filed on Mar. 16, 2000, provisional application No. 60/232,046, filed on Sep. 12, 2000, provisional application No. 60/232,047, filed on Sep. 12, 2000, provisional application No. 60/248,455, filed on Nov. 14, 2000.

(51) Int. Cl.
*H04L 12/28* (2006.01)
*H04Q 7/24* (2006.01)

(52) U.S. Cl. .................. 370/236; 370/238; 370/338

(58) Field of Classification Search ............... None
See application file for complete search history.

(56) References Cited

U.S. PATENT DOCUMENTS 5,574,860 A  11/1996 Perlman et al. ........ 395/200.06

(Continued)

FOREIGN PATENT DOCUMENTS

EP     0 913 965     5/1999

(Continued)

OTHER PUBLICATIONS

Bellur, et al., "A Reliable, Efficient Topology Broadcast Protocol for Dynamic Networks," appeared in IEEE INFOCOM '99 Proceedings.

(Continued)

*Primary Examiner*—Andrew C. Lee
(74) *Attorney, Agent, or Firm*—Kin-Wah Tong, Esq.; Patterson & Sheridan, LLP

(57) ABSTRACT

A proactive link-state routing protocol designed for mobile ad-hoc networks is disclosed, which provides hop-by-hop routing along shortest paths to each destination. Each node running the present protocol will compute a source tree (providing paths to all reachable nodes) based on partial topology information stored in its topology table. To minimize overhead, each node reports only "part" of its source tree to neighbors. The present invention employs a combination of periodic and differential updates to keep all neighbors informed of the reportable part of its source tree. The present invention performs neighbor discovery using "differential" HELLO messages that report only "changes" in the status of neighbors. This results in HELLO messages that are much smaller than those of other link-state routing protocols.

47 Claims, 28 Drawing Sheets

U.S. PATENT DOCUMENTS

| | | | | |
|---|---|---|---|---|
| 5,732,086 | A | | 3/1998 | Liang et al. ............... 370/410 |
| 5,740,366 | A | * | 4/1998 | Mahany et al. ............ 709/227 |
| 5,912,921 | A | * | 6/1999 | Warren et al. ............. 375/220 |
| 6,023,461 | A | | 2/2000 | Raychaudhuri et al. ..... 370/331 |
| 6,028,857 | A | | 2/2000 | Poor ......................... 370/351 |
| 6,044,062 | A | | 3/2000 | Brownrigg et al. ......... 370/238 |
| 6,058,422 | A | | 5/2000 | Ayanoglu et al. .......... 709/226 |
| 6,088,730 | A | | 7/2000 | Kato et al. ................. 709/227 |
| 6,097,707 | A | | 8/2000 | Hodzic et al. ............. 370/321 |
| 6,104,712 | A | | 8/2000 | Robert et al. .............. 370/389 |
| 6,130,881 | A | * | 10/2000 | Stiller et al. ............... 370/238 |
| 6,456,599 | B1 | * | 9/2002 | Elliott ........................ 370/254 |
| 6,578,086 | B1 | * | 6/2003 | Regan et al. ............... 709/242 |
| 6,894,975 | B1 | * | 5/2005 | Partyka ...................... 370/235 |
| 6,983,324 | B1 | * | 1/2006 | Block et al. ................ 709/228 |

FOREIGN PATENT DOCUMENTS

| | | |
|---|---|---|
| EP | 0 944 210 | 9/1999 |
| WO | 01/69862 | 9/2001 |
| WO | 02/21770 | 3/2002 |

OTHER PUBLICATIONS

Calhoun, et al., "Mobile IP Network Access Identifier Extension for IPv4", http://www.ietf.org/rfc/rfc2794.txt, printed Oct. 4, 2000, 7 pages.

Chen, et al., "Global State Routing: A New Routing Scheme for Ad-hoc Wireless Networks," IEEE, Jun. 7, 1998, pp. 171-175.

Deering, et al., "Internet Protocol, Version 6 (Ipv6) Specification," Dec. 1998, http://www.ietf.org/rfc/rfc2460.txt?number=2460, printed Oct. 10, 2000, 28 pages.

Gilligan et al., "Transition Mechanisms for Ipv6 Hosts and Routers", Internet Draft Online!, printed on Jan. 14, 2002: URL:http://www.ietf.org/proceedings/99jul/I-D/draft-ietf-ngtrans-mech-o4/txt, pp. 1-24.

Gupta, et al., "An Adaptive Protocol for Reliable Multicast in Mobile Multi-hop Radio Networks," IEEE, Feb. 25, 1999, pp. 111-122.

Hinden et al., (Jul. 1998) "An Ipv6 Aggregatable Global Unicast Address Format", Internet Draft Online!, printed on Oct. 10, 2000: URL:http://www.ietf.org/rfcs/rfc2374.html, pp. 1-9.

Hinden, et al, "IP Version 6 Addressing Architecture," Jul. 1998, http://www.ietf.org/rfc/rfc2373.txt?number=2373, printed Oct. 17, 2000, 19 pages.

Lin, et al. "A Multicast Routing Protocol for Multihop Wireless Networks", Global Telecommunications Conference—Globecomm '99, pp. 235-239.

McCann, J. "Ipv6—the Next Generation Internet Protocol," Digital Equipment Corporation, May 13, 1998, http://www.bblisa.org/docs/May_98/Sld001.htm, printed Sep. 6, 2000, 45 pages.

Srisuresh, et al., "IP Network Address Translator (NAT) Terminology and Considerations," Aug. 1999, http://www.ietf.org/rfc/rfc2663.txt, printed Oct. 11, 2000, 26 pages.

Templin "An Ipv6-Ipv4 Compatibility Aggregatable Global Unicast Address Format", (Mar. 2000) Internet Draft Online!, printed on Jan. 15, 2002: URL:http://alternic.net/drafts-t-u/draft-templin-ngtrans-v6v4compat-00.txt, pp. 1-12.

Templin "An Ipv6-Ipv4 Compatibility Aggregatable Global Unicast Address Format for Incremental Depolyment of Ipv6 Nodes within Predominantly Ipv4-based Intranets," (Sep. 22, 2000) Internet draft Online!, printed on Jan. 11, 2002: URL:http://www.join.uni-muenster.de/drafts/draft-templin-ngtrans-v6v4compat-01.txt, pp. 1-14.

Tsirtsis et al (Feb. 2000) "Network Address Translation—Protocol Translation (NAT-PT)", Request for Comments; 2766, Campio Communications, 16 pgs.

"IP Mobility Support," C. Perkins, Editor, IBM, Oct. 1996, http://www.ietf.org/rfc/rfc2002.txt, Printed Oct. 4, 2000, 56 pages.

"Guidelines for 64-Bit Global Identifer (EUI-64) Registration Authority," http://standards.ieee.org/regauth/oui/tutorials/EUI64.html, printed Nov. 3, 2000, 2 pages.

* cited by examiner

TBRPF STEPS FOR LINK-STATE DISSEMINATION
(NOT INCLUDING NEIGHBOR DISCOVERY)

186
```
 0                   1                   2                   3
 0 1 2 3 4 5 6 7 8 9 0 1 2 3 4 5 6 7 8 9 0 1 2 3 4 5 6 7 8 9 0 1
```

| IDENTITY FOR SRC(1) | 188 |
|---|---|
| IDENTITY FOR SRC(2) | 188' |
| ... | |
| IDENTITY FOR SRC(M) | 188" |
| SEQUENCE NUMBER FOR SRC (1) | SEQUENCE NUMBER FOR SRC (2) |
| SEQUENCE NUMBER FOR SRC (3) | SEQUENCE NUMBER FOR SRC (4) |
| ... | |
| SEQUENCE NUMBER FOR SRC (M-1) | SEQUENCE NUMBER FOR SRC (M) |

NEW PARENT MESSAGE

| SEQUENCE NUMBER FOR SRC (M-2) | SEQUENCE NUMBER FOR SRC (M-1) |
|---|---|
| SEQUENCE NUMBER FOR SRC (M) | |

SHOWS AN ALTERNATIVE ENDING THE NEW PARENT MESSAGE

FIG. 8B

```
 0                   1                   2                   3       194
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|                    IDENTITY FOR SRC(1)                   196   |
+-+-+-+-+-+-+-+-+-+-+-+-+-+-+-+-+-+-+-+-+-+-+-+-+-+-+-+-+-+-+-+-+
|                    IDENTITY FOR SRC(2)                   196'  |
+-+-+-+-+-+-+-+-+-+-+-+-+-+-+-+-+-+-+-+-+-+-+-+-+-+-+-+-+-+-+-+-+
|                            ...                                 |
+-+-+-+-+-+-+-+-+-+-+-+-+-+-+-+-+-+-+-+-+-+-+-+-+-+-+-+-+-+-+-+-+
|                    IDENTITY FOR SRC(M)                   196"  |
+-+-+-+-+-+-+-+-+-+-+-+-+-+-+-+-+-+-+-+-+-+-+-+-+-+-+-+-+-+-+-+-+
```

CANCEL_PARENT MESSAGE

FIG. 9

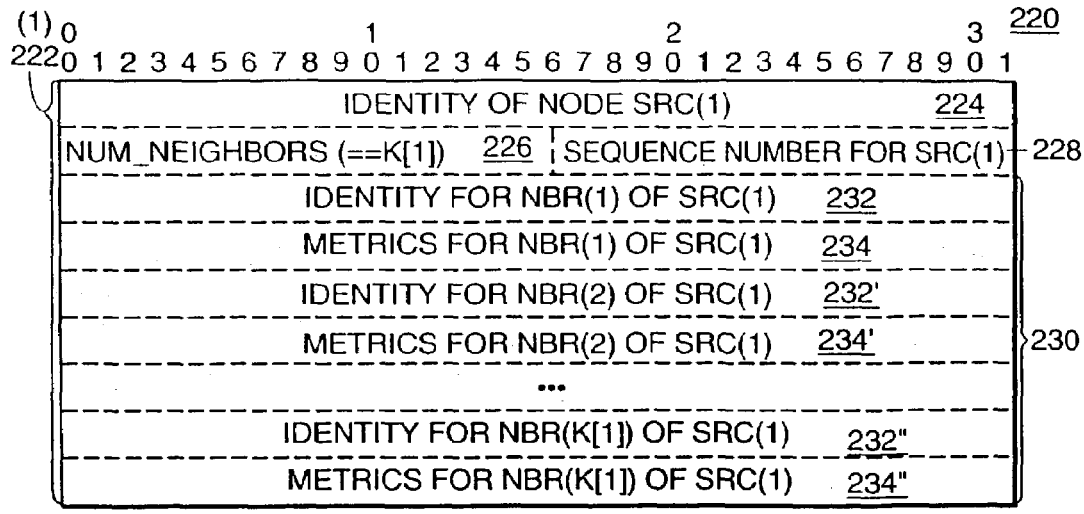
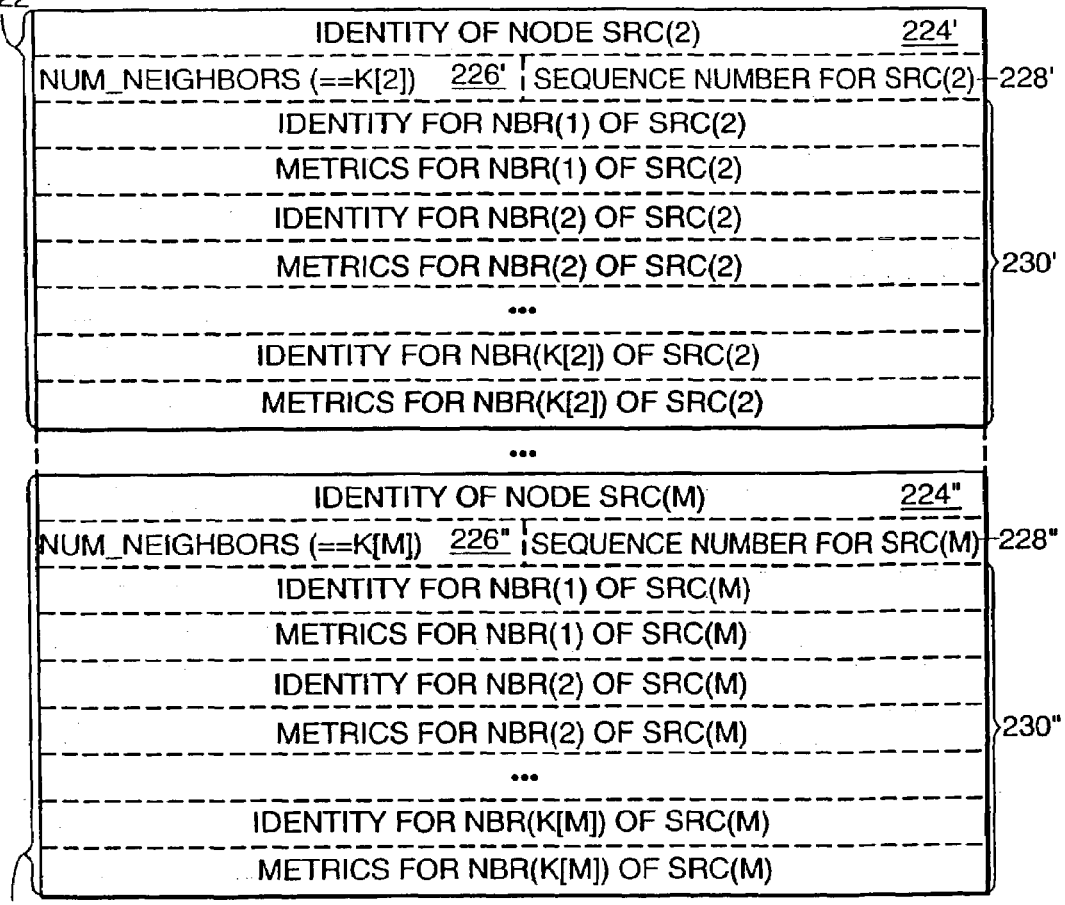
FIG. 10B

RETRANSMISSION_OF_BROADCAST MESSAGE

IPv6-IPv4 COMPATIBILITY ADDRESS FORMAT

INTERFACE IDENTIFIER FORMAT

INTERFACE IDENTIFIER FORMAT FOR IANA

IPv6-IPv4 COMPATIBILITY ADDRESS

```
 0 1 2 3 4 5 6 7
+-+-+-+-+-+-+-+-+
|E|Vers | BITS  |
+-+-+-+-+-+-+-+-+
```

FIG. 20

```
 0 1 2 3 4 5 6 7
+-+-+-+-+-+-+-+-+
|0|  3  | TYPE  |
+-+-+-+-+-+-+-+-+
```

FIG. 21

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+- - - - - - -+- - - - - - - - - - - - - - - -
|1|0|1|0|R|L|C|F| flag extension|     header extensions
+-+-+-+-+-+-+-+-+- - - - - - -+- - - - - - - - - - - - - - - -
```

FIG. 22

```
+-+-+-+-+-+-+-+-+- - - -
|OPTIONS| TYPE  | VALUE
+-+-+-+-+-+-+-+-+- - - -
```

```
PadN option (TYPE = 1)
+-+-+-+-+-+-+-+-+-+-+-+-+-+-+-+-+- - - - - - - - - -
|  0   |  1   |    LEN      | Zero-valued Octets
+-+-+-+-+-+-+-+-+-+-+-+-+-+-+-+-+- - - - - - - - - -
```

FIG. 25

```
+-+-+-+-+-+-+-+-+-+-+-+-+-+-+-+-+-+-+-+-+-+-+-+-+-+-+-+-+-+-+-+-+
|  0  | TYPE |       N        | PRI | Res |      HSEQ           |
+-+-+-+-+-+-+-+-+-+-+-+-+-+-+-+-+-+-+-+-+-+-+-+-+-+-+-+-+-+-+-+-+
|                       Neighbor RID(1)                          |
+-+-+-+-+-+-+-+-+-+-+-+-+-+-+-+-+-+-+-+-+-+-+-+-+-+-+-+-+-+-+-+-+
|                       Neighbor RID(2)                          |
+-+-+-+-+-+-+-+-+-+-+-+-+-+-+-+-+-+-+-+-+-+-+-+-+-+-+-+-+-+-+-+-+
~                           ...                                  ~
+-+-+-+-+-+-+-+-+-+-+-+-+-+-+-+-+-+-+-+-+-+-+-+-+-+-+-+-+-+-+-+-+
|                       Neighbor RID(N)                          |
+-+-+-+-+-+-+-+-+-+-+-+-+-+-+-+-+-+-+-+-+-+-+-+-+-+-+-+-+-+-+-+-+
```

FIG. 30

```
+-+-+-+-+-+-+-+-+-+-+-+-+-+-+-+-+-+-+-+-+-+-+-+-+-+-+-+-+-+-+-+-+
|M|D| 0 | TYPE |      n       |     NRL      |      NRNL        |
+-+-+-+-+-+-+-+-+-+-+-+-+-+-+-+-+-+-+-+-+-+-+-+-+-+-+-+-+-+-+-+-+
|                       Router ID of u                           |
+-+-+-+-+-+-+-+-+-+-+-+-+-+-+-+-+-+-+-+-+-+-+-+-+-+-+-+-+-+-+-+-+
|                       Router ID of v_1                         |
+-+-+-+-+-+-+-+-+-+-+-+-+-+-+-+-+-+-+-+-+-+-+-+-+-+-+-+-+-+-+-+-+
~                           ...                                  ~
+-+-+-+-+-+-+-+-+-+-+-+-+-+-+-+-+-+-+-+-+-+-+-+-+-+-+-+-+-+-+-+-+
|                       Router ID of v_n                         |
+-+-+-+-+-+-+-+-+-+-+-+-+-+-+-+-+-+-+-+-+-+-+-+-+-+-+-+-+-+-+-+-+
|    metric 1     |    metric 2    |        ...                  |
+-+-+-+-+-+-+-+-+-+-+-+-+-+-+-+-+-+-+-+-+-+-+-+-+-+-+-+-+-+-+-+-+
|                           ...                                  |
+-+-+-+-+-+-+-+-+-+-+-+-+-+-+-+-+-+-+-+-+-+-+-+-+-+-+-+-+-+-+-+-+
```

FIG. 31

```
+-+-+-+-+-+-+-+-+-+-+-+-+-+-+-+-+-+-+-+-+-+-+-+-+-+-+-+-+-+-+-+-+
|ST | 0 | TYPE |    Reserved    |              N                |
+-+-+-+-+-+-+-+-+-+-+-+-+-+-+-+-+-+-+-+-+-+-+-+-+-+-+-+-+-+-+-+-+
|                         Router ID                              |
+-+-+-+-+-+-+-+-+-+-+-+-+-+-+-+-+-+-+-+-+-+-+-+-+-+-+-+-+-+-+-+-+
|                         IP Address                             |
+-+-+-+-+-+-+-+-+-+-+-+-+-+-+-+-+-+-+-+-+-+-+-+-+-+-+-+-+-+-+-+-+
|                         IP Address                             |
+-+-+-+-+-+-+-+-+-+-+-+-+-+-+-+-+-+-+-+-+-+-+-+-+-+-+-+-+-+-+-+-+
|                            ...                                 |
+-+-+-+-+-+-+-+-+-+-+-+-+-+-+-+-+-+-+-+-+-+-+-+-+-+-+-+-+-+-+-+-+
```

FIG. 32

```
+-+-+-+-+-+-+-+-+-+-+-+-+-+-+-+-+-+-+-+-+-+-+-+-+-+-+-+-+-+-+-+-+
|ST | 0 | TYPE |    Reserved    |              N                |
+-+-+-+-+-+-+-+-+-+-+-+-+-+-+-+-+-+-+-+-+-+-+-+-+-+-+-+-+-+-+-+-+
|                         Router ID                              |
+-+-+-+-+-+-+-+-+-+-+-+-+-+-+-+-+-+-+-+-+-+-+-+-+-+-+-+-+-+-+-+-+
| PrefixLength | Prefix byte 1 | Prefix byte 2 |      ...        |
+-+-+-+-+-+-+-+-+-+-+-+-+-+-+-+-+-+-+-+-+-+-+-+-+-+-+-+-+-+-+-+-+
|     ...      | PrefixLength  | Prefix byte 1 | Prefix byte 2  |
+-+-+-+-+-+-+-+-+-+-+-+-+-+-+-+-+-+-+-+-+-+-+-+-+-+-+-+-+-+-+-+-+
|     ...                                                        |
+-+-+-+-+-+-+-+-+-+-+-+-+-+-+-+-+-+-+-+-+-+-+-+-+-+-+-+-+-+-+-+-+
```

FIG. 33

METHOD AND APPARATUS FOR DISSEMINATING TOPOLOGY INFORMATION AND FOR DISCOVERING NEW NEIGHBORING NODES

RELATED APPLICATIONS

This application claims the benefit of U.S. Provisional Application No. 60/334,141 filed on Nov. 28, 2001, which is herein incorporated by reference.

This application is a continuation-in-part of U.S. application Ser. No. 09/728,211, filed on Dec. 1, 2000, now U.S. Pat. No. 6,845,091 which claims the benefit of U.S. Provisional Applications, Ser. No. 60/190,358, filed Mar. 16, 2000, Ser. No. 60/232,047, filed Sep. 12, 2000, Ser. No. 60/232,046, filed Sep. 12, 2000, and Ser. No. 60/248,455, filed Nov. 14, 2000, the entirety of these applications are also incorporated by reference herein.

GOVERNMENT SUPPORT

This invention was funded with government support under Contract No. DAAB07-96-D-H002, awarded by the U.S. Army Communications and Electronics Command. The United States government has certain rights to this invention.

BACKGROUND

A network is a collection of communications entities (e.g., hosts, routers, and gateways) that are in communication with each other over communication links. Organizing communications entities into networks increases the capabilities of the communication entities beyond that which each communications entity alone is capable by enabling such entities to share resources. A network that interconnects communications entities within a common geographical area (for example, the personal computers in an office) is called a local area network (LAN). Some LANs employ one or more network servers that direct the flow of data within the network and control access to certain network functions such as storing data in a central file repository, printing, accessing other networks. In other LANs, computers communicate with each other without the use of servers.

A wide area network (WAN), of which the Internet is an example, is a collection of geographically distributed LANs joined by long-range communication links. The Internet is a publicly accessible, worldwide network of networks based upon a transmission protocol known as TCP/IP (Transmission Control Protocol/Internet Protocol). Communications on the Internet is packet-switched; that is, the information that is to pass from one communications entity to another is broken into packets that are individually passed from router to router until the packets arrive at their destination. The TCP divides the data into segments and provides reliable delivery of bytes in the segments to the destination, which reconstructs the data. The IP further subdivides the TCP segments into packets and routes the packets to their final destination. The route taken by packets may pass through one or more networks, depending upon the Internet Protocol (IP) address of the destination.

A rapidly growing part of the Internet is the World Wide Web ("Web"), which operates according to a client-server model. Client software, commonly referred to as a Web browser, runs on a computer system. After establishing an Internet connection, the client user launches the Web browser to communicate with a Web server on the Internet. Using TCP/IP, the Web browser sends HTTP (Hypertext Transport Protocol) requests to the Web server. The request traverses the Internet's TCP/IP infrastructure to Web host server as HTTP packets.

A private network based on Internet technology and consisting of a collection of LAN and WAN components is called an Intranet. Accordingly, communications entities that are part of an intranet can use a Web browser to access Web servers that are within the intranet or on the Internet.

Today, most of the communication links between the various communications entities in a networks are wire-line; that is, client systems are typically connected to a server and to other client systems by wires, such as twisted-pair wires, coaxial cables, fiber optic cables, and the like. Wireless communication links, such as microwave links, radio frequency (RF) links, infrared (IR) links, and satellite links, are becoming more prevalent in networks.

A characteristic of wireless networks is that the communication entities in the network are mobile. Such mobility creates frequent, dynamic changes to the network topology and state of the communication links between the communication entities. Mobility is less of a concern for those communication entities connected to the Internet by wire-line, however, the topology of the Internet is perpetually changing, with communication entities joining and leaving the Internet often. Also, the state of communication links between communication entities on the Internet may change for various reasons, such as increased packet traffic.

To effectively route messages through such dynamically changing networks, routers need to remain informed of topology and link-state changes. Existing methods based on flooding are inefficient and consume too much network bandwidth. The inefficiency of flooding is the result, in part, of the following redundancies: (1) link-state and topology updates are sent over multiple paths to each router; and (2) every router forwards every update to all neighboring routers, even if only a small subset of the neighboring routers need to receive it.

The routing of update information and of data packets is further complicated by the heterogeneous infrastructure of the Internet. Currently, most communications entities on the Internet exchange messages using the Internet Protocol Version 4 (or IPv4), but an increasing number of communications entities that communicate using the Internet Protocol Version 6 (or IPv6) are being deployed. IPv6 is a second generation Internet Protocol designed to supplant IPv4, but is expected to coexist with IPv4 until the transition to IPv6 is complete. In general, the IP versions are incompatible: IPv4 routers cannot route IPv6 messages, nor can IPv6 routers route IPv4 messages. Instead, special routers that implement both the IPv4 and IPv6 protocols in a "dual-stack" configuration are required to support the coexistence and transition phase.

Another difficulty presented by the mobility of the communications entities is that the movement of one communication entity can interrupt on-going communications with another entity. For example, a portable laptop computer with a wireless link by which it is communicating with a Web server on the Internet may be moved so that the link to network, and thus to the Web server, is broken. In general, the loss of the link irretrievably causes the loss of any information being transmitted to the computer, although the laptop computer may later regain the link or establish a new link to the network. After reconnecting to the network, the laptop computer must reestablish communications with the Web server. The on-going communications are lost.

Thus, there remains a need for a mobile wireless network that can perform reliably and efficiently despite the aforementioned difficulties associated with the mobility of the communication entities in the network.

SUMMARY OF THE INVENTION

In one embodiment of the present invention, a proactive link-state routing protocol designed for mobile ad-hoc networks is disclosed, which provides hop-by-hop routing along shortest paths to each destination. Each node running the present protocol will compute a source tree (providing paths to all reachable nodes) based on partial topology information stored in its topology table, using a modification of Dijkstra's algorithm. To minimize overhead, each node reports only "part" of its source tree to neighbors. This is in contrast to other protocols in which each node reports its "entire" source tree to neighbors. The present invention employs a combination of periodic and differential updates to keep all neighbors informed of the reportable part of its source tree. Each node also has the option to report additional topology information (up to the full topology), to provide improved robustness in highly mobile networks. The present invention performs neighbor discovery using "differential" HELLO messages that report only "changes" in the status of neighbors. This results in HELLO messages that are much smaller than those of other link-state routing protocols such as OSPF.

BRIEF DESCRIPTION OF THE DRAWINGS

The invention is pointed out with particularity in the appended claims. The objectives advantages of the invention described above, as well as further objectives and advantages of the invention, may be better understood by reference to the following description taken in conjunction with the accompanying drawings, in which:

FIGS. 8A and 8B are diagrams of embodiments of a format of a NEW PARENT protocol message;

FIG. 9 is a diagram of an embodiment of a format for a CANCEL PARENT message;

FIGS. 10A and 10B are diagrams of embodiments of exemplary formats for link-state update messages;

FIG. 20 illustrates a diagram of a packet header format of the present invention;

FIG. 21 illustrates a diagram of a format for simple-mode packet headers of the present invention;

FIG. 22 illustrates a diagram of a format for extended-mode packet headers of the present invention;

FIG. 23 illustrates a diagram of a format for packet body of the present invention;

FIG. 24 illustrates a diagram of a format for padding options within packet body of the present invention;

FIG. 25 illustrates a diagram of a second format for padding options within packet body of the present invention;

FIG. 30 illustrates a diagram of a format for a HELLO subtype of a message of the present invention;

FIG. 31 illustrates a diagram of a Topology Update Message format of the present invention;

FIG. 32 illustrates a diagram of an Association Message format of the present invention; and FIG. 33 illustrates a diagram of a second Association Message format of the present invention.

DESCRIPTION OF THE INVENTION

Figure 1:
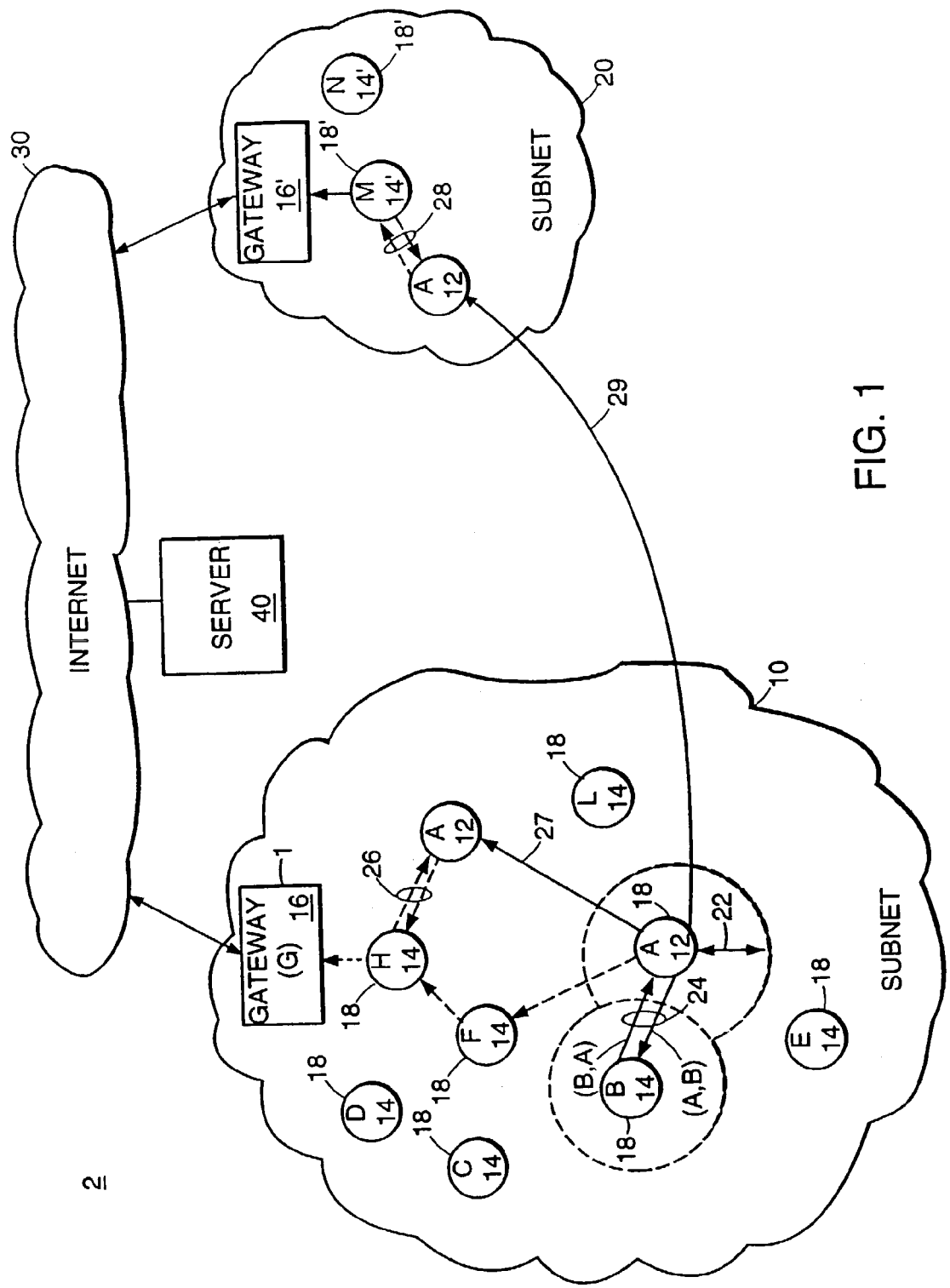
FIG. 1 is a block diagram of an embodiment of a mobile internetworking system including a plurality of subnets in communication with the Internet.

FIG. 1 shows an embodiment of an internetworking system 2 including communication sub-networks ("subnets") 10, 20 that are components of a worldwide network of networks 30 (i.e., the "Internet"). The Internet 30 includes communications entities, (e.g., hosts and routers), that exchange messages according to an Internet Protocol (IP) such as IPv4 (version 4) and IPv6 (version 6). On the Internet 30, entities implementing IPv6 may coexist with IPv4 entities. In general, the IPv4 and IPv6 versions are incompatible. The incompatibility is due, in part, to the difference in addressing format: the IPv4 specifies a 32-bit address format, whereas the IPv6 specifies a 128-bit address format.

A server 40 is connected to the Internet 30 by a wire-line or wireless connection. The server 40 can be internal or external to the subnet 10. For purposes such as hosting application programs, delivering information or Web pages, hosting databases, handling electronic mail ("e-mail"), or controlling access to other portions of the Internet 30, the server 40 is a computer system that typically handles multiple connections to other entities (e.g., client systems) simultaneously. Although represented as a single server 40, other embodiments can have a group of interconnected servers. The data on the server 40 are replicated on one or more of these interconnected servers to provide redundancy in the event that a connection to the server 40 cannot be established.

Each subnet 10, 20 includes one or more networks that can include both local area network (LAN) and wide area network (WAN) components. Each subnet 10, 20 may be a freely accessible component of the public Internet 30, or a private Intranet. The subnet 10 includes IP hosts 12, routers 14, and a gateway 16 (collectively referred to as nodes 18). As used hereafter, a router 14 is any node 18 that forwards IP packets not explicitly addressed to itself, and an IP host 12 is any node 18 that is not a router 14. Examples of devices that can participate as a node 18 in the subnet 10 include laptop computers, desktop computers, wireless telephones, and personal digital assistants (PDAs), network computers, television sets with a service such as Web TV, client computer systems, server computer systems. The gateway 16 is a particular type of routing node 14 that connects the subnet 10 to the Internet 30. The subnet 20 is similarly configured with nodes 18' (i.e., hosts 12', routers 14', and gateways 16').

The subnet 10 can be associated with one organization or administrative domain, such as an Internet service provider (ISP), which associates each node 18 with an assigned IPv6 or IPv4 network address. Each IPv6 address is globally unique, whereas each IPv4 address is locally unique at least within the subnet 10, and may be globally unique. Presumably, the assigned IP address has some topological relevance to the "home" subnet 10 of the node 18 so that the nodes 18 of the subnet 10 can be collectively identified by a common address prefix for routing purposes (called address aggregation). In one embodiment, the gateway 16 is a dual-stack node; that is, the gateway 16 has two IP addresses, an IPv6 address and an IPv4 address, and can route packets to IPv4 and IPv6 nodes.

Although it is conceivable that all nodes 18 in subnet 10 are initially assigned network addresses that follow a common address convention and have a common network prefix, dynamic topology changes may result in nodes 18 leaving their home subnet 10 to join a "foreign" subnet (e.g., subnet 20) and new nodes joining the home subnet 10. Because the nodes 18 maintain the same IP address irrespective of whether the node 18 changes its location within the subnet 10 or moves to the foreign subnet 20, mobility may result in a heterogeneous conglomerate of IPv6 and IPv4 addresses, having various network prefixes, within the single subnet 10 unless some form of dynamic address assignment or other address-renumbering scheme is used. Further, the gradual transition from the use of IPv4 network addresses to IPv6 network addresses within the subnet 10 increases the likelihood of such a heterogeneous conglomeration. Thus, like the Internet 30, the infrastructure of the subnet 10 can become heterogeneous; some nodes 18 can be IPv4 nodes, while others are IPv6 nodes.

In the subnet 10, each node 18 can establish connectivity with one or more other nodes 18 through broadcast or point-to-point links. In general, each link is a communication facility or medium over which nodes 18 can communicate at the link layer (i.e., the protocol layer immediately below the Internet Protocol layer.) Such communication links can be wire-line (e.g., telephone lines) or wireless; thus, nodes 18 are referred to as wireless or wire-line depending upon the type of communication link that the node 18 has to the subnet 10. Examples of wireless communication links are microwave links, radio frequency (RF) links, infrared (IR) links, and satellite links. Protocols for establishing link layer links include Ethernet, PPP (Point-to-Point Protocol) links, X.25, Frame Relay, or ATM (asynchronous transfer mode). Each wireless node 18, e.g., IP host A 12, has a range 22 of communication within which that node 18 can establish a connection to the subnet 10. When beyond the range 22 of communication, the IP host A 12 cannot communicate with the server 40 on the Internet 30 or with other nodes 18 in the subnet 10.

Each broadcast link connecting multiple nodes 18 is mapped into multiple point-to-point bi-directional links. For example, a pair of nodes 18 is considered to have established a bi-directional link 18, if each node 18 can reliably receive messages from the other. For example, IP host A 12 and node B 14 have established a bi-directional link 24 if and only if IP host A 12 can receive messages sent from node B 14 and node B 14 can receive messages sent from IP host A 12 at a given instant in time. Nodes 18 that have established a bi-directional link are considered to be adjacent (i.e., neighboring nodes). Such a bi-directional link 24 between the two nodes A and B is represented by a pair of unidirectional links (A, B) and (B, A). Each link has at least one positive cost (or metric) that can vary in time, and for any given cost, such cost for the link (A, B) may be different from that for the link (B, A). Any technique for assigning costs to links can be used to practice the invention. For example, the cost of a link can be one, for minimum-hop routing, or the link delay plus a constant bias.

In one embodiment, the subnet 10 is a mobile "ad hoc" network ("MANET") in that the topology of the subnet 10 and the state of the links (i.e., link state) between the nodes 18 in the subnet 10 can change frequently because several of the nodes 18 are mobile. That is, each mobile node 18 may move from one location to another location within the same subnet 10 or to another subnet 20, dynamically breaking existing links and establishing new links with other nodes 18, 18' as a result. Such movement by one node 18 does not necessarily result in breaking a link, but may diminish the quality of the communications with another node 18 over that link. In this case, a cost of that link has increased. Movement that breaks a link may interrupt any on-going communications with other nodes 18 in the subnet 10 or in the foreign subnet 20, or with servers (e.g., server 40) connected to the Internet 30. In another embodiment, the position of every node 18 in the subnet 10 is fixed (i.e., a static network configuration in which no link state changes occur due to node mobility). As the principles of the invention apply to both static and dynamic network configurations, a reference to the subnet 10 contemplates both types of network environments.

The following example illustrates the operation of the subnet 10. Consider, for example, that node A is communicating with the server 40 over a route through subnet 10 that includes the link (A, B) to node B 14, when node A 12 moves from its present location. This movement breaks the communication link with node B 14 and, as a result, interrupts communications with the server 40. The relocation of node A 12 may break a link with one or more other nodes 18 as well. As one example, the movement by node A 12 may temporarily take node A 12 out of communication range with node B 14, and upon returning within range, node A 12 can reestablish the broken link 24 with node B 14. In this example, the link 24 is intermittent. As another example, node A 12 may move to a different location within the subnet 10 altogether and reestablish a bi-directional link 26 with a different node, (e.g., here node H). In yet another example, node A 12 may move to the foreign subnet 20 and establish a bi-directional link 28 with a node 14' in the subnet 20 (e.g., node M 14').

Each router 14 in the subnet 10 is responsible for detecting, updating, and reporting changes in cost and up-or-down status of each outgoing communication link to neighbor nodes. Thus, each router 14 in the subnet 10 runs a link-state-routing protocol for disseminating subnet topology and link-state information to the other routers 14 in the subnet 10. Each router 14 also executes a neighbor discovery protocol for detecting the arrival of new neighbor nodes and the loss of existing neighbor nodes. To achieve discovery, IP hosts 12 connected to the subnet 10 also run the neighbor discovery protocol. IP hosts 12 can also operate as routers by running the link-state-routing protocol (in the description, such routing IP hosts are categorically referred to as routers 14). The link-state-routing protocol, referred to as a topology broadcast based on reverse-path forwarding (TBRPF) protocol, seeks to substantially minimize the amount of update and control traffic required to maintain shortest (or nearly shortest) paths to all destinations in the subnet 10.

In brief, the TBRPF protocol performed by each of the routers 14 in the subnet 10 operates to inform a subset of the neighboring routers 14 in the subnet 10 of the current network topology and corresponding link-state information. Thus, for the examples above, each router 14 in the subnet 10 that detects a change in a link to node A 12, (e.g., node B 14 in the cost of the link (B, A)), operates as the source (i.e., source node) of an update. Each source node sends a message to a neighbor of that source node, informing the neighbor of the update to that link. Each router 14 receiving the update may subsequently forward the update to zero or more neighbor nodes, until the change in the topology of the subnet 10 disseminates to the appropriate routers 14 in the subnet 10.

To transmit update messages, the TBRPF protocol supports unicast transmissions (e.g., point-to-point or receiver directed), in which a packet reaches only a single neighbor, and broadcast transmissions, in which a single packet is transmitted simultaneously to all neighbor nodes. In particular, the TBRPF protocol allows an update to be sent either on a common broadcast channel or on one or more unicast channels, depending on the number of neighbors that need to receive the update.

Upon recovering the same link to node B 14, or upon reestablishing a new link to another node 18 in the same subnet 10 or in the foreign subnet 20, the node A 12 can resume the interrupted communications with server 40. In effect, one of the nodes 18, 18' in the subnet 10, 20, respectively, using the neighbor discovery protocol, discovers node A 12 and, using the TBRPF protocol, initiates dissemination of topology and link-state information associated with the link to node A 12. The routers 14 also use the TBRPF protocol to disseminate this information to the other routers in the respective subnet 10 so that one or more routes to the node A 12 become available for communication with the server 40.

In one embodiment, such communications resume at their point of interruption. In brief, node A 12 maintains, in local cache, copies of objects that are located on the server 40. When node A 12 and the server 40 are in communication, node A 12 updates the objects as necessary, thereby maintaining substantially up-to-date copies of the objects. Thus, when node A 12 moves out of the communication range 22 with the subnet 10, the node A 12 initially has up-to-date information. Then when node A 12 reconnects to the subnet 10, the server 40 forwards previously undelivered updates to the objects locally stored at node A 12, along a route determined by information stored at each of the routing nodes 14. In the event node A 12 reconnects to the foreign subnet 20, a hand-off protocol, such as MobileIP, is used to achieve the redirection of the messages between the server 40 and the node A 12.

The route taken by the object updates may traverse a heterogeneous IPv6/IPv4 infrastructure. Normally, IPv6 nodes are unable to route packets to other IPv6 nodes 18 over routes that pass through IPv4 infrastructure. In one embodiment, described in more detail below, the nodes 18 use an IPv6-IPv4 compatible aggregatable global unicast address format to achieve such routing. This IPv6-IPv4 compatibility address format also enables incremental deployment of IPv6 nodes 18 that do not share a common multiple access data-link with another IPv6 node 18.

Accordingly, the internetworking system 2 provides various mobile ad hoc extensions to the Internet 30 that are particularly suited to the dynamic environment of mobile ad hoc networks. Such extensions, which are described further below, include techniques for (1) disseminating update information to nodes 18 in the subnet 10 using the TBRPF protocol; (2) detecting the appearance and disappearance of new neighbor nodes using a neighbor discovery protocol; (3) establishing an address format that facilitates deployment of IPv6 nodes in a predominantly IPv4 network infrastructure; (4) updating information upon resuming communications between nodes; and (5) adaptively using network bandwidth to establish and maintain connections between nodes 18 and the server 40.

Figure 2:
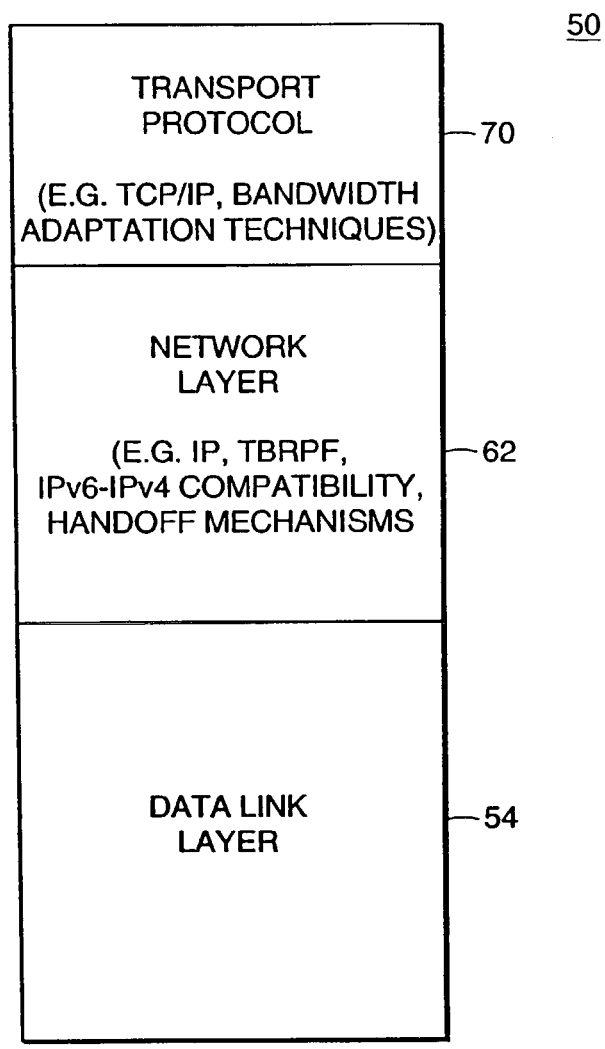
FIG. 2 is a block diagram of a portion of an embodiment of protocol stack that can be implemented by each of the routing nodes in each subnet to communicate in accordance with the principles of the invention.

FIG. 2 shows a portion of an embodiment of protocol stack 50 that can be used by each of the routing nodes 14, 14' to communicate with other routing nodes 14 in the subnet 10, 20 and on the Internet 30, and thereby implement the various extensions to the Internet 30 described herein. The protocol stack 50 includes a data-link layer 54, a network layer 62, and a transport layer 70.

The data link layer 54 can implemented by any conventional data link protocol (e.g., IEEE 802.11) with an addressing scheme that supports broadcast, multicast and unicast addressing with best-effort (not guaranteed) message delivery services between nodes 18 having instantaneous bi-directional links. For such implementations, each node 18 in the subnet 10 has a unique data link layer unicast address assignment.

The network layer 62 is the protocol layer responsible for assuring that packets arrive at their proper destination. Some of the mobile ad hoc extensions for the Internet 30 described herein operate at the network layer 62, such as the TBRPF protocol 58 and the IPv6-IPv4 compatibility address format, described in more detail below. Embodiments that redirect communications from foreign subnets to home subnets also use hand-off mechanisms such as Mobile IP, which operate at the network layer 62. At the transport layer 70, other mobile ad hoc extensions to the Internet 30 are implemented, such as techniques for updating communications upon restoring connections between nodes and for adaptively using the network bandwidth.

1. Topology Broadcast Based on Reverse-Path Forwarding (TBRPF) Protocol

In brief, the TBRPF protocol uses the concept of reverse-path forwarding to broadcast each link-state update in the reverse direction along a tree formed by the minimum-hop paths from all routing nodes 14 to the source of the update. That is, each link-state update is broadcast along the minimum-hop-path tree rooted at the source (i.e., source node "src") of the update. The minimum-hop-path trees (one tree per source) are updated dynamically using the topology and link-state information that are received along the minimum-hop-path trees themselves. In one embodiment, minimum-hop-path trees are used because they change less frequently than shortest-path trees that are determined based on a metric, such as delay. Other embodiments of the TBRPF protocol can use other types of trees, such as shortest path trees, to practice the principles of the invention.

Based on the information received along the minimum-hop-path trees, each node 18 in the subnet 10 computes a parent node and children nodes, if any, for the minimum-hop-path tree rooted at each source node src. Each routing node 14 may receive and forward updates originating from a source node src along the minimum-hop-path tree rooted at that source node src. Each routing node 14 in the subnet 10 also engages in neighbor discovery to detect new neighbor nodes and the loss of existing neighbor nodes. Consequently, the routing node 14 may become the source of an update and thus may generate an update message. When forwarding data packets to a destination node, each routing node 14 selects the next node on a route to the destination.

To communicate according to the TBRPF protocol, each routing node 14 (or node i, when referred to generally) in the subnet 10 stores the following information:

1. A topology table, denoted TT_i, consisting of all link-states stored at node i. The entry for link (u, v) in this table is denoted TT_i(u, v) and includes the most recent update (u, v, c, sn) received for link (u, v). The component c represents the cost associated with the link, and the component sn is a serial number for identifying the most recent update affecting link (u, v) received by the node i. The components c and sn of the entry for the link (u, v) is denoted TT_i(u, v).c and TT_i(u, v).sn. Optionally, the dissemination of multiple link metrics is attainable by replacing the single cost c with a vector of multiple metrics.
2. A list of neighbor nodes, denoted N_i.
3. For each node u other than node i, the following is maintained:
   a. The parent, denoted p_i(u), which is the neighbor node ("nbr") of node i that is the next node on a minimum-hop path from node i to node u, as obtained from the topology table TT_i.
   b. A list of children nodes of node i, denoted children_i (u).
   c. The sequence number of the most recent link-state update originating from node u received by node i, denoted sn_i(u). The sequence number is included in the link-state update message. The use of sequence numbers helps achieve reliability despite topology changes, because node i avoids sending another node information that the other node already has. Each node i maintains a counter (i.e., the sequence number) for each link that the node i monitors. That counter is incremented each time the status of the link changes.
   d. The routing table entry for node u, consisting of the next node on a preferred path to node u. The routing table entry for node u can be equal to the parent p_i(u) if minimum-hop routing is used for data packets. However, in general, the routing table entry for node u is not p_i(u), because the selection of routes for data traffic can be based on any objective.

One embodiment of the TBRPF protocol uses the following message types:

LINK-STATE UPDATE: A message containing one or more link-state updates (u, v, c, sn).

NEW PARENT: A message informing a neighbor node that the node has selected that neighbor node to be a parent with respect to one or more sources of updates.

CANCEL PARENT: A message informing a neighbor that it is no longer a parent with respect to one or more sources of updates.

HELLO: A message sent periodically by each node i for neighbor discovery.

NEIGHBOR: A message sent in response to a HELLO message.

NEIGHBOR ACK: A message sent in response to a NEIGHBOR message.

ACK: A link-level acknowledgment to a unicast transmission.

NACK: A link-level negative acknowledgment reporting that one or more update messages sent on the broadcast channel were not received.

RETRANSMISSION OF BROADCAST: A retransmission, on a unicast channel, of link-state updates belonging to an update message for which a NACK message was received.

HEARTBEAT: A message sent periodically on the broadcast channel when there are no updates to be sent on this channel, used to achieve reliable link-level broadcast of update messages based on NACKs.

END OF BROADCAST: A message sent to a neighbor over a unicast channel, to report that updates originating from one or more sources are now being sent on the unicast channel instead of the broadcast channel.

The formats for the various types of TBRPF protocol messages are described below.

Building the Minimum-Hop-Path Tree for a Source

Figure 3:
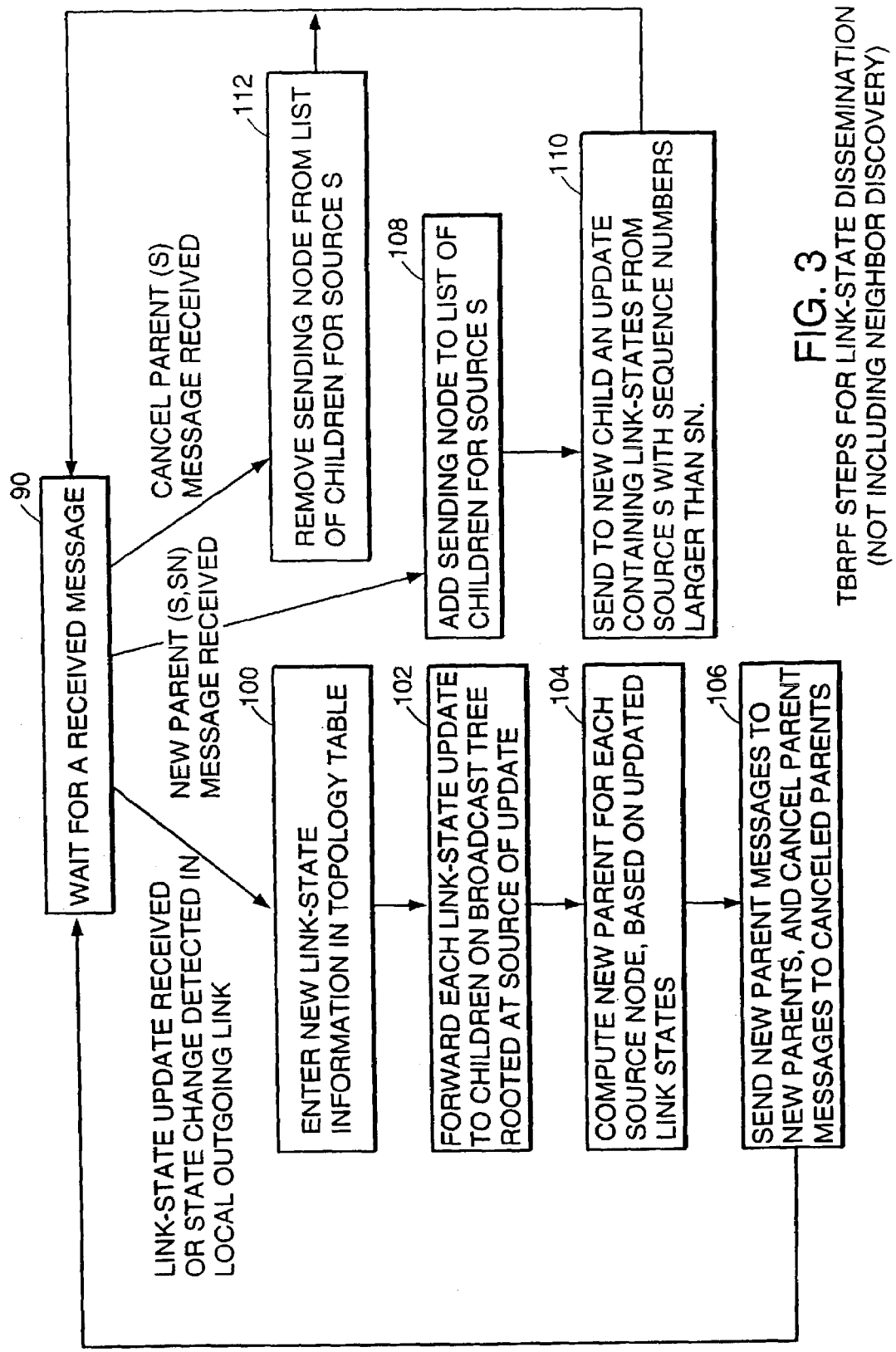
FIG. 3 is a flow diagram illustrating an embodiment of a process by which each routing node selects a parent neighbor node and children neighbor node(s) for each potential source node in the subnet to define a minimum-hop-path tree for each potential source node along which routing nodes receive and forward link-state updates originating from that source node.

FIG. 3 shows an embodiment of a process by which each routing node 14 selects a parent neighbor node and children neighbor node(s) for each potential source node src in the subnet 10. The selection of the parent and children neighbor nodes for each potential source node src define a minimum-hop-path tree for that potential source node along which the routing nodes 14 receive and forward link-state updates originating from that source node src. Pseudo-code describing the network-level procedures performed by each routing node 14 is in Appendix A.

Node i receives (step 90) a message over a communication link. The received message can represent a link-state update, the discovery of a new neighbor node, the loss of a neighbor node, a change in the cost of a link to a neighbor node, a selection of a new parent neighbor node, or a cancellation of a parent neighbor node. Pseudo-code for processing these types of received messages is provided in Appendix A; the corresponding procedures are called Process_Update, Link_Up, Link_Down, Link_Change, Process_New_Parent, and Process_Cancel_Parent, respectively. The general procedure followed in response to all of these events, and the specific procedure followed by a node that has just started and has no topology information are described below.

If node i receives a message representing a link-state update, the discovery of a new neighbor node, the loss of a neighbor node, or a change in the cost of a link to a neighbor node, node i enters (step 100) the new link-state information, if any into the topology table, TT_i, and forwards (step 102) the link-state information in a link-state update to the neighbor nodes in children_i(src), where src is the source node at which the update originated. Node i then computes (step 104) the parent nodes p_i(u) for all potential source nodes src by running a shortest-path algorithm such as Dijkstra's algorithm. If this computation results in a change to the parent node p_i(u) for any source u, node i then sends a NEW PARENT(u, sn) message, where sn=sn_i(u), to the new parent node p_i(u) and a CANCEL PARENT message to the old parent node (step 106).

If node i receives (step 90) a NEW PARENT(u, sn) message from a sending node with source u and sequence number sn, node i adds(step 108) the sending node to node i's list of children nodes children_i(u) for that source u, and then sends (step 110) the sending node a LINK-STATE UPDATE message containing all updates in node i's topology table, TT_i, originating from source u and having a sequence number greater than sn. If node i receives (step 90) a CANCEL PARENT(u) message from a sending node with source u, node i removes (step 112) the sending node from node i's list of children nodes children_i(u) for that source u.

Consider, for example, the case in which node i initially has no topology information. Accordingly, node i has no links to neighbor nodes, and its topology table TT_i is empty. Also the parent node is p_i(src)=NULL (i.e., not defined), the children_i(src) is the empty set, and sn_i(src)=0 for each source node src. Upon receiving (step 90) messages representing the discovery of neighbor nodes, node i executes the Link_Up procedure to process each link established with each neighbor node nbr. Because each neighbor node nbr of node i is (trivially) the next node on the minimum-hop path from node i to neighbor node nbr, node i selects (step 104) each of its neighbor nodes nbr as the new parent node p_i(nbr) for source node nbr. Execution of the Link-Up procedure results in node i sending (step 106) a NEW PARENT message to each neighbor node nbr. Therefore, the NEW PARENT message sent to a new neighbor node nbr contains the neighbor node nbr (and possibly other sources) in its source list.

In response to the NEW PARENT message, then each neighbor node nbr informs (step 110) node i of the outgoing links of neighbor node nbr. Information about the outgoing links of neighbor node nbr allows node i to compute minimum-hop paths to the nodes at the other end of the outgoing links, and thus to compute (step 104) new parents p_i(src), for all source nodes src that are two hops away. Node i sends (step 106) a NEW PARENT message to each of these computed new parents. Then each parent p_i(src) for each such source node src informs (step 110) node i of the outgoing links for source node src, which allows node i to compute (step 104) new parents for all source nodes that are three hops away. This process continues until node i has computed parent nodes for all sources nodes src in the subnet 10. As a result, for a given source node src, the parents p_i(src) for all nodes i other than source node src define a minimum-hop-path tree rooted at source node src (after the protocol has converged).

Node i cancels an existing parent p_i(src) by sending a CANCEL PARENT(src) message containing the identity of the source node src. Consequently, the set of children, children_i(src), at node i with respect to source node src is the set of neighbor nodes from which node i has received a NEW PARENT message containing the identity of source node src without receiving a subsequent CANCEL PARENT message for that source node src. Node i can also simultaneously select a neighbor node as the parent for multiple sources, so that the node i sends a NEW PARENT(src_list, sn_list) message to the new parent, where src_list is the list of source nodes and sn_list is the corresponding list of sequence numbers. Similarly, a CANCEL PARENT message can contain a list of sources.

In one embodiment, the TBRPF does not use NEW PARENT and CANCEL PARENT messages in the generation the minimum-hop-path tree. Instead, each node i computes the minimum-hop paths from each neighbor node nbr to all destinations (e.g., by using breadth-first search or Dijkstra's shortest-path algorithm). Consequently, each node i computes the parents p_nbr(src) for each neighbor node nbr and source node src, from which node i determines which neighbor nodes nbr are its children for the given source node src. Although this process eliminates NEW PARENT and CANCEL PARENT messages, the process also requires that each node i (1) sends all updates originating from the source node src to any child node in children_i (src), or (2) periodically sends updates along the minimum-hop-path tree, because node i does not know the sequence number sn_nbr(src) from the neighbor node nbr and thus does not know what updates the neighbor node nbr already has. Either of these actions ensures that each neighbor node nbr receives the most recent information for each link.

Figure 4:
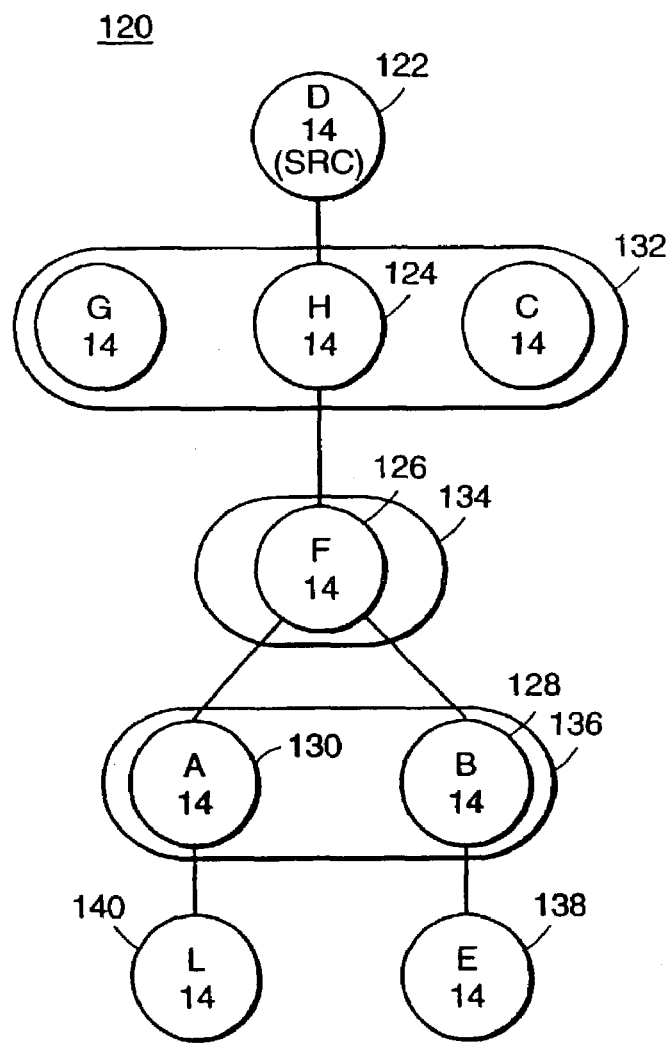
FIG. 4 is a diagram illustrating an embodiment of an exemplary minimum-hop-path tree for the nodes in the subnet of FIG. 1.

FIG. 4 shows an embodiment of an exemplary minimum-hop-path tree 120 for the nodes 18 in the subnet 10 of FIG. 1. For the sake of illustration, assume that node D is the source of an update. The parent 122 for nodes C, G, and H with respect to the source node D is node D; the parent 124 for node F with respect to source node D is node H; the parent 126 for nodes A and B with respect to source node D is node F; the parent 128 for node E is node B; and the parent 130 for node L is node A. (In this example, node A is a routing node 14, and thus runs the TBRPF protocol.)

Conversely, the children 132 of node D are nodes C, G, and H; the child 134 of node H is node F; the children 136 of node F are nodes A and B; the child 138 of node B is node E, and the child 140 of node A is node L. As shown, nodes C, E, G, and L are leaf nodes, which, in accordance with the TBRPF protocol, do not have to forward updates originating from the source node D.

Updating the Minimum-Hop-Path Tree

In brief, the TBRPF protocol disseminates link-state updates generated by a source node src along the minimum-hop-path tree rooted at node src and dynamically updates the minimum-hop-path tree based on the topology and link-state information received along the minimum-hop-path tree. More specifically, whenever the topology table TT_i of node i changes, the node i computes its parent p_i(src) with respect to every source node src (see the procedure Update_Parents in Appendix A). The node i computes parents by (1) computing minimum-hop paths to all other nodes using, for example, Dijkstra's algorithm, and (2) selecting the next node on the minimum-hop path to each source node src to be the parent for that source node src (see the procedure Compute_New_Parents in Appendix A). The computation of parents occurs when the node i receives a topology update, establishes a link to a new neighbor node, or detects a failure or change in cost of a link to an existing neighbor node.

In one embodiment, node i computes a new parent p_i (src) for a given source node src even though the path to the source node src through the new parent has the same number of hops as the path to the source node src through the old parent. In another embodiment, the node keeps the old parent node in this event, thus reducing the overhead of the TBRPF protocol. This embodiment can be implemented, for example, by using the procedure Compute_New_Parents2 (given in Appendix A) instead of the procedure Compute_New_Parents.

If the parent p_i(src) changes, node i sends the message CANCEL PARENT(src) to the current (i.e., old) parent, if the old parent exists. Upon receiving the CANCEL PARENT(src) message, the old parent ("k") removes node i from the list children_k(src).

Node i also sends the message NEW PARENT(src, sn) to the newly computed parent if the new parent exists, where sn=sn_i(src) is the sequence number of the most recent link-state update originating from source node src received by node i. This sequence number indicates the "position" up to which node i has received updates from the old parent, and indicates to the new parent that it should send only those updates that occurred subsequently (i.e., after that sequence number).

Upon receiving the NEW PARENT(src, sn) message, the new parent "j" for p_i(src) adds node i to the list children_j (src) and sends to node i a link-state update message consisting of all the link states originating from source node src in its topology table that have a sequence number greater than sn (see the procedure Process_New_Parent in Appendix A). Thus, only updates not yet known to node i are sent to node i.

Generally, the range of sequence numbers is large enough so that wraparound does not occur. However, if a small sequence number range is used, wraparound can be handled by employing infrequent periodic updates with a period that is less than half the minimum wraparound period, and by using a cyclic comparison of sequence numbers. That is, sn is considered less than sn' if either sn is less than sn' and the difference between sn and sn' (sn'−sn') is less than half the largest possible sequence number, or sn' is less than sn and the difference, sn−sn', is greater than half the largest possible sequence number.

When a node i detects the existence of a new neighbor nbr, it executes Link_Up(i, nbr) to process this newly established link. The link cost and sequence number fields for this link in the topology table at node i are updated. Then, the corresponding link-state message is sent to all neighbors in children_i(i). As noted above, node i also recomputes its parent node p_i(src) for every node src, in response to this topological change. In a similar manner, when node i detects the loss of connectivity to an existing neighbor node nbr, node i executes Link_Down(i, nbr). Link_Change(i, nbr) is likewise executed at node i in response to a change in the cost to an existing neighbor node nbr. However, this procedure does not recompute parents.

In one embodiment, if a path between the node i and a given source node src ceases to exist, the node i computes a new parent p_i(src) that is set to NULL (i.e., parent does not exist). In another embodiment, although the path between the node i and the given source node src ceases to exist, the node i keeps the current parent, if the current parent is still a neighbor node of the node i. Thus, the overhead of the TBRPF protocol is reduced because it is unnecessary to send a CANCEL PARENT and a subsequent NEW PARENT messages if the old path to the source becomes operational later because of a link recovery. This embodiment can be implemented by replacing the fifth line of the procedure Update_Parents in Appendix A, "If (new_p_i(src)!=p_i(src)){", with the line "If (new_p_i(src) p_i(src) and new_p_i(src)!=NULL){".

The TBRPF protocol does not use an age field in link-state update messages. However, failed links (represented by an infinite cost) and links that are unreachable (i.e., links (u, v) such that p_i(u)=NULL) are deleted from the topology table TT_i after MAX_AGE seconds (e.g., 1 hour) in order to conserve memory. Failed links (u, v) are maintained for some time in the topology table TT_i, rather than deleted immediately, to ensure that the node i that changes its parent p_i(u) near the time of failure (or had no parent p_i(u) during the failure) is informed of the failure by the new parent.

Unreachable links, (i.e., links (u, v) such that node i and node u are on different sides of a network partition), are maintained for a period of time to avoid having to rebroadcast the old link state for (u, v) throughout node i's side of the partition, if the network partition soon recovers, which can often happen if the network partition is caused by a marginal link that oscillates between the up and down states. If a link recovers resulting in the reconnection of two network components that were disconnected (i.e., partitioned) prior to the link recovery, the routing nodes 14 in one partition my temporarily have invalid routes to nodes 18 in the other partition. This occurs because the routing nodes 14 may receive an update message for the link recovery before receiving update messages for links in the other partition. Consequently, the link-information for those links in the other partition may be outdated temporarily.

To correct this situation, in one embodiment, a header field is added to each link-state update message, which indicates whether the update message is sent in response to a NEW PARENT message. The header field also identifies the corresponding NEW PARENT message using a sequence number. For example, if a given node i sends a NEW PARENT message (for multiple sources) to node j following the recovery of the link (i, j), the node i waits for a response from node j to the NEW PARENT message before sending to node i's neighbor nodes an update message corresponding to the link recovery. The response from node j includes the link-state information of the other nodes 18 in the previously disconnected partition. Then node i forwards this link-state information to node i's neighbor nodes. Consequently, the nodes 18 in the same partition as node i receives updates for the links in the other partition at the same time that the nodes 18 receive the update for the link recovery. Thus, the link-state information for those links in the other partition is not outdated temporarily.

A node i that is turned off (or goes to sleep) operates as if the links to all neighbors have gone down. Thus, the node i remembers the link-state information that it had when turned off. Since all such links are either down or unreachable, these link states are deleted from the topology table TT_i if the node i awakens after being in sleep mode for more than MAX_AGE seconds.

Infrequent periodic updates occur to correct errors that may appear in table entries or update messages. (See Send_Periodic_Updates in Appendix A.) As discussed above, periodic updates are also useful if the sequence number range is not large enough to avoid wraparound.

Initiating an Update Message

When a given routing node 14 detects a change in the state of a neighbor node, that routing node 14 becomes the source (i.e., source node src) of a link-state update message with respect to corresponding link to that neighbor node. As described above, the source node src then broadcasts each link-state update along the minimum-hop-path tree rooted at the source of the update.

A link-state update message reports the state of the link (src, nbr) as a tuple (src, nbr, c, sn), where c and sn are the cost and the sequence number associated with the update. A cost of infinity represents a failed link. The source node src is the head node of link (src, nbr), and is the only node that can report changes to parameters of link (src, nbr). Therefore, any node 18 receiving the link-state update (src, nbr, c, sn) can determine that the update originated from the source node src.

The source node src maintains a counter sn_src, which is incremented by at least one each time the cost of one or more outgoing links (src, nbr) changes value. For example, the counter sn_src can be a time stamp that represents the number of seconds (or other units of time) elapsed from some fixed time. When the source node src generates a link-state update (src, nbr, c, sn), the sequence number sn is set to the current value of sn_src.

Receiving an Update Message

In brief, each routing node 14 that receives a link-state update message receives that update message along a single path. That is, any link-state update originating from source node src is accepted by node i if (1) the link-state update is received from the parent node p_i(src), and (2) the link-state update has a larger sequence number than the corresponding link-state entry in the topology table TT_i at node i. If the link-state update is accepted, node i enters the link-state update into the topology table TT_i. Node i may then forward the link-state update to zero or more children nodes in children_i(src). In one embodiment, the link-state update passes to every child node in children_i(src). (See the procedures Update_Topology_Table and Process_Update in the Appendix A.)

Forwarding Update Messages

In most link-state routing protocols, e.g., OSPF (Opens Shortest Path First), each routing node 18 forwards the same link-state information to all neighbor nodes. In contrast, in one embodiment of the TBRPF protocol, each routing node 14 sends each link-state update only to neighbor nodes that are children on the minimum-hop-path tree rooted at the source of the update. Each routing node 14 having no children for the source node src of the link-state update is a leaf in the minimum-hop-path tree and therefore does not forward updates originating from the source node src. In typical networks, most nodes 18 are leaves, thus the TBRPF protocol makes efficient use of the bandwidth of the subnet 10. In addition, those nodes having only one child node for the source node src can send updates generated by the source node src to that child node only, instead of broadcasting the updates to all neighbor nodes.

The TBRPF protocol may utilize bandwidth more efficiently by using unicast transmissions if those routing nodes 14 have only one child, or a few children, for the source of the update, and broadcast transmissions when several children exist for the update. Therefore, in one embodiment, the TBRPF protocol determines whether to use unicast or broadcast transmissions, depending on the number of children nodes and the total number of neighbor nodes.

In general, each routing node 14 uses unicast transmissions for updates with only one intended receiver (e.g., only one child), and broadcast transmissions for updates with several intended receivers, to avoid transmitting the update message several times. Therefore, each routing node 14 uses unicast transmission if k=1 and use broadcast if k>1, where k is the number of intended receivers. A possible drawback can occur if the number of children nodes exceeds one and there are a many more neighbors. For example, if there are two children nodes and twenty neighbor nodes, (i.e., k=2 and n=20, where k is the number of children nodes and n is the number of neighbors), then 18 neighbor nodes are listening to a message not intended for them. Such neighbor nodes could instead be sending or receiving other messages.

To avoid this possible drawback, one option is to use broadcast transmission if $k>(n+1)/2$ and unicast transmission in all other cases. In general, a rule of the form $k>g(n)$ can be used. For update messages, the number of children k may be different for different update sources. Therefore, it is possible to use unicast transmissions for some sources and broadcast transmissions for other sources, and the transmission mode for a given source u, denoted mode_i(u), can change dynamically between unicast and broadcast as the number of children changes.

While LINK-STATE-UPDATE messages can be transmitted in either unicast or broadcast mode, HELLO messages and HEARTBEAT messages (discussed below) are always transmitted on the broadcast channel, and the following messages are always transmitted on the unicast channel (to a single neighbor): NEIGHBOR, NEIGHBOR ACK, ACK, NACK, NEW PARENT, CANCEL PARENT, RETRANSMISSION OF BROADCAST, END OF BROADCAST, and LINK-STATE-UPDATE messages sent in response to a NEW PARENT message.

Exemplary pseudo-code for a procedure-for sending a LINK-STATE UPDATE message (that is not a response to a NEW PARENT message) on the broadcast or unicast channel is as follows:

```
If (mode_i(src) = = BROADCAST)
    Append the message update_msg to the message queue associated
    with the broadcast channel.
If (mode_i(src) = = UNICAST)
    For (each node k in children_i(src))
        Append the message update_msg to the message queue
        associated with the unicast channel to node k.
```

Reliable unicast transmission of control packets can be achieved by a variety of reliable link-layer unicast transmission protocols that use sequence numbers and ACKs, and that retransmit a packet if an ACK is not received for that packet within a specified amount of time.

Reliable Transmission in Broadcast Mode

For reliable transmission of Link-State Update messages in broadcast mode, each broadcast update message includes one or more link-state updates, denoted lsu(src), originating from sources src for which the transmission mode is BROADCAST. Each broadcast control packet is identified by a sequence number that is incremented each time a new broadcast control packet is transmitted. Reliable transmission of broadcast control packets in TBRPF can be accomplished using either ACKs or NACKs. If ACKs are used, then the packet is retransmitted after a specified amount of time if an ACK has not been received from each neighbor node that must receive the message.

In one embodiment of TBRPF, NACKs are used instead of ACKs for reliable transmission of broadcast control packets, so that the amount of ACK/NACK traffic is minimized if most transmissions are successful. Suppose node i receives a NACK from a neighbor node nbr for a broadcast update message. In one embodiment, all updates Isu(src) in the original message, for each source node src such that neighbor node nbr belongs to children_i(src), are retransmitted (reliably) on the UNICAST channel to the neighbor node nbr, in a RETRANSMISSION OF BROADCAST message. This message includes the original broadcast sequence number to allow neighbor node nbr to process the updates in the correct order. In another embodiment, such update messages are retransmitted on the broadcast channel. This embodiment may improve the efficiency of the TBRPF protocol in subnets that do not support receiver-directed transmission, because in such subnets unicast transmission provides no efficiency advantage over broadcast transmissions.

The procedure for the reliable transmission of broadcast update packets uses the following message types (in addition to LINK-STATE UPDATE messages): HEARTBEAT(sn), NACK(sn, bit_map), and RETRANSMISSION OF BROADCAST(sn, update_msg). A NACK(sn, bit_map) message contains the sequence number (sn) of the last received broadcast control packet, and a 16-bit vector (bit_map) specifying which of the 16 broadcast control packets from sn-15 to sn have been successfully received.

A description of the procedure for the reliable transmission of broadcast update packets at node i uses the following exemplary notation:

Pkt(sn) represents a control packet with sequence number sn transmitted on the broadcast channel by node i.

MsgQ represents a message queue for new control messages to be sent on the broadcast channel from node i.

brdcst_sn_i represents the sequence number of the last packet transmitted on the broadcast channel by node i.

Heartbeat_Timer represents a timer used in the transmission of the HEARTBEAT message.

Following the transmission of the broadcast control packet Pkt(brdcst_sn_i) on the broadcast channel, node i increments brdcst_sn_i and reinitializes Heartbeat_Timer. When Heartbeat_Timer expires at node i, the node i appends the control message HEARTBEAT(brdcst_sn_i) to the message queue associated with the broadcast channel, and reinitializes Heartbeat_Timer. When the node i receives NACK(sn, bit_map) from neighbor node nbr, node i performs the functions as illustrated by following exemplary pseudo-code:

```
For each (sn' not received as indicated by bit_map){
    Let update_msg = {(src*, v*, sn*, c*) in Pkt(sn') such that the
        neighbor node nbr is in children_i(src*)}.
    Append the message RETRANSMISSION OF
        BROADCAST(sn', update_msg) to the message queue
        associated with the unicast channel to neighbor node nbr.
    (Message must be sent even if update_msg is empty.)}
```

Upon receipt at neighbor node nbr of control packet Pkt(sn) transmitted on the broadcast channel by node i, the neighbor node nbr performs the following operations as illustrated by the following pseudo-code:

```
If the control packet Pkt(sn) is received in error{
Append the control message NACK(sn, bit_map) to the
    message queue associated with the unicast channel to
    node i.}
If the control packet Pkt(sn) is received out of order (i.e., at least
    one previous sequence number is skipped){
        Withhold the processing of the control packet
        Pkt(sn).
        Append the control message NACK(sn, bit_map')
            to the message queue associated with the
            unicast channel to node i.}
Else (control packet Pkt(sn) is received correctly and in order){
    For each Link-State Update message update_msg
        in Pkt(sn), call Process_Update(i, nbr,
        update_msg).}
```

When a communication link is established from node i to a new neighbor nbr, in one embodiment the node i obtains the current value of brdcst_sn_nbr from the NEIGHBOR message or NEIGHBOR ACK that was received from neighbor node nbr.

Each node i can dynamically select the transmission mode for link-state updates originating from each source node src. As described above, this decision uses a rule of the form k>g(n), where k is the number of children (for src) and n is the number of neighbors of node i. However, to ensure that updates are received in the correct order, or that the receiver has enough information to reorder the updates, node i sends an END OF BROADCAST(last_seq_no, src) message on the unicast channel to each child when the mode changes to UNICAST, and waits for all update packets sent on unicast channels to be ACKed on before changing to BROADCAST mode.

To facilitate this process, each node i maintains a binary variable unacked_i(nbr, src) for each neighbor node nbr and source node src, indicating whether there are any unACKed control packets sent to neighbor node nbr containing link-state updates originating at source node src. The following exemplary pseudo-code illustrates an embodiment of a procedure that is executed periodically at each node i.

```
For each (node src){
    If (mode_i(src) = BROADCAST and |children_i(src)| <= g(n)){
        For each (node nbr in children_i(src)){
            Append the message END OF
                BROADCAST(brdcst_sn_i, src) to the message
                queue associated with the unicast channel to node
                nbr.}
        Set mode_i(src) = UNICAST.}
    If (mode_i(src) = UNICAST and |children_i(src)| > g(n)){
        Set switch_flag = YES.
        For each (node nbr in children_i(src)){
            If (unacked_i(nbr, src) = YES) Set switch_flag = NO.}
        If (switch_flag = YES) Set mode_i(src) = BROADCAST.}}
```

Full and Partial Topology TBRPF

In one embodiment, a result of the running the TBRPF protocol is that each router 14 in the subnet 10 obtains the state of each link in the subnet 10 (or within a cluster if hierarchical routing is used). Accordingly, this embodiment of the TBRPF protocol is referred to as full-topology link-state protocol. In some embodiments, described below, the TBRPF protocol is a partial-topology link-state protocol in that each router 14 maintains a subset of the communication links in the subnet 10. In the full-topology protocol embodiment, each routing node 14 is provided with the state of each link in the subnet 10 (or cluster, if hierarchical routing is used). In other embodiments, the TBRPF is a partial topology protocol in that each routing node 14 is provided with only a subset of the links in the subnet 10.

For the full-topology link-state protocol embodiment (1) alternate paths and disjoint paths are immediately available, allowing faster recovery from failures and topology changes; and (2) paths can be computed subject to any combination of quality-of-service (QoS) constraints and objectives. Partial-topology link-state protocols provide each node 18 with sufficient topology information to compute at least one path to each destination. Whether implemented as a full-topology or as a partial-topology protocol, the TBRPF protocol is a proactive link-state protocol in that each node 18 dynamically reacts to link-state and topology changes and maintains a path to each possible destination in the subnet 10 at all times.

A Partial-Topology Embodiment

In one partial-topology embodiment, each routing node 14 decides which of its outgoing links (i, j), called "special links," should be disseminated to all nodes in the subnet 10. This subset of links is maintained in a list L_i. All other outgoing links are sent only one hop (i.e., to all neighbor nodes of node i). Node i sends an update to its neighbor nodes if that update is the addition or removal of a link from the list L_i, or reflects a change in the state of a link in the list L_i.

Various rules can be used to define the set of special links in the list L_i. For example, one rule defines a link (i, j) to be in L_i only if node j is the parent of node i for some source node other than node j, or if node j belongs to the set children_i(src) for some source node src other than node i. This definition of special links includes enough links to provide minimum-hop paths between any pair of nodes. As a result, this partial-topology embodiment reduces the amount of control traffic without reducing the quality of the routes. In this embodiment, an update (u, v, c, sn, sp) is augmented to include a, "sp" field (e.g., a single-bit field), which indicates whether the link (u, v) is a special link. Pseudo-code representing an exemplary implementation of the partial-topology embodiment appears in the Appendix A, after the "Partial-Topology 1" header. The procedure Mark_Special_Links(i) is called upon a change to the parent p_i(src) or to the set of children nodes children_i(src).

A Second Partial-Topology Embodiment

In another partial-topology embodiment, each routing node 14, hereafter node i, maintains a topology table TT_i, a source tree Ti (i.e., computed paths to all destinations), a set of reported links Ri, and a set of neighbor nodes Ni. The entry of TT_i for a link (u, v) is denoted TT_i(u,v) and consists of the tuple (u, v, c, c'), where c is the cost associated with the link and c' is the last cost reported to neighbor nodes for the link. The component c of the entry for link (u, v) is denoted TT_i(u, v).c. In addition, a parent p_i (u) and set of children nodes children_i (u) are maintained for each node u≠node i. The parent p_i (u) is the next node on a shortest path to node u, based on the information in TT_i. The source tree Ti, computed by a lexicographic version of Dijkstra's algorithm, is the set of links that belong to at least one of the computed paths. The set of reported links Ri includes the source tree Ti and any link in TT_i for which an update has been sent but a delete update has not since been sent. In addition, a binary variable pending_i(u) is maintained for each node u≠node i, which indicates that the parent p_i (u) is pending, i.e., that a NEW PARENT(u) message has been sent to p_i (u) but no response has yet been received. In general, each node i reports to neighbor nodes the current states of only those links in its source tree Ti, but sends only part of its source tree Ti to each neighbor node such that no node receives the same information from more than one neighbor node. Pseudo-code representing an exemplary implementation of this partial-topology embodiment of the TBRPF protocol appears in the Appendix A, after the "Partial-Topology 2" header.

Upon receiving an update message, consisting of one or more updates (u, v, c), node i executes the procedure Update( ), which calls the procedure Update_Topology_Table( ), then executes the procedure Lex_Dijkstra( ) to compute the new source tree Ti and the procedure Generate_Updates( ) to generate updates and modify the set of reported links Ri based on changes in link costs and changes to the source tree Ti. Each generated update is then sent to the appropriate children, that is, updates for links with head u are sent to children_i(u). The procedure Update_Parents( ) is called, which determines any changes in the parent assignment and sends NEW PARENT and CANCEL PARENT messages.

The sending of updates can be accomplished in different ways, depending on whether the subnet 10 consists of point-to-point links, broadcast links, or a combination of both link types. In a network of point-to-point links, each neighbor node k would be sent a message that contains the updates for links (u, v) such that k belongs to children_i(u). If a broadcast capability also exists, links (u, v) for which children_i (u) has more than one member can be broadcast to all neighbor nodes.

The procedure Update_Topology_Table( ) does the following for each update (u, v, c) in the input message (in_message) such that the parent p_i(u) is the neighbor node who sent the message. (Updates received from a node other than the parent are ignored.) If either TT_i does not contain an entry for (u, v) or contains an entry with a different cost than c, then TT_i(u, v) is updated with the new value c and link (u, v) is marked as changed. If the input message is a PARENT RESPONSE, then in addition to updates, the message contains the same list of sources as the NEW PARENT message to which it is responding. For each such source node u such that pending_i(u)=1 and for each link (u, v) in TT_i that is outgoing from source node u but for which the input message does not contain an update, the cost of (u, v) is set to infinity, to indicate that the link should be deleted. In other words, any link that was reported by the old parent but is not reported by the new parent is deleted. Only information from the current parent is considered valid.

The procedure Lex_Dijkstra( ) (not included in Appendix A) is an implementation of Dijkstra's algorithm that computes the lexicographically smallest shortest path LSP(i, u) from node i to each node u, using as path name the sequence of nodes in the path in the reverse direction. For example, the next-to-last node of LSP(i, u) has the smallest node ID among all possible choices for the next-to-last node. Such paths are computed using a modification of Dijkstra's algorithm in which, if there are multiple choices for the next node to label, the one with the smallest ID is chosen.

The procedure Generate_Updates( ) decides what updates to include in the message to be sent to neighbor nodes. A non-delete update is included for any link (u, v) that is in the new source tree Ti and either is marked as changed or was not in the previous source tree (denoted old source tree Ti). In this case, Ti(u, v).c' is set to Ti(u, v).c, and (u,v) is added to the reported link set Ri if not already in the reported link set Ri. A delete update is included for any link (u, v) that is in the reported link set Ri but is not in the source tree Ti, such that TT_i(u, v).c>TT_i(u,v).c'. In this case, (u, v) is removed from the reported link set Ri. Any links with infinite cost are erased from the topology table TT_i.

The procedure Update_Parents( ) sets the new parent p_i(u) for each source node u to be the second node on the shortest path to node u. If there is no path to node u, p_i(u) is null. If the new parent is different from the old parent, then a NEW PARENT message is sent to the new parent (if it is not null) and a CANCEL PARENT message is sent to the old parent (if it is not null and the link to the old parent is still up). The NEW PARENT messages for all source nodes u having the same new parent are combined into a single message, and CANCEL PARENT messages are similarly combined.

The procedure Process_New_Parent( ) is executed when a NEW PARENT message is received from some neighbor node. For each source node u in the NEW PARENT message, the procedure adds the neighbor node to children_i(u) and includes in the PARENT RESPONSE message an update for each link (u, v) in the source tree Ti whose head is source node u, if such a link exists. (Such a link will not exist if node u is a leaf of source tree Ti.) As described above, the PARENT RESPONSE also includes the same list of sources as the NEW PARENT message to which it is responding. (This list is not necessary if the node sending the NEW PARENT message remembers the list and can match the PARENT RESPONSE to the NEW PARENT message.)

When the cost of a link to a neighbor node j changes, node i sets TT_i(i, j).c to the new cost and calls the procedure Update( ) with k=i and an empty input message. A threshold rule can be used so that TT_i(i, j).c is updated only if the percent difference between the new cost and the old cost is at least some given threshold. If a link to a neighbor node j fails, the same procedure is followed (with the cost changing to infinity), and node j is removed from set of neighbor nodes Ni.

When a link to a neighbor node j comes up, either initially or upon recovering from a failure, node i executes the procedure Link_Up(l, j), which adds neighbor node j to the set of neighbor nodes Ni, sets TT_i(i, j).c to the link cost, and calls the procedure Update( ) with k=i and an empty input message. This may result in a NEW PARENT message being sent to neighbor node j.

To correct errors that may appear in TT_i due to noisy transmissions or memory errors, each node i can periodically generate updates for its outgoing links. Since a received update is ignored unless it has a cost that differs from the entry in the topology table TT_i, the cost of the periodic update should be chosen to be slightly different from the previous update. Alternatively, each update can contain an additional bit b, which toggles with each periodic update.

Figure 5:
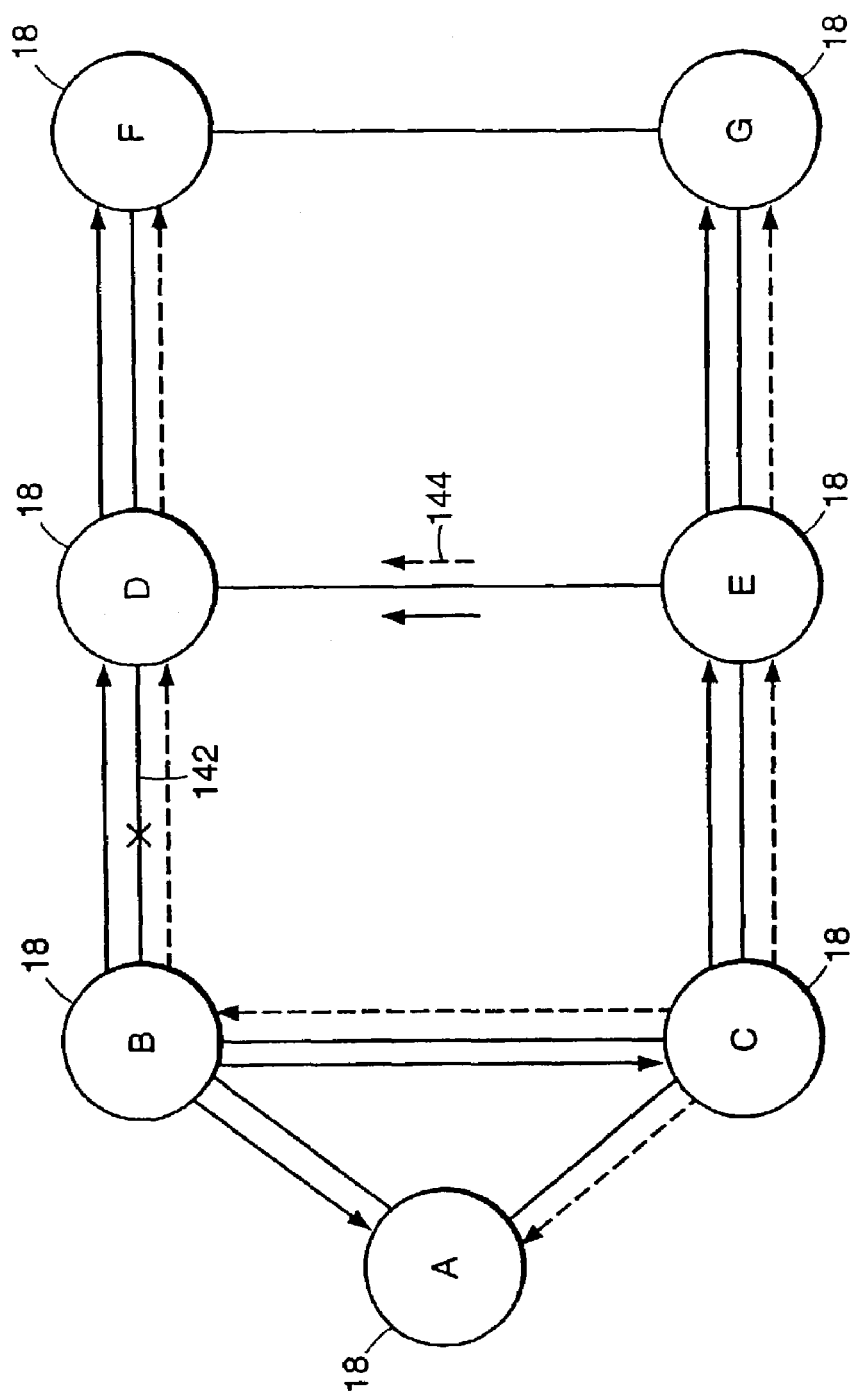
FIG. 5 is a block diagram illustrating the operation of a partial topology version of the TBRPF protocol.

FIG. 5 illustrates the operation of the second partial-topology embodiment of the TBRPF protocol when a communication link 142 between nodes B and D in the subnet 10 fails. The minimum-hop-path tree for source node B before the link failure is shown with solid arrows; the minimum-hop-path tree for source node C is shown with dashed arrows. As shown node A selects node B as parent for source nodes B, D, and F, and selects node C as parent for source nodes C, E, and F. Therefore, node B reports link-state changes to node A only for links (B, A), (B, C), (B, D), and (D, F), and node C reports link-state changes to node A only for links (C, A), (C, B), (C, E), and (E, G). Neither nodes B or C would report a link-state change affecting link (F, G) to node A. Thus, unlike the full-topology embodiment of the TBRPF, in which each node 14 has link information for every link in the subnet 10, the nodes 18 of this partial-topology embodiment have link-state information for less than every link in the subnet 10.

If link (B, D) fails, as shown in FIG. 5, node B reports to nodes A and C that link (B, D) has failed (cost=infinity). Node C reports to node A that link (E, D) 144 has been added to node C's minimum-hop-path source tree. After receiving these updates, node A selects node C as its new parent for source nodes D and F, and sends a NEW PARENT message to node C and a CANCEL PARENT message to node B. Node C responds by sending node A an update only for link (D, F), because link (D, F) is the only link in node C's minimum hop-path source tree with node D or node F as the head of a link. For example, node F is the head of the link (F, G), but the link (F, G) is not in node C's minimum-hop-path source tree and is therefore not reported to node A. Although the minimum-hop-path source tree of node A is modified during the update process, node A does not generate any updates because it has no children for any source other than itself (i.e., node A).

TBRPF Protocol Messages

To disseminate link-state updates to the appropriates nodes in the subnet 10, neighboring router nodes 14 that have established bidirectional links and performed data link to IPv4 address resolution using TBRPF neighbor discovery (as described below) exchange TBRPF protocol messages. The IPv4 addresses are therefore available for use as node IDs in TBRPF protocol messages.

In one embodiment, the TBRPF protocol messages are sent via the User Datagram Protocol (UDP), which requires an official UDP-service port-number registration. The use of UDP/IPv4 provides several advantages over a data link level approach, including (1) IPv4 segmentation/reassembly facilities, (2) UDP checksum facilities, (3) simplified application level access for routing daemons, (4) IPv4 multicast addressing for link state messages.

TBRPF protocol messages are sent to the IPv4 unicast address of a current neighbor or to the "All_TBRPF_Neighbors" IPv4 multicast address, presuming that an official IPv4 multicast address is assigned to "All_TBRPF_Neighbors." In general, a message is sent to the IPv4 unicast address of a current neighbor node if all components of the message pertain only to that neighbor. Similarly, a message is sent to the All_TBRPF_Neighbors IPv4 multicast address if the message contains components which pertain to more than one neighbor neighbors. Nodes 14 are prepared to receive TBRPF protocol messages sent to their own IPv4 unicast address or the All_TBRPF_Neighbors multicast address.

Actual addressing strategies depend on the underlying data link layer for example, for data links such as IEEE 802.11, a single, multiple access channel is available for all unicast and broadcast/multicast messages. In such cases, since channel occupancy for unicast and multicast messages is identical, it is advantageous to send a single message to the All_TBRPF_Neighbors multicast address rather than multiple unicast messages, even if the message contains components that pertain to only a subset of the current neighbor nodes. In other cases, in which point-to-point receiver directed channels are available, sending multiple unicast messages may reduce contention on the multiple access broadcast channel.

Atomic TBRPF Message Format

Figure 6:
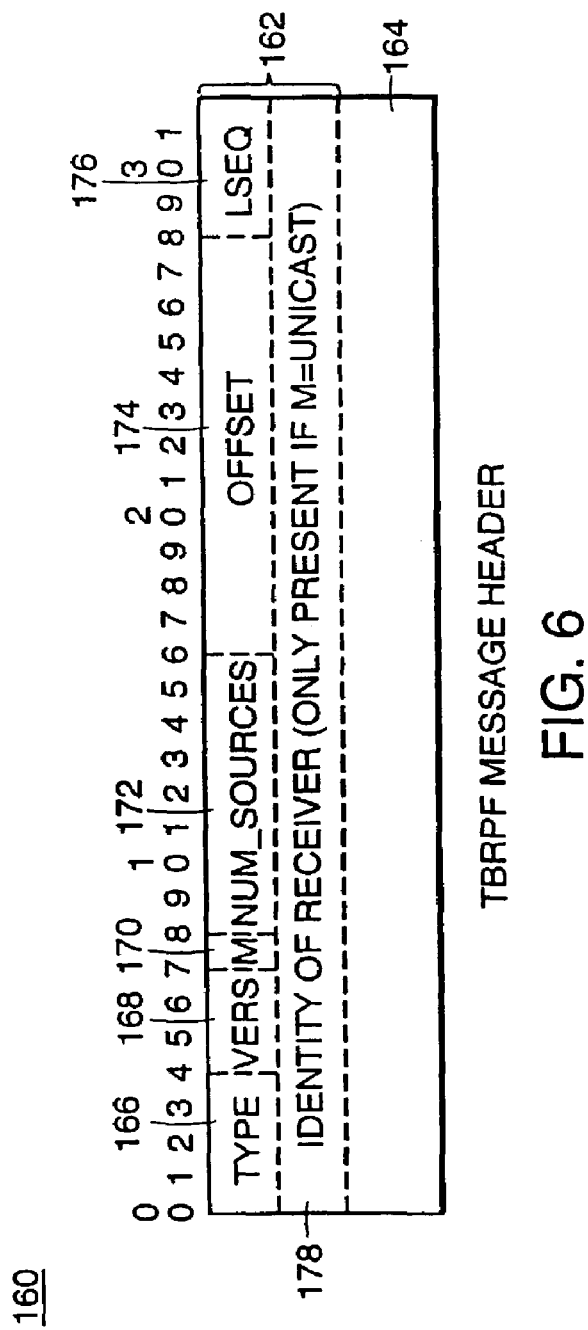
FIG. 6 is a diagram of an embodiment of a format of a message header for an atomic TBRPF protocol message.

FIG. 6 shows an exemplary embodiment of an individual (atomic) TBRPF protocol message 160 including a message header 162 followed by a message body 164. Atomic messages may be transmitted either individually or as components of a compound TBRPF protocol message having multiple atomic messages within a single UDP/IPv4 datagram. TBRPF message headers 162 are either 32-bits or 64-bits in length depending on whether the atomic message is BROADCAST or UNICAST.

The message header 162 includes a type field 166, a version field 168, a mode field 170, a number of sources field 172, an offset field 174, a link sequence number field 176, and a receiver identification field 178, which is used when the mode is defined as UNICAST.

The type filed 166 (e.g., 4 bits) represents the atomic message type. The following are examples of atomic message types:

| | |
|---|---|
| ACK | 1 |
| NACK | 2 |
| NEW_PARENT | 3 |
| CANCEL_PARENT | 4 |
| HEARTBEAT | 5 |
| END_OF_BROADCAST | 6 |
| LINK_STATE_UPDATE_A | 7 |
| LINK_STATE_UPDATE_B | 8 |
| RETRANSMISSION_OF_BROADCAST | 9 |

The version field 168 (e.g., 3 bits) represents the TBRPF protocol version and provides a transition mechanism for future versions of the TBRPF protocol. Also, the version 168 can assist the node 18 in identifying false messages purporting to be TBRPF protocol messages.

The mode field 170 (e.g., 1 bit) represents the transmission mode for the atomic TBRPF protocol message 160; the mode is either UNICAST or BROADCAST. UNICAST refers to an atomic message that must be processed by only a single neighbor node. BROADCAST refers to an atomic message that is to be processed by all neighbor nodes. (For IPv4 subnets, UNICAST implies a specific IPv4 unicast address, whereas BROADCAST implies the All_TBRPF_Neighbors IPv4 multicast address.) The following exemplary mode bits are defined:

| | |
|---|---|
| UNICAST | 0 |
| BROADCAST | 1 |

Messages of type ACK, NACK, NEW_PARENT, CANCEL_PARENT, RETRANSMISSION_OF_BROADCAST, and END_OF_BROADCAST are sent as UNICAST. Messages of type LINK_STATE_UPDATE_A and LINK_STATE_UPDATE_B may be sent as either UNICAST or BROADCAST.

The number of sources field 172 (e.g., 8 bits) represents the number of sources "Num_Sources" included in the atomic message 160. The field 172 takes a value from 1 to 255 for messages of type: NEW_PARENT, CANCEL_PARENT, LINK_STATE_UPDATE_A, and LINK_STATE_UPDATE_B. All other message types are set Num_Sources=0.

The offset field 174 (e.g., 18 bits) represents the offset (in bytes) from the 0'th byte of the current atomic message header 162 to the 0'th byte of the next atomic message header 162 in the "compound message" (described below.) An offset of 0 indicates that no further atomic messages follow. The 18-bit offset field 174, for example, imposes a 4-kilobyte length restriction on individual atomic messages.

The sequence number field 176 (e.g., 4 bits) represents the link sequence number ("LSEQ") for this TBRPF protocol message 160.

The receiver identification field 178 (e.g., 32 bits) represents the IPv4 address of the receiving node which is to process this atomic message 160. All nodes 18 other than the node identified by the identification field 178 do not process this atomic message 160. This field 178 is used only if the mode field 170 is set to UNICAST.

Compound TBRPF Protocol Message Format

Figure 7:
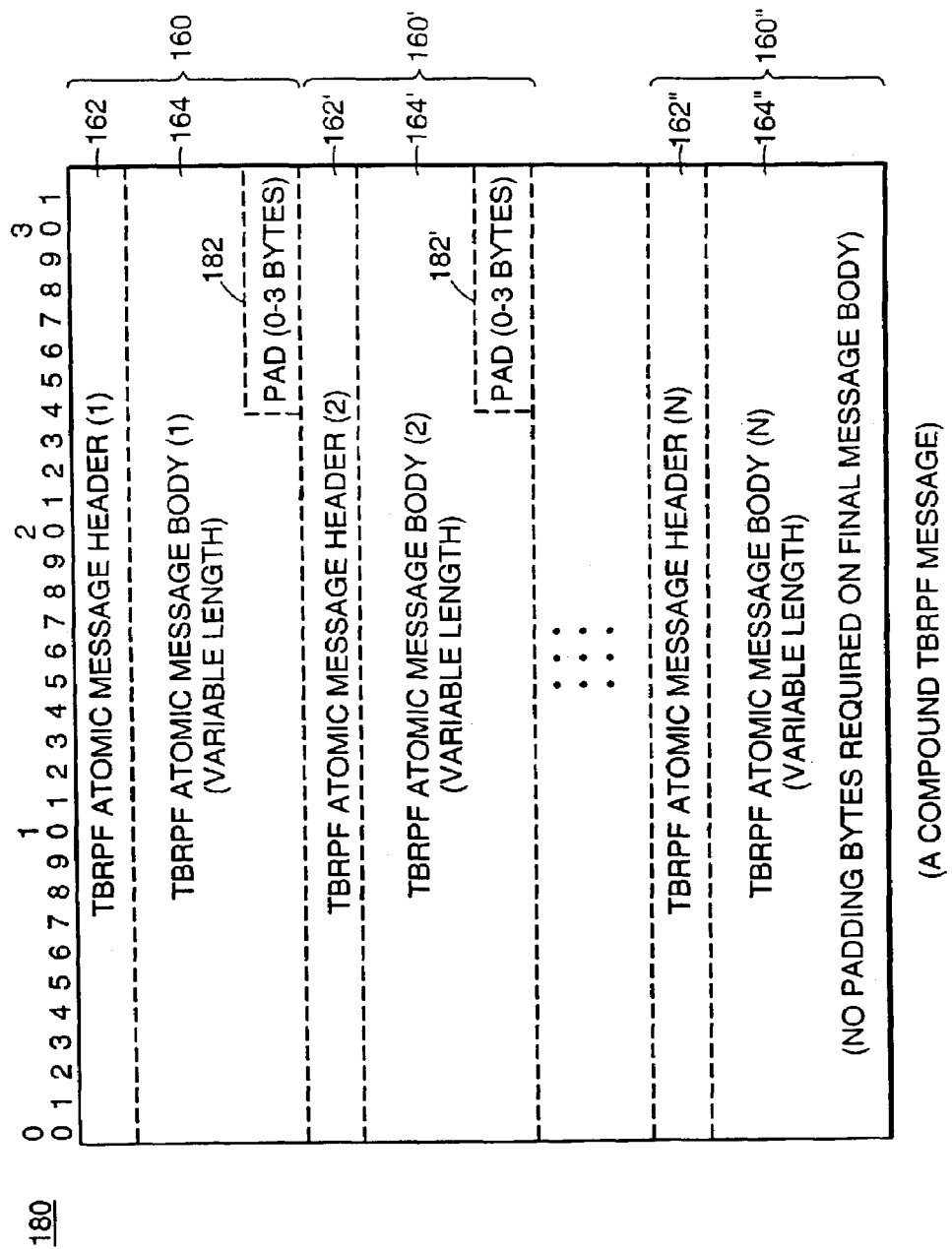
FIG. 7 is a diagram of an embodiment of a format of a compound TBRPF message.

FIG. 7 shows the format for a compound TBRPF protocol message 180, which includes multiple (i.e., "N") atomic TBRPF messages 160, 160', 160" that are concatenated to form the compound message 180 within a single UDP/IPv4 packet. Atomic message headers 162, in one embodiment, are aligned on 32-bit boundaries, therefore an atomic message body 164 with a non-integral number of 32-bit words includes 1, 2 or 3 padding bytes 182, 182' preceding a subsequent message header 162', 162", respectively.

TBRPF Atomic Message Body Format

The format of the atomic message body 164 depends on the value in the type field 166 in the corresponding message header 162. The following are exemplary formats for an atomic message body 164.

ACK

The ACK message carries a NULL message body. A 4-bit acknowledgment sequence number (from 0 . . . 15) is carried in the LSEQ field 176 of the TBRPF message header 162.

NACK:

Each NACK message is a 16-bit vector. Each bit indicates whether each of the last 16 messages prior to the 4-bit sequence number supplied in the LSEQ field 176 of the TBRPF message header 162 was received or lost. As described above, the LSEQ field 176 is set to the sequence number of the last broadcast message received from the neighbor node to which the NACK is being sent.

NEW PARENT:

FIG. 8A shows an embodiment of an exemplary format 186 for a NEW PARENT message. The format 186 includes one or more source node identity fields 188, 188', 188" (generally 188) and one or more corresponding sequence number fields 190, 190', 190" (generally 190). Each source node identity field 188 holds a value (e.g., 32 bits) representing the IPv4 address of that source node. Each sequence number field 190 holds a value (e.g., 16 bits) representing a sequence number for the corresponding source node. The FIG. 8A shows the message format for an even number of source nodes. FIG. 8B shows an alternative ending 192 for the NEW PARENT message format 186 for an odd number of source nodes.

CANCEL PARENT:

FIG. 9 shows an embodiment of an exemplary format 194 for a CANCEL PARENT message. The format 194 includes one or more source node identity fields 196, 196', 196" (generally 196) for including the IPv4 address of each source node for which the CANCEL PARENT message applies.

HEARTBEAT:

In one embodiment, the HEARTBEAT message has an eight-bit length and holds a sequence number for the broadcast channel.

END OF BROADCAST:

In one embodiment, the END_OF_BROADCAST message has an eight-bit length and holds a sequence number for the broadcast channel.

Link-State Update Messages:

The TBRPF protocol provides two formats for two types of link-state update messages. One type of link-state update message, referred to as type LINK_STATE_UPDATE_A, includes a single sequence number for each source node, and is therefore used only if the updates for all links coming out of the same source have the same sequence number. (For example, periodic updates have this property.) This is done to reduce the message size. The second type of link-state update message, referred to as type LINK_STATE_UPDATE_B, includes a separate sequence number for each link.

Figure 10A:
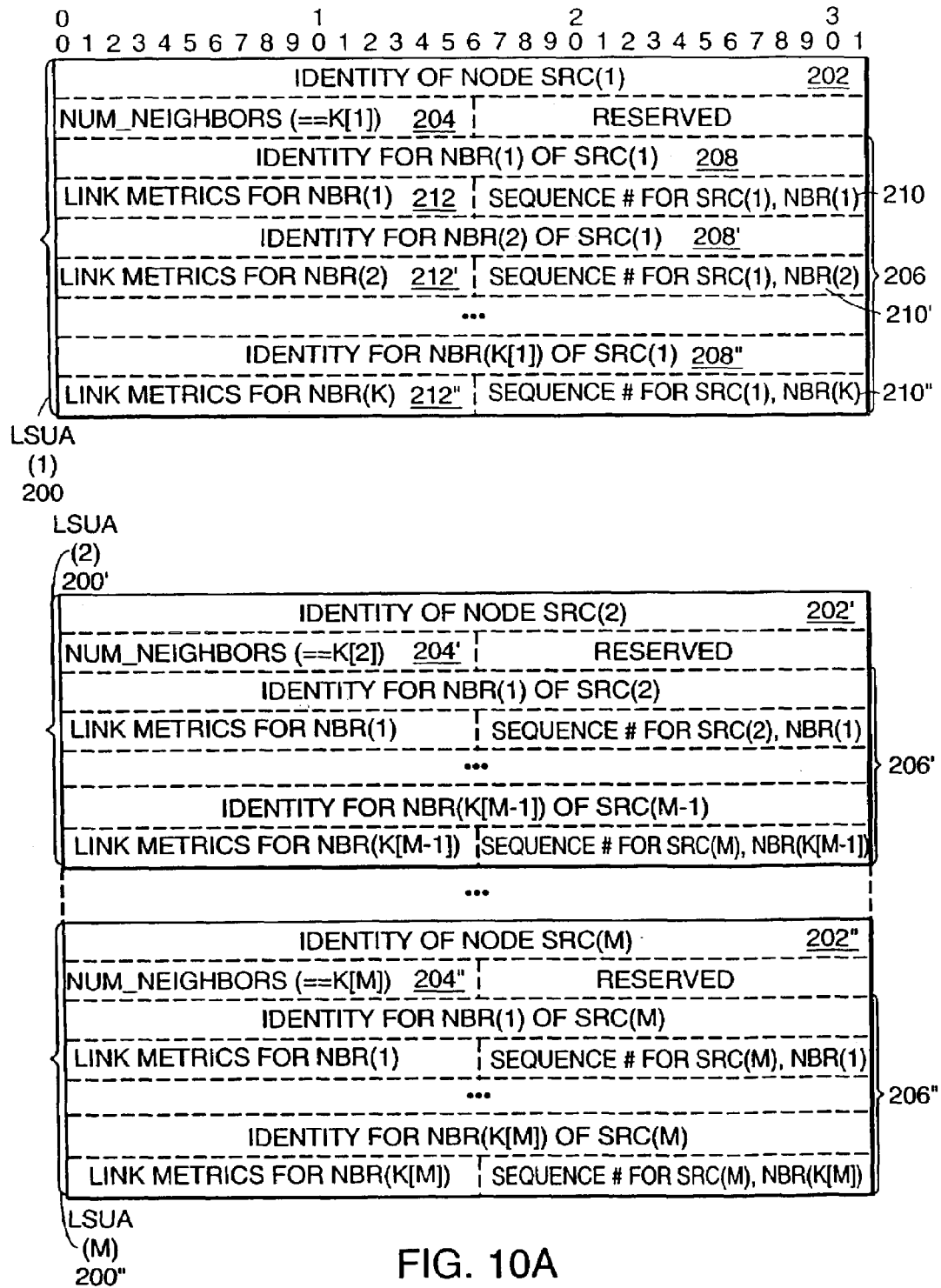

FIG. 10A shows an embodiment of an exemplary format 198 for one type of link-state update message, LINK-STATE_UPDATE_A. The format 198 includes one or more link-state updates ("IsuA") 200, 200', 200" (generally 200). Each IsuA 200 represents an update message with respect to a particular source node and includes a source node identity field 202, 202', 202" (generally 202), a number of neighbor nodes field 204, 204', 204" (generally 204), and one or more neighbor node sections 206, 206', 206" (generally 206). For each neighbor node listed in a particular IsuA 200, each neighbor node section 206 includes a neighbor-node identity field 208, 208', 208" (generally 208), a sequence number field 210, 210', 210" for corresponding source nodes and neighbor nodes, and a link metrics field 212, 212', 212" (generally 212) for that neighbor node.

The source node identity field 202 holds a value (e.g., 32-bits) for the IPv4 address of the corresponding source node. The number of neighbor nodes field 204 holds a value (e.g., 16 bits) representing the number of neighbor nodes of the corresponding source node. The neighbor-node identity field 208 holds the IPv4 address of a neighbor node of the corresponding source node. The sequence number field 210 holds a value (e.g., 16 bits) representing a sequence number for the corresponding source and neighbor node. The link metrics field 212 holds a value (e.g., 32 bits) representing the link metrics associated with the neighbor node of the corresponding source node.

FIG. 10B shows an embodiment of an exemplary format 220 for the second type of link-state update message, LINK-STATE_UPDATE_B. The format 220 includes one or more link-state updates ("IsuB") 222, 222', 222" (generally 222). Each IsuB 222 represents an update message with respect to a particular source node and includes a source node identity field 224, 224', 224" (generally 224), a number of neighbor nodes field 226, 226', 226" (generally 226), a sequence number field 228, 228', 228" (generally 228), and one or more neighbor node sections 230, 230', 230" (generally 230). For each neighbor node listed in a particular IsuB 222, each neighbor node section 230 includes a neighbor-node identity field 232, 232', 232" (generally 232), and a link metrics field 234, 234', 234" (generally 234) for that neighbor node.

The source node identity field 224 holds a value (e.g., 32-bits) for the IPv4 address of the corresponding source node. The number of neighbor nodes field 226 holds a value (e.g., 16 bits) representing the number of neighbor nodes of the corresponding source node. The sequence number field 228 holds a value (e.g., 16 bits) representing a sequence number for the associated with the source and neighbor nodes. The neighbor-node identity field 232 holds the IPv4 address of a neighbor node of the source node. The link metrics field 234 holds a value (e.g., 32 bits) representing the link metrics associated with the neighbor node of the corresponding source node.

Figure 11:
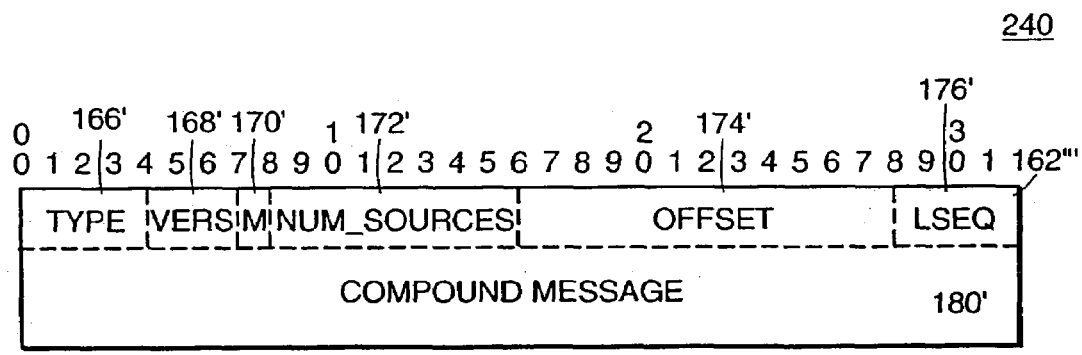
FIG. 11 is a diagram of an embodiment of an exemplary format of a RETRANSMISSION_OF_BROADCAST message.

RETRANSMISSION OF BROADCAST:

In brief, a RETRANSMISSION_OF_BROADCAST message provides the retransmission of a compound update message in response to a NACK message. This compound message may contain one or more atomic messages of type LINK_STATE_UPDATE_A or LINK_STATE_UPDATE_B concatenated together. FIG. 11 shows an embodiment of an exemplary format 240 of a RETRANSMISSION_OF_BROADCAST message including a message header 162''' and a compound message 180'. The message header 162''', like the message header 162 of the atomic message format 160 described above, includes a type filed 166', a mode field 170', a number of sources field 172', an offset field 174', and a link sequence number field 176'. The type field 166' is set to RETRANSMISSION_OF_BROADCAST (e.g., =9), and the number of sources field 172' is set to 0. The offset field 174' is the offset (in bytes) from the 0'th byte of the current compound message header to the 0'th byte of the next compound message header 162' in the RETRANSMISSION_OF_BROADCAST message 240. A 16-bit offset value enables concatenation of compound messages 180' up to 64 kilobytes in length.

As described above, broadcast update messages can be retransmitted on unicast or broadcast channels. For retransmission on a unicast channel, the mode field 170' is set to UNICAST (e.g., =0) and the atomic message header 162''' precedes the compound message 180' The LSEQ field 176' holds the sequence number corresponding to the unicast channel on which the message is sent. The LSEQ field 176 of each atomic message in the compound message 180' is the broadcast sequence number that was included in the original (broadcast) transmission of the message. Multiple RETRANSMISSION_OF_BROADCAST messages can be bundled into a compound message 180' as described above.

Selecting a Routing Path for Transmitting Packets

Routing protocols can also be classified according to whether they find optimal (shortest) routes or sub-optimal routes. By not requiring routes to be optimal, it is possible to reduce the amount of control traffic (including routing updates) necessary to maintain the routes. However, optimal routes are desirable because they minimize delay and the amount of resources (e.g., bandwidth and power) consumed. The TBRPF protocol computes optimal routes based on the advertised link states; however, the advertised link states themselves may be approximate in order to reduce the frequency at which each link is updated.

In the full-topology embodiment of the TBRPF protocol, each routing node 14 has complete link-state information. Each routing node 14 then applies a path selection algorithm to compute preferred paths to all possible destinations, and to update these paths when link states are updated. One exemplary path selection algorithm is to apply Dijkstra's algorithm to compute shortest paths (with respect to cost, c) to all destinations. In other embodiments, the TBRPF protocol can employ any other path selection algorithm. Once preferred paths are computed, the routing table entry for node u is set to the next node on the preferred path to node u. If minimum-hop routing is desired, then the routing table entry for node u can be set to the parent p_i(u).

2. Neighbor Discovery

Each routing node 14 running the TBRPF protocol uses a neighbor discovery protocol to detect the establishment of new links to new neighbor nodes and the loss of established links to existing neighbor nodes. In general, the neighbor discovery protocol dynamically establishes bi-directional links and detects bi-directional link failures through the periodic transmission of HELLO messages. The neighbor discovery protocol is both automatic and continuous, and may include a data link-to-IPv4 address resolution capability. Because the neighbor discovery protocol is responsible for both link state maintenance and data link-to-IPv4 address resolution in the subnet 10, the neighbor discovery protocol operates as a data-link-level protocol.

Figure 12:
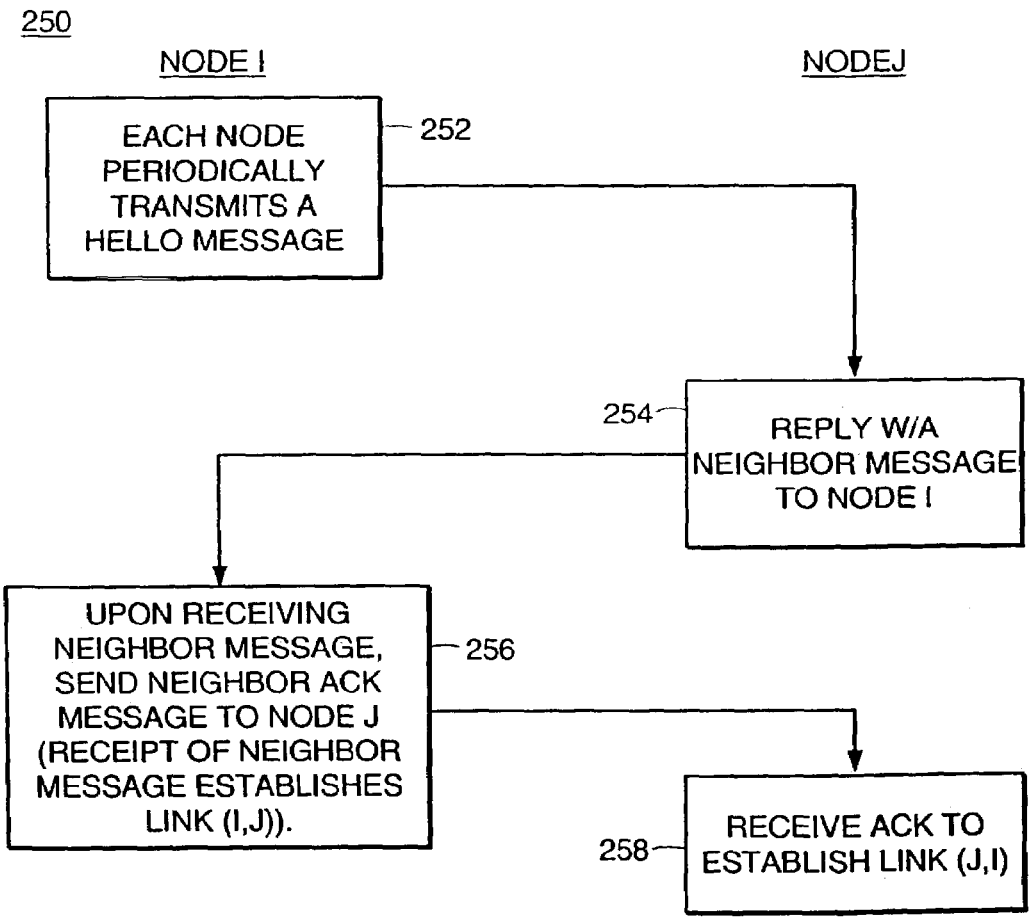
FIG. 12 is a flow diagram of an embodiment of a process performed by the nodes of the subnet to achieve neighbor discovery.

FIG. 12 shows an exemplary embodiment of a process 250 used by the nodes 18 to perform neighbor discovery. The process uses the following three types of control messages: HELLO, NEIGHBOR, and NEIGHBOR ACK. This embodiment of the neighbor discovery protocol operates as follows. Every each node i in the subnet periodically transmits (step 252) a HELLO message at predetermined (e.g., HELLO_INTVL=0.5 seconds) timeout intervals. (The HELLO_INTVL value is common to all nodes 18 within the subnet 10, but different subnets may use different HELLO_INTVL values.) HELLO messages are sent to the data link level broadcast address and includes the identity of transmitting node i.

A node j receiving a HELLO message from a new neighbor, node i, responds (step 254) with a NEIGHBOR message containing the identity of node j, sending the NEIGHBOR message to the data link unicast address of the new neighbor node i. Then, upon receiving the NEIGHBOR message, node i sends (step 256) a NEIGHBOR ACK to node j using the data link unicast address of node j. The NEIGHBOR ACK message contains the identity of node i. The NEIGHBOR and NEIGHBOR ACK messages also contain the current link-level sequence number for the broadcast channel (discussed below). Thus, a link from node i to node j is established by node i receiving a NEIGHBOR packet from node j, and a link from node j to node i is established by node j receiving a NEIGHBOR ACK packet from node i. The link to an existing neighbor is declared to be down if no traffic (including HELLO messages and ACKs) has been received from the neighbor node within a predetermined time interval (e.g., within the last LINK-DOWN_INTVL=2.0 seconds).

Implementations of this embodiment of the neighbor discovery protocol should detect the event of a data link-to-IP address mapping change for existing links. This may occur in one of the following instances:
1. Two or more nodes in the subnet 10 are using the same IP address.
2. An existing node in the subnet 10 has changed its data link layer address.
3. A new node is now using the IP address of a former node that may have left the subnet 10.

In the first case, the implementation should print some form of "duplicate IP address detected" message to the console. In the second and third instances, the cached link state should be updated to reflect the new data link-to-IPv4 address mapping.

Figure 13:
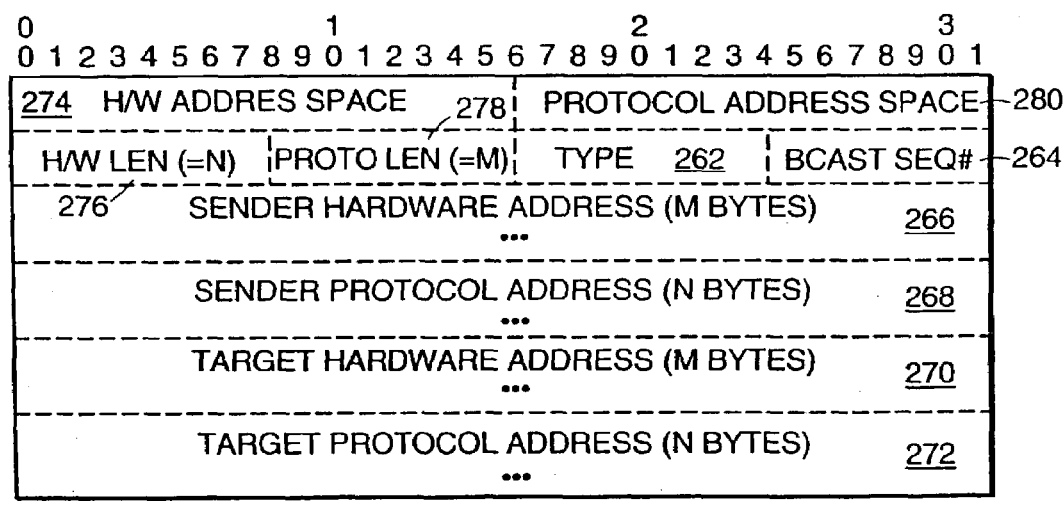
FIG. 13 is a diagram of a packet format for the protocol messages used for neighbor discovery.

FIG. 13 shows an exemplary embodiment of a packet format 260 for the HELLO, NEIGHBOR, and NEIGHBOR ACK neighbor discovery protocol messages on the subnet 10. The data link header for each message is not shown, since it is specific to the underlying data link layer.

The eight-bit "Type" field 262 indicates the type of message. For example, each message can be identified by the following examples of values in the Type field 262:

| HELLO | 10 |
| NEIGHBOR | 11 |
| NEIGHBOR_ACK | 12 |

The eight-bit "BCAST Seq#" field 264 indicates a sequence number from 0 . . . 15 (4 bits), used in NEIGHBOR and NEIGHBOR ACK messages as described above. The four address fields (sender hardware address 266; sender protocol address 268; target hardware address 270; target protocol address 272) facilitate the address resolution process. The fields 266, 268, 270, and 272 contain the following examples of values, based on the type of neighbor discovery message:

Message type is HELLO
  Sender Hardware Address 266: data link address of sender
  Sender Protocol Address 268: IPv4 address of sender
  Target Hardware Address 270: data link broadcast address
  Target Protocol Address 272: unused
Message type is NEIGHBOR
  Sender Hardware Address 266: data link address of sender
  Sender Protocol Address 268: IPv4 address of sender
  Target Hardware Address 270: sender H/W Address from received HELLO
  Target Protocol Address 272: sender IP Address from received HELLO
Message type is NEIGHBOR ACK
  Sender Hardware Address 266: data link address of sender
  Sender Protocol Address 268: IP address of sender
  Target Hardware Address 270: sender H/W address from NEIGHBOR
  Target Protocol Address 272: sender IP address from NEIGHBOR Usage of the other fields 274, 276, 278, and 280 in the packet 260 are described "An Ethernet Address Resolution Protocol: Or Converting Network Protocol Addresses To 48.Bit Ethernet Addresses For Transmission On Ethernet Hardware," by David C. Plummer, Request for Comments (RFC) No. 826, November 1982.

Reduced Overhead Hello Protocol

Another embodiment of the neighbor discovery protocol, hereafter referred to as Reduced Overhead Hello Protocol (ROHP), is suited for MANETs. As described further below, the ROHP is suited for MANETs because the protocol can operate correctly although an asymmetric (unidirectional) link may exist between any two nodes at any time, link states may change frequently due to node mobility and interference, and the channel may be noisy so that not all transmitted packets are successfully received by all neighbor nodes. An objective of ROHP is to allow each node 18 in the MANET 10 to quickly detect the neighbor nodes with which that node 18 has a direct and symmetric link, (i.e., a bi-directional link such that the node at each end of the link can hear the other node.) The ROHP also detects when a symmetric link to some neighbor no longer exists.

In brief overview, the ROHP reports each change in the state of a neighbor node (e.g., "heard", "symmetric", or "lost") in only the next K HELLO messages, where K is a small positive integer (e.g., K=3 to 5) such that a node declares a neighbor to be "lost" if it does not receive any complete HELLO message from that neighbor node within a time period equal to K number of time intervals. Each time interval is hereafter referred to as HELLO_INTERVAL, which is for example 0.5 to 2 seconds. In contrast, each HELLO message of conventional neighbor discovery protocols (e.g., as in OSPF and OLSR (Optimized Link-State Routing Protocol)) includes the identities (or addresses) of all neighbors.

Neighbor Table

Each node 18 maintains a neighbor table, which has an entry for each known neighbor node and stores state information for that neighbor node. An entry for neighbor node B, for example, contains the following variables:

state(B): The current state of the link to neighbor node B, which can be "heard", "symmetric", or "lost".

hold_time(B): The amount of time (in seconds) remaining before state(B) must be changed to "lost" if no further complete HELLO message from B is received.

counter(B): The number of subsequent HELLO messages that include the identity of the neighbor node B in the list corresponding to state(B).

The entry for neighbor node B may be deleted from the table if state(B) remains equal to "lost" for a period not less than K*HELLO_INTERVAL.

Three possible states of a neighbor node B have the following meaning at node A:

"Heard": A complete HELLO message was received from neighbor node B within the last K*HELLO_INTERVAL seconds, but it is unknown whether neighbor node B can hear node A.

"Symmetric": Nodes A and B can hear each other.

"Lost": No complete HELLO message has been received from neighbor node B within the last K*HELLO_INTERVAL seconds.

Sending HELLO Messages

Each node 18 sends a HELLO message periodically every HELLO_INTERVAL seconds, possibly with a small jitter to avoid repeated collisions. Because of message size limitations that may be imposed by the MANET 10, a HELLO message may be too large to send within one packet, in which case, the sending node 18 sends the HELLO message in multiple packets within a period equal to the HELLO_INTERVAL. Depending on the implementation of the ROHP, the receiving node may or may not be able to extract information from a partially received HELLO message.

A HELLO packet sent by a node includes the following information:

1). The identity (e.g., IP address) of the sending node.
2). A list of all neighbor nodes that recently changed to the "heard" state. More specifically, a list of identities of neighbor nodes B such that state(B)="heard" and counter(B)>0.
3). A list of all neighbor nodes that recently changed to the "symmetric" state. More specifically, a list of identities of neighbor nodes B such that state(B)="symmetric" and counter(B)>0.
4). A list of all neighbor nodes that recently changed to the "lost" state. More specifically, a list of identities of neighbor nodes B such that state(B)="lost" and counter(B)>0.

Whenever a neighbor node B is included in one of the above three lists, counter(B) decrements by 1. As a result, each state change is included in at most K HELLO messages, and in some cases (as described below) is not included in any HELLO message. HELLO messages can also contain other information, as discussed below.

Receiving a HELLO Message

Figure 14:
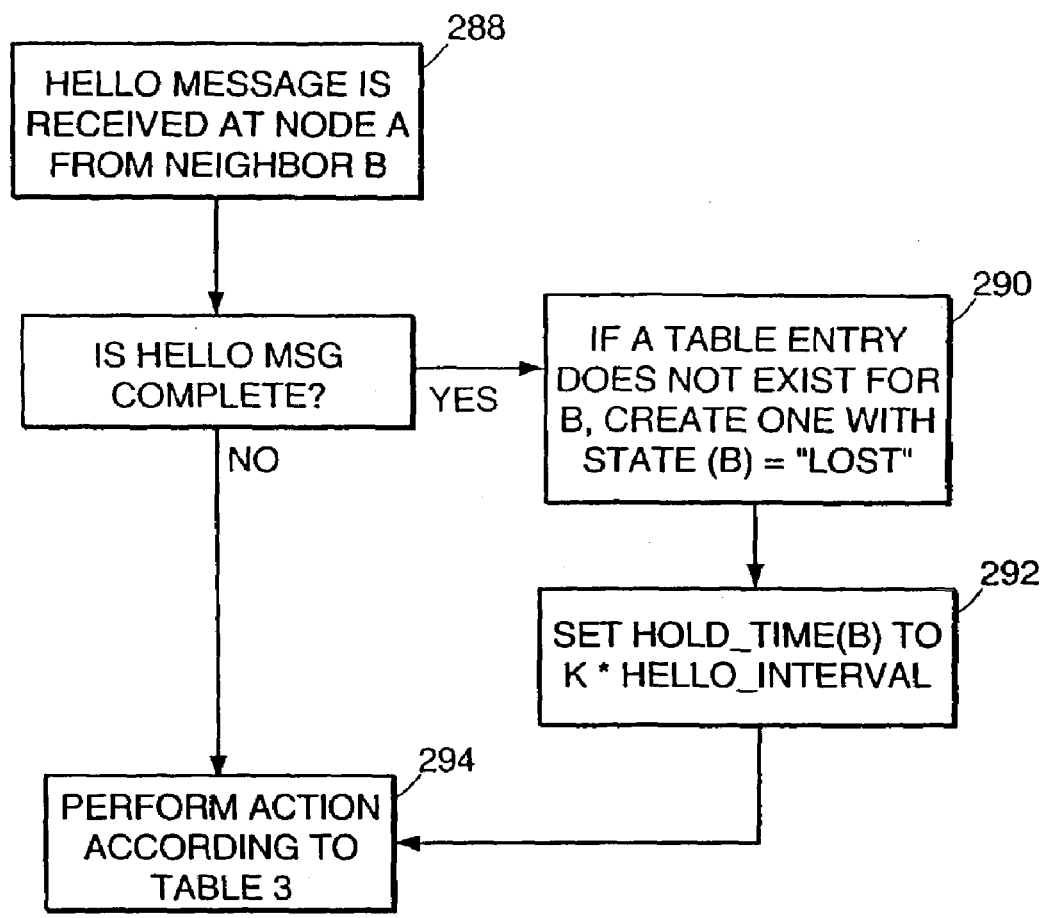
FIG. 14 is a flow diagram of another embodiment of a process for performing neighbor discovery.

FIG. 14 shows an exemplary embodiment of a process by which each node 18 operating according to the ROHP neighbor discovery processes a received HELLO message. In step 288, a node (referred to as receiving node A) receives a partial or complete HELLO message. Because a HELLO message must be transmitted within a time interval of length HELLO_INTERVAL, the receiving node A declares the HELLO message to be partial if not all of its parts have been received within a time interval of this length. If the HELLO message is complete and an entry for neighbor node B does not exist in the table, the receiving node A creates (step 290) such an entry with state(B)="lost". If the HELLO message is complete, receiving node A also sets (step 292) the variable hold_time(B) to K*HELLO_INTERVAL. The value of the variable hold_time(B) decreases to 0 (expires) if no HELLO message from neighbor node B is subsequently received within K*HELLO_INTERVAL seconds. When hold_time(B) expires, the receiving node A sets state(B) to "lost" and counter(B) to K. This indicates that the receiving node A is to include the identity of node B is in the list of "lost" neighbor nodes in the transmission of the next K HELLO messages or until state(B) changes again (whichever occurs first).

The receiving node A then performs (step 294) an action based on whether the received HELLO message is complete, whether the receiving node A appears in a list within the received HELLO message, and if so, which list, and the current state of the neighbor node B (i.e., state(B)). The actions performed by the receiving node A are summarized in Table 3 below.

TABLE 3

| | Action | | | |
|---|---|---|---|---|
| state(B) | Receiving node A is in not in any list | Receiving node A is in "lost" list | Receiving node A is in "heard" list | Receiving node A is in "symmetric" list |
| lost | If msg is complete, set state(B) to "heard" and counter(B) to K | If msg is complete, set state(B) to "heard" and counter(B) to K | If msg is complete, set state(B) to "symmetric" and counter(B) to K | If msg is complete, set state(B) to "symmetric" and counter(B) to K |

TABLE 3-continued

| | Action | | | |
|---|---|---|---|---|
| state(B) | Receiving node A is in not in any list | Receiving node A is in "lost" list | Receiving node A is in "heard" list | Receiving node A is in "symmetric" list |
| heard | No action | No action | Set state(B) to "symmetric" and counter(B) to K | Set state(B) to "symmetric" and counter(B) to 0 |
| symmetric | No action | Set state(B) to "heard" and counter(B) to 0 | If counter(B) = 0, set counter(B) to K | Set counter(B) to 0 |

Accordingly, upon receiving a complete or partial HELLO message from neighbor node B, the action performed by the receiving node A is as follows.

1. If state(B)="lost" and the HELLO message is complete, and if the message does not include node A in any list or includes node A in the "lost" list, then set state(B) to "heard" and counter(B) to K. If state(B)="lost" and the HELLO message is complete, and if the message includes node A in the "heard" or "symmetric" list, then set state(B) to "symmetric" and counter(B) to K.
2. If state(B)="heard" and the message includes node A in the "heard" list, then set state(B) to "symmetric" and counter(B) to K. If state(B)="heard" and the message includes node A in the "symmetric" list, then set state(B) to "symmetric" and counter(B) to 0. (In this case, the receiving node A need not include node B in its HELLO messages, since both nodes A, B already know that the link is symmetric.)
3. If state(B)="symmetric" and the message includes node A in the "heard" list and counter(B)=0, then set counter (B) to K. If counter(B)>0, then counter(B) need not be set to K, because the "heard" entry is just a repeat of one that was included in a recently received HELLO message from B. If state(B)="symmetric" and the message includes node A in the "symmetric" list, then set counter(B) to 0. (Both nodes know that the link is symmetric.) If state(B)="symmetric" and the message includes receiving node A in the "lost" list, then set state(B) to "heard" and counter(B) to 0. (node B cannot hear node A, but node A can hear node B.)

Note that a complete HELLO message must be received in order to create a new entry in the neighbor node table or to change the state of a neighbor node from "lost" to "heard" or to "symmetric." This prevents the creation of a link that has poor quality.

Variations of ROHP

In other embodiments, HELLO messages can be augmented to include enough information to inform each neighbor node of the set of neighbor nodes with which the sending node has symmetric links. This can be accomplished by setting the counter(B) to K, rather than to 0 (see case 2 above), so that node B is included in the "symmetric" list of the next K HELLO messages, even though nodes A and B already know that the link between them is symmetric.

In addition, node A can inform any new neighbor node of the set of neighbor nodes with which node A has symmetric links. Node A can distribute this information by (a) including the set of all neighbor nodes to which symmetric links exist in the next K HELLO messages, whenever the state of the new neighbor node changes to "symmetric"; or (b) sending this information in a separate message that is unicast reliably to the new neighbor node.

HELLO messages can also be augmented to include other information, such as link metrics, sequence numbers, states of non-adjacent links, time stamps, designated routers, special relays, and other data.

The ROHP can be used in conjunction with any routing protocol that uses HELLO messages for neighbor discovery, such as TBRPF (described herein), OSPF, and OLSR. An advantage of the ROHP over existing neighbor discovery protocols, such as those discovery protocols used within OSPF and OLSR, is that ROHP employs HELLO messages that on average are smaller than such neighbor discovery protocols because each neighbor state change observed by a node is included in at most K HELLO messages (unlike OSPF and OLSR), resulting in reduced communications overhead and bandwidth consumption. In addition, because HELLO messages are smaller, they can be sent more frequently, resulting in a faster detection of topology changes.

3. IPv6-IPv4 Compatibility Address Format

Referring back to the subnet 10 in FIG. 1, assume, for example, that the nodes 18 of subnet 10 belong to one domain, and that the gateway 16 is the border gateway 16 for that domain. Assume also that both the IP host A 12 and the gateway 16 are IPv6 nodes 18, and that the other nodes 18 in the subnet 10 are IPv4 nodes, without any IPv6 routing capability. Any route taken by packets sent by the IP host A 12 to the server 40 on the Internet 30 necessarily traverses IPv4 infrastructure to reach the gateway 16. To communicate across the subnet 10 with the heterogeneous IP infrastructure, the IP host 12 and the gateway 16 use an aggregatable, global, unicast addresses, hereafter referred to as an "IPv6-IPv4 compatibility address." The use of IPv6-IPv4 compatibility addresses enables IPv6 nodes (1) to forward IPv6 packets across native IPv6 routing infrastructure or (2) to automatically tunnel IPv6 packets over IPv4 routing infrastructure without requiring a pre-configured tunnel state. A routing node 14 with an IPv6-IPv4 compatibility address can serve as a router for nodes 18 with native IPv6 addresses (i.e., IPv6 addresses that are not IPv6-IPv4 compatibility addresses) connected to the same link. On behalf of such native IPv6 nodes, the IPv6-IPv4 routing node 14 can automatically tunnel messages across the IPv4 infrastructure of the subnet 10 to reach the border gateway 16.

Figure 15A:
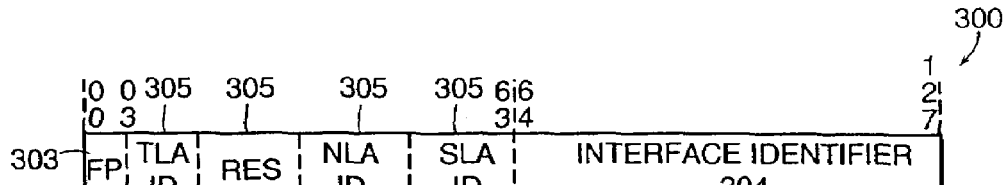
FIG. 15A is a diagram of a format for an IPv6 address including a prefix and an interface identifier.

FIG. 15A shows an exemplary embodiment of a format 300 for IPv6-IPv4 compatibility addresses. The format 300 includes a 64-bit address prefix 302 and a 64-bit interface identifier 304. The address prefix 302 specifies a standard 64-bit IPv6 routing prefix, such as that described in the Internet RFC (request for comment) #2374. The address prefix 302 includes a 3-bit Format Prefix (FP) 303, which for all IPv6-IPv4 compatibility addresses is set to "001", and aggregation identifiers 305. Consequently, the format prefix 303 and the topologically correct aggregation identifiers 305 of the IPv6-IPv4 compatibility addresses are the same as those of IPv6 addresses assigned to IPv6 nodes, enabling IPv6 nodes to route IPv6 packets using IPv6-IPv4 compatibility addresses across IPv6 infrastructure. The 64-bit interface identifier 304 is a specially constructed 64-bit global identifier interface identifier (i.e., 64-bit EUI-64).

Figure 15B:
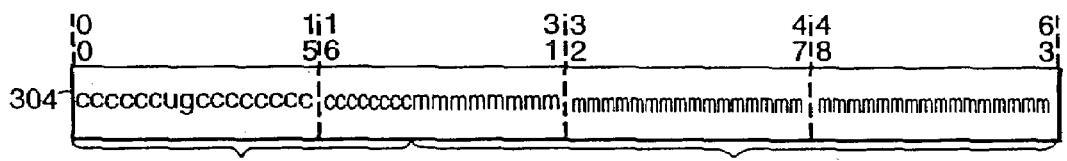
FIG. 15B is a diagram of an embodiment of the interface identifier including a 24-bit company identifier concatenated with a 40-bit extension identifier.

FIG. 15B shows an embodiment of the interface identifier 304 including a 24-bit company identifier 306 concatenated with a 40-bit extension identifier 308. In one embodiment, the 24-bit company identifier 306 is a special IEEE Organizationally Unique Identifier (OUI) reserved by the Internet Assigned Numbers Authority (IANA) for supporting the IPv6-IPv4 compatibility addresses. The IEEE Registration Authority (IEEE/RAC) assigns the OUI to an organization and the organization owning that OUI typically assigns the 40-bit extension identifier 308. In FIG. 15B, the string of 'c's represents the company-specific bits of the OUI, the bit 'u' represents the universal/local bit, the bit 'g' represents the individual/group bit and the string of 'm's are the extension identifier bits. Here, when the bit 'u' equals 1, the scope of the address is global and when the bit 'u' equals 0, the scope is local.

To support encapsulation of legacy IEEE EUI-48 (24-bit) extension identifier values, the first two octets of the 40-bit extension identifier 308 (i.e., bits 24 through 39 of the address) are set to 0xFFFE if the extension identifier 308 encapsulates an EUI-48 value. Further, the first two octets of the extension identifier 308 are not set to 0xFFFF, as this value is reserved by the IEEE/RAC. All other 40-bit extension identifier values are available for assignment by the addressing authority responsible for a given OUI. Thus, as described further below, the IPv6-IPv4 compatibility address format 300 enables embedding an IPv4 address in an IPv6-IPv4 compatibility address without sacrificing compliance with the EUI-64 bit format.

Figure 15C:
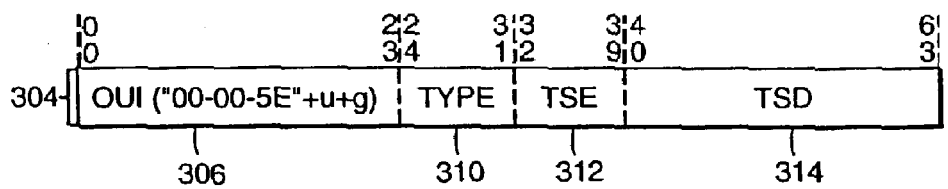
FIG. 15C is a diagram of an embodiment of the interface identifier including a 24-bit company identifier concatenated with the 40-bit extension identifier.

FIG. 15C shows an embodiment of the interface identifier 304 including an OUI field 306, a type field 310, a type-specific extension field (TSE) 312, a type-specific data field (TSD) 314. As shown, the OUI field 306 includes the OUI of IANA, (e.g., 00-00-5E), with 'u' and 'g' bits. The type field 310 indicates how the TSE 312 and TSD 314 fields are interpreted; in general, the type field 310 indicates whether the interface identifier 304 encapsulates an IPv4 address that is suitable for automatic intra-subnet IPv6-in-IPv4 tunneling. Table 1 shows the interpretations of TSE and TSD for various values in the type field 310:

TABLE 1

| TYPE Value | (TSE, TSD) Interpretation |
|---|---|
| 0x00-0xFD | RESERVED |
| 0xFE | (TSE, TSD) together contain an embedded IPv4 address |
| 0xFF: | TSD is interpreted based on the value of TSE as shown in TABLE 2 |

TABLE 2

| TSE Value | TSD Interpretation |
|---|---|
| 0x00-0xFD | RESERVED for future use (e.g., by IANA) |
| 0xFE | TSD contains 24-bit EUI-48 interface identifier |
| 0xFF | RESERVED (e.g., by IEEE/RAC) |

Thus, if an IPv6-IPv4 compatibility address has TYPE=0xFE, the TSE field 312 is treated as an extension of the TSD field 314, which indicates that the IPv6-IPv4 compatibility address includes a valid IPv6 prefix and an embedded IPv4 address.

If the IPv6-IPv4 compatibility address has TYPE=0xFF, the TSE field 312 is treated as an extension of the TYPE field 310. When TSE=0xFE, the TSD field 314 includes a 240 bit EUI-48 interface identifier. Thus, the IPv6-IPv4 compatibility address format 300 conforms to all requirements of a 64-bit global identifier (i.e., the EUI-64 format) and supports encapsulation of EUI-48 interface identifiers (i.e., when TSE=0xFE). For example, an existing IANA EUI-48 format multicast address such as:

01-00-5E-01-02-03 is written in the IANA EUI-64 format as:

01-00-5E-FF-FE-01-02-03.

Other values for TYPE and, hence, other interpretations of the TSE and TSD fields 312, 314 are reserved for future use.

Figure 15D:
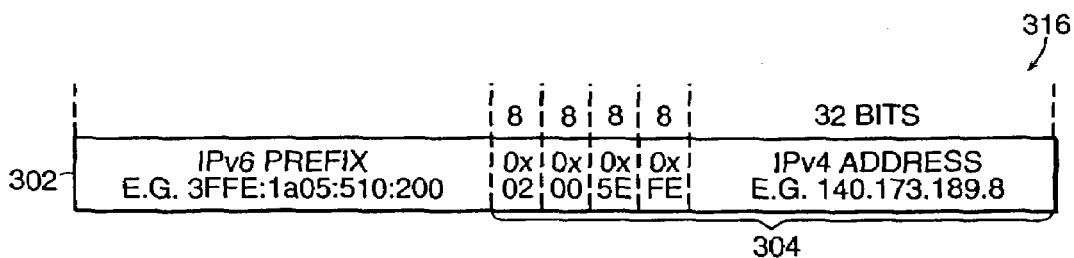
FIG. 15D is a diagram of an IPv6-IPv4 compatibility address.

FIG. 15D shows a specific example of an IPv6-IPv4 compatibility address 316 for a node 18 with an IPv4 address of 140.173.189.8. This IPv4 address may be assigned an IPv6 64-bit address prefix 302 of 3FFE:1a05:510:200::/64. Accordingly, the IPv6-IPv4 compatibility address 316 for this IPv4 node is expressed as:

3FFE:1a05:510:200:0200:5EFE:8CAD:8108

In an alternative form, the IPv6-IPv4 compatibility address 316 with the embedded IPv4 address is expressed as:

3FFE:1a05:510:200:0200:5EFE:140.173.189.8

Here, the least significant octet of the OUI (02-00-5E) in the interface identifier 304 is 0x02 instead of 0x00 because the bit 'u' is set to 1 for global scope.

Similarly, the IPv6-IPv4 compatibility addresses for the link-local and site-local (i.e., within the subnet 10) variants, respectively, of are:

FE80::0200:5EFE:140.173.189.8
  FEC0::200:0200:5EFE:140.173.189.8

Figure 15E:
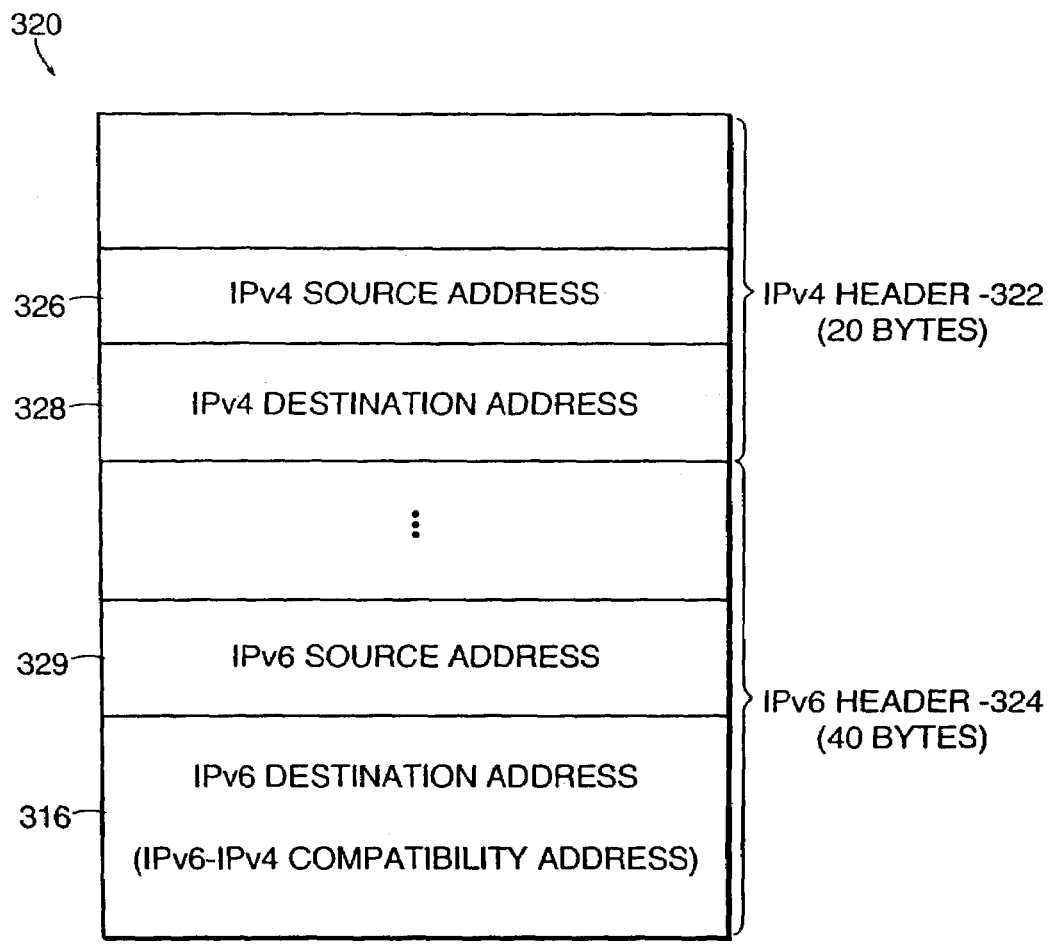
FIG. 15E is a diagram of an embodiment of a message format for tunneling an IPv6-IPv4 compatibility address through IPv4 infrastructure.

As previously noted, the IPv6-IPv4 compatibility address format 300 enables IPv6 nodes to tunnel IPv6 packets through a one-time IPv6-in-IPv4 tunnel across IPv4 routing infrastructure. FIG. 15E shows an embodiment of a packet header 320 used for tunneling IPv6 packets using IPv6-IPv4 compatibility addresses across IPv4 routing infrastructure. In this embodiment, the header 320 includes a 20-byte IPv4 header 322 and a 40-byte IPv6 header 324. The IPv6 header 324 includes an IPv6 address 329 of the node that is the source of the IPv6 packet and an IPv6-IPv4 compatibility address 316 associated with the final IPv6 destination node. The IPv4 header 322 includes the IPv4 address 326 of the dual-stack node that "re-routes" the IPv6 packet by tunneling the IPv6 packet through the IPv4 routing infrastructure. The IPv4 header 322 also includes the IPv4 address 328 of an IPv4 destination node that typically is the same as the IPv4 address embedded within the IPv6 destination address' IPv6-IPv4 compatible interface identifier 304. Alternatively, the IPv4 address 328 can be the IPv4 address 328 of the next-hop IPv6 gateway that has a path to the final IPv6 destination address and, therefore, can forward the IPv6 packet towards the final IPv6 destination node.

Upon receiving the tunneled IPv6 packet, the IPv4 destination node determines that the IPv6 header 324 includes an IPv6-IPv4 compatibility address 316 and can route the IPv6 packet to the IPv6 destination node identified by that IPv6-IPv4 compatibility address.

Address Aggregation

One advantage of embedding an IPv4 address in the interface identifier 304 of an IPv6 address is that large numbers of IPv6-IPv4 compatibility addresses 316 can be assigned within a common IPv6 routing prefix 302, thus providing aggregation at the border gateway 16. For example, a single 64-bit IPv6 prefix 302 for the subnet 10, such as 3FFE:1a05:510:2418::/64, can include millions of nodes 18 with unique IPv4 addresses embedded in the interface identifier 304 of the IPv6-IPv4 compatibility addresses. This aggregation feature allows a "sparse mode" deployment of IPv6 nodes throughout a large Intranet comprised predominantly of IPv4 nodes.

Globally and Non-Globally Unique IPv4 addresses

Another advantage is that IPv6-IPv4 compatibility addresses 316 support subnets that use globally unique IPv4 address assignments and subnets that use non-globally unique IPv4 addresses, such as when private address assignments and/or network address translation (NAT) are used.

Non-Globally Unique IPv4 Addresses

IPv4 addresses need not be globally unique but may be allocated through a private network-addressing scheme that has meaning only within the context of that domain. IPv6-IPv4 compatibility addresses for private IPv4 addresses set the 'u' bit to 0 for local scope. For example, a node with the private, non-globally unique IPv4 address 10.0.0.1 can be assigned the IPv6-IPv4 compatibility address of
> 3FFE:1a05:510:200:0000:5EFE:10.0.0.1, which uses the same example IPv6 64-bit prefix and IANA OUI (00-00-5E) described above with the 'u' bit in the EUI-64 interface identifier indicating that this is a local address.

Routing with IPv6-IPv4 Compatibility Addresses

By embedding an IPv4 address in the interface identifier 304 of an IPv6-IPv4 compatibility address 316, IPv6 packets can be routed globally over the IPv6 infrastructure or tunneled locally across portions of the IPv4 infrastructure of the subnet 10 that have no IPv6 routing support. Thus, the compatibility-addressing scheme supports heterogeneous IPv6/IPv4 infrastructures in transition with incremental deployment of IPv6 nodes within the subnet 10.

Intra-domain Routing

Figure 16:
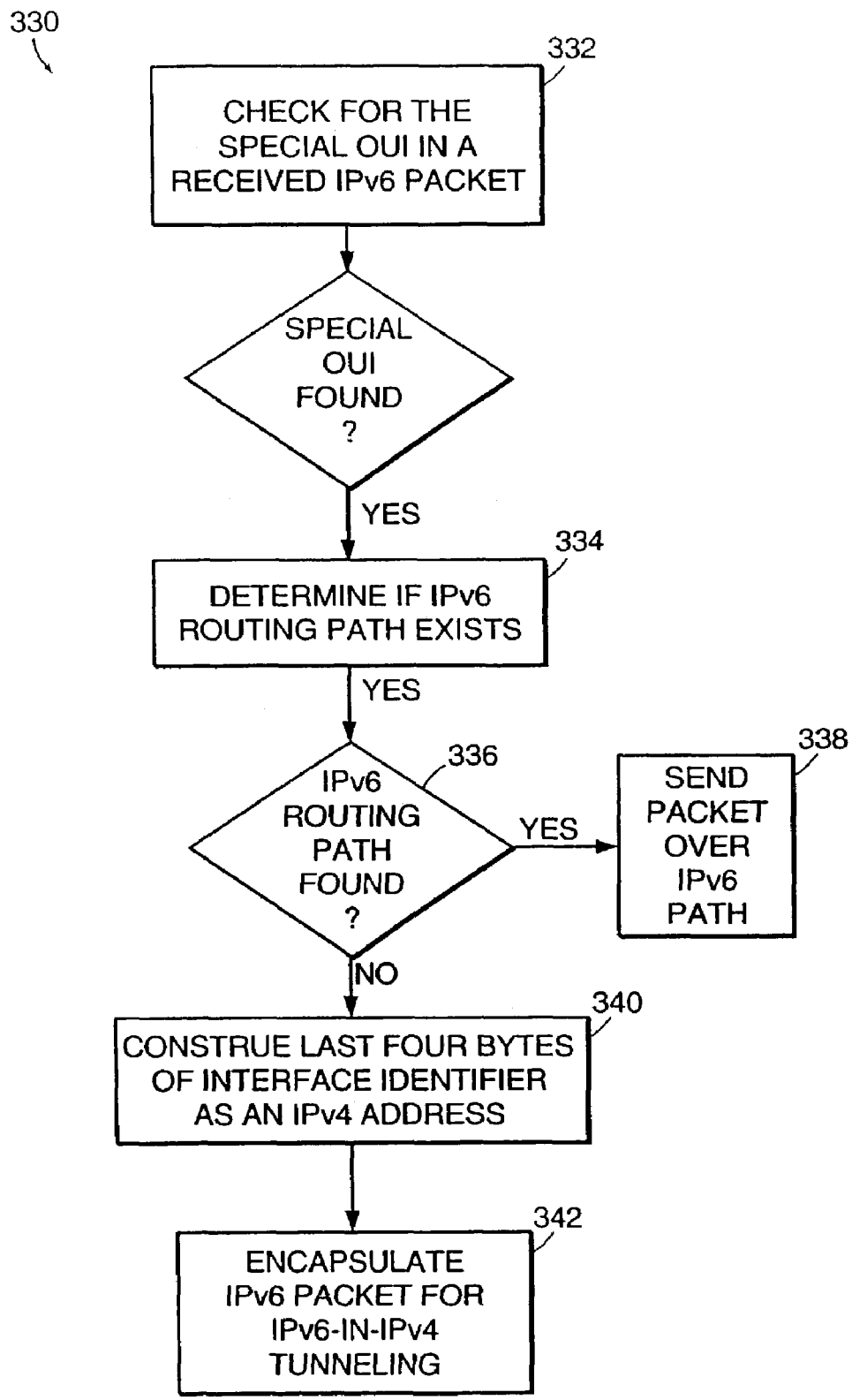
FIG. 16 is a flow diagram of an embodiment of a process by which a router tests an IPv6-IPv4 compatibility address.

FIG. 16 shows an exemplary embodiment of an intra-domain routing process 330 by which a routing node 14, configured with IPv6 and IPv4 routing tables, routes a packet having the IPv6-IPv4 compatibility address. Upon receiving the packet, the routing node 14 has IPv6 node software that checks (step 332) for the special IETF OUI 306 and the type field 310 encapsulated in the interface identifier 304. If the software finds the special OUI 306 and the value of 0xFE in the type field 310, this means that the received packet has an IPv6 prefix and an embedded IPv4 address.

The routing node 14 then determines (step 334) if any IPv6 routing information leads to the destination node 18; that is, if the IPv6 routing table has an entry for 'default' (i.e., the default gateway) or for the IPv6 prefix of the destination node 18. If such an entry is found, the router 14 determines (step 336) whether there is a path through IPv6 routing infrastructure to the gateway 16 for the IPv6 prefix of the destination node 18. If there is such an IPv6 path, then the router 14 sends (step 338) the packet as an IPv6 packet to the IPv6 gateway 16 for that IPv6 prefix.

If no such IPv6 path to the gateway 16 through IPv6 routing infrastructure exists, the routing node 14 construes (step 340) the last four bytes of the extension identifier 308 as an IPv4 address embedded in the IPv6-IPv4 compatibility address. The routing node 14 then determines (step 342) if the IPv4 routing table includes an entry for a prefix of the embedded IPv4 address of the destination.

Upon finding such an entry, the routing node 14 encapsulates (step 342) the IPv6 packet for tunneling through the IPv4 routing infrastructure using the embedded IPv4 address as the destination for the tunneled packet. (The general format for an encapsulated packet is shown in FIG. 15E.) One technique for automatically tunneling the IPv6 packet is described in "Transition Mechanism for IPv6 Hosts and Routers," by R. Gilligan and E. Nordmark, draft-ietf-ngtrans-mech-04.txt (work in progress). This technique can also be applied to the IPv6-IPv4 compatibility address. This implies that the gateway 16 also uses IPv6-IPv4 compatibility addresses.

Inter-domain Routing:

Globally Unique IPv4 Addresses without Privacy Concerns

Where nodes 18 within an heterogeneous IPv6/IPv4 subnet 10 use globally unique IPv4 addresses and where no privacy concerns exist regarding exposure of internal IPv4 addresses to the public Internet, messages may be routed across domain boundaries using the same routing process 330 described above in FIG. 16.

Globally Unique IPv4 Addresses without Privacy Concerns

One advantage of the IPv6-IPv4 compatibility address format 300 is that the format 300 does not necessarily expose the true identification of the sending node, if an administrative authority for the subnet 10 wishes to enforce a policy of not exposing internal IPv4 addresses outside of the subnet 10. To accomplish this, the administrative authority configures the border gateway 16 of the subnet 10 to perform a type of "reverse network address translation," which transforms the IPv6 -IPv4 compatibility address interface identifier 304 with embedded IPv4 address of the sending node into an anonymous ID for inter-domain routing outside the subnet 10. Within the subnet 10, the fully qualified IPv6-IPv4 compatibility address interface identifier 304 with the embedded IPv4 address of the sending node is still used to enable automatic IPv6-in-IPv4 tunneling, and the intra-domain routing of IPv6 packets follows the process 330 described above.

In one embodiment, the border gateway 16 advertises an IPv6 prefix 302 of 2002::/16 and the IPv6 prefix 302 of 2002:V4ADDR/48 where 'V4ADDR' is the globally unique embedded IPv4 address of the border gateway 16. IPv6-IPv4 compatibility addresses within the subnet 10 are constructed as the concatenation of a 2002:V4ADDR/48 prefix, a 16-bit SLA ID, and a 64-bit EUI64 interface identifier 304 as described above.

For example, if the IPv4 address of the border gateway is 140.173.0.1, the IPv4 address of the IPv4 node within the subnet 10 is 140.173.129.8 and the node resides within SLA ID 0x001, the IPv6-IPv4 compatibility address 316 within the subnet is constructed as:
> 2002:8CAD:1:1:0200:5EFE:8CAD:8108, where the '2002:' is a predetermined prefix associated with the reverse network address translation; the '8CAD:1:' is the IPv4 address (140.173.0.1) of the border gateway 16; the second '1:' is the SLA ID; the '0200:5EFE' is the IANA-specific OUI (with the 'u' bit set to global scope and the type field 310 indicating that the compatibility address includes an embedded IPv4 address; and the '8CAD:8108' is the embedded IPv4 address (140.173.129.8) of the internal IPv4 node.

The border gateway 16 performs "reverse network address translation" using an identifier not vulnerable to eavesdropping. The border gateway 16 maintains a mapping of the identifier to the actual IPv4 address of the IPv4 node in order to map messages from destinations back to the actual IPv4 node within the subnet 10. For example, if the border gateway 16 replaced the IPv4 address 140.173.129.8 with the identifier value: 0x00000001, the IPv6-IPv4 compatibility address outside the subnet 10 is constructed as:

2002:8CAD:1:1:0000:5EFE:0:1

Here: again the least significant octet of the EUI-64 interface identifier 304 has the 'u' bit set to 0 to indicate that the embedded IPv4 address is not globally unique.

The IPv6-in-IPv4 tunneling for inter-domain routing then derives the IPv4 source address from the IPv4 address of the numerous separate tunnel transitions for an IPv6 packet traveling from a sending node to a destination node. The transitions include (1) intra-domain tunnels from the IPv6 sending node through routers along the path to the border gateway for its domain, (2) inter-domain tunnels from the sending node's border gateway through other transit routers along the path to a border gateway for the destination, and (3) intra-domain tunnels from the destination node's border gateway through intra-domain routers along the path to the destination node itself. Thus, IPv4 addresses within the subnet are exposed across the public Internet 30.

Non Globally Unique IPv4 Addresses

Embodiments of the subnet 10 that use private, non-globally unique IPv4 addresses require a border gateway 16 that implements an inter-domain routing function as described above. For example, if the IPv4 address of the border gateway 16 is 140.173.0.1, the IPv4 address of an IPv4 node within the subnet 10 is 10.0.0.1, and the IPv4 node resides within SLA ID 0x001, the IPv6-IPv4 compatibility address within the subnet 10 is constructed as:

2002:8CAD:1:1:0000:5EFE:0A00:1, where again the least significant octet of the EUI-64 interface identifier 304 has the 'u' bit set to 0 to indicate that the embedded IPv4 address '0A00:1' (10.0.0.1) is not globally unique.

The administrative authority for such embodiments of the subnet 10 may institute a policy that permits exposing non-globally unique IPv4 addresses to the public Internet 30. In this case, the reverse network address translation is unnecessary, but might be used to protect against eavesdropping on the non-globally unique addresses.

Additional Routing Considerations

In a different embodiment than that described in FIG. 16, each host 12 or router 14 that sends an IPv6 packet to an IPv6-IPv4 compatibility destination address follows the following process:

If the 64-bit IPv6 prefix of the IPv6-IPv4 compatibility destination address matches the 64-bit IPv6 prefix of one of the network interfaces, tunnel the packet through IPv4. Otherwise, route the packet through IPv6.

From the above sending process, a sending node that does not have an interface which shares a common 64-bit routing prefix with the packet's IPv6 -IPv4 compatibility destination address sends the packet to the next-hop gateway determined by an IPv6 routing table lookup. In short, when a sending node does not have an interface which shares a common 64-bit (site-level) routing prefix with an IPv6-IPv4 compatibility destination address, the sending rule is identical to that for a native IPv6 destination address. This decision is independent of whether the sending node has an IPv6-IPv4 compatibility address itself, or whether the sending node even comprises a dual-stack configuration. The sending node can be a native IPv6 node with no legacy IPv4 support.

When a sending node has an interface which shares a common 64-bit routing prefix with an IPv6-IPv4 compatibility destination address, the sending node must assume that the destination is not directly reachable at the data-link level, although the shared site-level routing prefix implies otherwise. Instead, if the sending node comprises a dual-stack configuration, it automatically tunnels the IPv6 packet to the IPv4 address embedded within the IPv6-IPv4 compatibility destination address' interface identifier. If the sending node is an IPv6-only node that does not comprise a dual-stack configuration, however, it has no means for automatically tunneling the packet via IPv4. In this case:

If the sending node is the host that originates the packet, the sending node sends the packet to a router that lists the 64-bit prefix in its router advertisements. If no such router exists, the sending node should drop the packet and return a "No route to host" error indication to the originating application. If the sending node is a router that forwards the packet, the sending node drops the packet and sends an ICMPv6 "Destination Unreachable" message to the source By implication, the scheme breaks down if a packet with an IPv6-IPv4 compatibility destination address reaches an IPv6-only router that has an interface that shares a common 64-bit routing prefix with the IPv6-IPv4 compatibility destination address. Additional mechanisms to address this issue may be possible, such as allowing dual-stack routers to advertise 96-bit prefixes which incorporate the special 32-bit EUI-64 interface identifier prefix: 0200:5EFE. A sending node can then interpret such an advertisement to mean that the advertising router comprises a dual stack and is capable of intra-site IPv6-in-IPv4 tunneling.

Incremental IPv6Deployment Examples

When deploying an IPv6node in a subnet that is predominantly IPv4, the embedded IPv4 address within an IPv6-IPv4 compatibility assigned to that IPv6 node does not need to be globally unique. The embedded IPv4 address needs only be topologically correct for and unique within the context of that subnet 10. Also, when deployed in a predominantly IPv4 subnet, the deployed IPv6 node is unlikely to share a common multiple access data-link with an IPv6 router 14 in the subnet. Because the IPv6 node does not share a common multiple access data-link with the IPv6 router, no router advertisements are available. IPv6-IPv4 compatibility addresses enable the IPv6 node to join the global IPv6 network (i.e., on the Internet 30) by automatically tunneling IPv6 messages through the intra-site IPv4 routing infrastructure. For this purpose, the deployed IPv6 node requires two pieces of static configuration information: the 64-bit IPv6 network prefix for the subnet 10 and the IPv4 address of the dual-stack IPv6 gateway 16 servicing the subnet 10. No other pre-configured tunnel state information is required.

For example, consider a researcher who wishes to configure IPv6 on his existing IPv4 -based workstation, but the network administrators for the subnet 10 have not yet configured an IPv6 router for the workstation's LAN. The researcher is aware of a dual-stack IPv6 router elsewhere within the subnet 10 (which may be several IPv4 router hops away from his workstation's LAN) and sets the 64-bit IPv6 address prefix and IPv4 address of the router as configuration information on his workstation.

This configuration information is used to construct two IPv6-IPv4 compatibility addresses. One is the concatenation of the IPv6 prefix and the IPv4 address of the router to construct the IPv6-IPv4 compatibility address for the router. The researcher's workstation uses this IPv6-IPv4 compatibility address of the router as its default IPv6 gateway address. The second address is the concatenation of the IPv6 prefix and the IPv4 address of the researcher's workstation to construct the IPv6-IPv4 compatibility address which the workstation uses as its own IPv6 source address. The researcher's workstation can now access the global IPv6 Internet 30 by first tunneling messages through the subnet-local IPv4 routing infrastructure to the IPv6 router. The IPv6 router then routes the IPv6 messages. No static configuration information is needed on the IPv6 router on behalf of the researcher's workstation.

As another example, a network administrative authority wishes to configure IPv6 on an existing IPv4 subnet under their jurisdiction, but the subnet is separated from the IPv6 border gateway 16 for the subnet by other IPv4 subnets, which are not ready for IPv6 deployment. The administrator configures a dual-stack IPv6 router (or routers) for his administrative domain by arranging for SLA (site-level aggregation)-based subnet allocation(s) from the owner of the IPv6 border gateway for the subnet. The administrator further sets the 64-bit IPv6 address prefix and IPv4 address of the border gateway as configuration information on his router. The router(s) for the administrative domain can now access the global IPv6 Internet by first tunneling messages through the site-local IPv4 routing domain to the IPv6 border gateway for the site. Hosts and/or other IPv6 routers which share a common multiple access data-link with the router receive router advertisements from which they can construct native IPv6 addresses with topologically-correct 64-bit prefixes and interface identifiers via address autoconfiguration. The IPv6 border gateway for the site need only have routing information that points to the router(s) for the SLA-based subnet allocations.

Automatic Deprecation

As seen in the above deployment examples, the IPv6-IPv4 compatibility address format enables incremental IPv6 deployment for hosts and routers within sites that have incomplete or "sparse" IPv6 coverage at the network infrastructure level. In general, IPv6-IPv4 compatibility addresses are intended for use by nodes 18 that do not receive router advertisements because such nodes 18 do not share a common multiple access data-link with an IPv6 router. When router advertisements become available, such as when an IPv6 router is deployed on a common multiple access data-link shared by the node 18, the node 18 can discontinue use of its IPv6-IPv4 compatibility address and adopt an IPv4 unicast address using address auto-configuration for a prefix discovered through router discovery. In this way, IPv6-IPv4 compatibility addresses can gradually and automatically disappear as IPv6 nodes become widely deployed within the subnet 10. The following automatic deprecation rule for hosts and routers using IPv6-IPv4 compatible addresses can be used to transition from the use of IPv6-IPv4 compatibility addresses:

While no IPv6 router advertisements are received, continue to use the IPv6-IPv4 compatibility address. If router advertisements ensue, discontinue use of the IPv6-IPv4 compatibility address and construct a native IPv6 address based on prefix information carried in the router advertisements.

Address Selection

To ensure efficient routing within the destination's subnet when multiple IPv6 destination addresses alternatives are available, a "second-tier" address selection policy is used for choosing between an IPv6-IPv4 compatibility addresses and a native IPv6 address. If multiple alternatives remain after address selection has been applied on the 64-bit routing prefixes, and if at least one of the remaining alternatives is constructed with a native IPv6 interface identifier (one that does not contain an embedded IPv4 address), select a native IPv6 address. Otherwise, select an IPv6-IPv4 compatible address.

4. Updating Information upon Resuming Interrupted Communications

Referring again to FIG. 1, assume that the mobile node 12, hereafter "client 12", and the server 40 are communicating over a route or path through the subnet 10 that includes one or more wireless links. Movement by the client 12 or by another node 14 in the subnet 10 may cause the client 12 to move in and out of communication range of the subnet 10. For example, the client 12 may move to a new position in the subnet 10 (as indicated by arrow 27) or to the foreign subnet 20 (as indicated by arrow 29). While moving, the client 12 may break current a communication link (e.g., link 24) to the subnet 10 and be out of range of all routing nodes 14 within the subnet 10. As another example, the node B may move out of range of the client 12, placing the client 12 out of range of the subnet 10 if the client 12 is not within range of another routing node 14 in the subnet 10. Consequently, the client 12 is not communicating with the server 40 and may not access information, particularly updated information, from the server 40. The inability to obtain updated, timely information may cause resources associated with the client 12 to be inefficiently used and adversely affect the operation of the client 12.

To lessen any adverse impact of client movement, the client 12 and the server 40 can (1) use message queues to store communications affected by an interruption for subsequent transmission if communications between the client 12 and the server 40 are resumed; and (2) use bandwidth adaptation techniques to maintain a persistent connection between the client 12 and the server 40 although a route between the client 12 and the server 40 is momentarily lost.

Message Queues

The client 12 may register an interest in certain data on server 40. In one embodiment, the data are an object. Objects, as will be appreciated by those skilled in the art, are generally programming units that include data and functionality, and are instances of classes. For example, the client 12 may be interested in updated information pertaining to particular objects. In one embodiment, server 40 may also include meta-objects, which are objects that have no physical representation, and are classes with methods and attributes that serves as a factory to create new objects.

Meta-objects may not be instantiated, (i.e., meta-objects generally do not provide a representation of a physical object). Instead, meta-objects may serve as templates from which objects that represent physical objects are constructed.

The client 12 maintains local copies of objects on the server 40 and updates these objects, as necessary, when communicating with the server 40. Relevant objects associated with the server 40 may be replicated, (i.e., databases associated with server 40 may be replicated), on the client 12 to provide the client 12 with the local copies of objects. Local copies provide the client 12 with access to relatively up-to-date information should the client 12 move out of the communications range of the subnet 10, interrupting communications with the server 40. While the link 24 is broken, the local copies of the objects, which are active entities, can continue to run on the client 12. Then when the client 12 moves back into the communications range of subnet 10 or the subnet 20 and reestablishes communications with the server 40 over the same or a different route, the server 40 can provide the client 12 with updated, or current, information. That is, the server 40 may update the local copies of the objects that are present on the client 12 in, for example, a local cache.

In general, because communications between the server 40 and the client 12 are synchronous, the server 40 is aware of all objects that are associated with the client 12. Server 40 may then be able to save state information associated with the client 12. Therefore, server 40 may restore the current state of the client 12 as appropriate (e.g., when lost link 24 is re-established). It should be appreciated, however, that server 40 is generally not aware of any semantics with regards to objects. Rather, the server 40 is only aware that objects have been updated, and, further, that the corresponding updates should be forwarded to the client 12 as appropriate.

Server 40 includes an object list that is a list of all objects associated with the server 40 and which are to be updated. In other words, the object list is a queue of object updates. The client 12 may communicate substantially with the server 40 after the client 12 is registered with respect to server 40. That is, client 12 may send commands to server 40. In one embodiment, such commands include lists of topics in which the client 12 is interested. The server 40 may send update messages to the client 12 to indicate that certain objects on the client 12 should be updated such that the states of the objects on the client 12 are consistent with the states of the corresponding objects on the server 40. The client 12 also includes an object list, (i.e., a client object list), that contains substantially all objects that are associated with the client 12. In general, the new client object list contains all objects, which are associated with the server 40 and which the client is "interested" in.

The client 12 communicates with the server 40 over a route (or path) through the subnet 10 or subnet 20 determined by the routing nodes 14. The client 12 may transmit data to the server 40 directly or through a message queue. The client 12 queues data on the message queue when, for example, data has been modified and is to be sent to the server 40. Specifically, when the client 12 creates or modifies data, the data is sent to the server 40 through the message queue. The communications between the client 12 and the message queue may, in the described embodiment, be performed using a potentially unreliable communications link (e.g., wireless link), while the communications between the message queue and server 40 are typically more reliable, (e.g., wired link).

Data is placed on the message queue by the client 12, and is removed from the message queue by the server 40 or, more specifically, communications software associated with server 40. Data is removed from the message queue after the data has been successfully received by the server 40.

When the client 12 creates data (e.g., objects), the client 12 typically associates that data with a unique identifier that is used by the client 12 and the server 40 to identify that data. One example of a unique identifier is a timestamp. The associated timestamp is updated each time the data are updated or modified by the client 12. A timestamp essentially prevents data conflicts from arising when more than one client attempts to modify that data at a given time. Specifically, timestamps are monotonically increasing such that substantially no data conflicts between unique identifiers can arise. Other embodiments use different mechanisms to uniquely identify data, such as an authorization level that is associated with the users of a particular client; a priority level that is associated with the particular type of data, and the order in which the data are received (e.g., LIFO, FIFO).

Similarly, the server 40 can communicate directly to the client 12 or through a message queue (s), or lists, for storing objects in which the client 12 has indicated an interest. The message queue(s) can be part of or separate from the server 40. Hence, data may be transmitted to the client 12 from the server 40 through such message queues. In other words, the server 40 may use substantially the same heuristics as the client 12 for sending data. Data is placed on the message queue by the server 40 and removed from the message queue by the client 12. Again, data is removed from the message queue when the client 12 has successfully received previously removed data.

5. Adaptive Use of Network Bandwidth

In general, within the subnet 10, which includes wireless links, a variety of different failures can interrupt or cause a communications outage. For example, a failure may be due to a hardware problem at either the client 12 or the server 40. A failure may also be the result of a software problem, (e.g., data may be successfully received but acknowledgement of the receipt may fail). Failures may also occur because of problems with links, as mentioned previously. Such failures may include a failure of any link on a route between the client 12 and the server 40. It should be appreciated that in some cases, more then one failure may occur at any given time.

To adaptively handle interruptions in communications between the client 12 and the server 40, the internetworking system 2 may run diagnostics to determine the cause of the interruption. After the cause is determined, the system 2 makes corrections that restore communications. Depending upon current system parameters, such adaptive corrections include, but are not limited to attempting (1) to reestablish the same interrupted connection between the client 12 and the server 40, (2) to establish a connection between the client 12 to a redundant server, or (3) to establish a new connection between the client 12 with the server 40. Other techniques used alone or in combination with the aforementioned corrections include varying and/or increasing the waiting period between unsuccessful attempts to establish a connection the client 12 and the server 40 and adjusting the length of transmitted packets. Such techniques can be used in response to current bandwidth conditions in the subnet 10.

When a "network dropout" occurs in the subnet 10, (e.g., when the client 12 or the server 40 appears to be out of communication with the subnet 10), standard client-server systems, such as those based upon TCP/IP, typically operate under the assumption that the failure is due to network congestion. As will be understood by those skilled in the art, although a network dropout in a low-bandwidth, wireless subnet may indeed occur as a result of network congestion, the network dropout may also occur for a variety of other reasons including, but not limited to, packet loss due to coverage problems.

Packet loss associated with a network typically involves either the failure of transmission of a packet of data or the loss of some of the data transmitted in a packet. Although packet losses can occur for any number of reasons, packet losses often occur when the client 12 is at least temporarily out of range of the subnet 10 or when a communication link in the route between the client 12 and the server 40 is temporarily interrupted.

By counting the number of packets sent and the total number of packets acknowledged, the packet loss in a system may be determined. Measuring packet loss enables the manner in which packets are resent or rebroadcast to be dynamically changed such that the resending of packets is substantially optimized with respect to the network.

The internetworking system 2 can use the measure of packet loss to determine the length of packets that are transmitted between the client and the server 40. For example, if packets with lengths of 1000 bytes experience a 15% packet loss, and packets with lengths of 100 bytes experience a 1% packet loss, then the client 12 and server 40 can tune the length of transmitted packets to minimize the percentage of packets that fail to reach their destination. A factor in determining the packet length is the tradeoff between data throughput and the percentage of packet loss. That is, the smaller the packet length, the greater the percentage of packets that reach their destination, but the lower the percentage of payload (i.e., data) transmitted in each packet because each packet also carries a number of overhead bits.

Also, the client 12 and the server 40 can dynamically adjust the packet length based upon packet loss measurements that are taken periodically. The client 12 and/or the server 40 can make such packet length adjustments. Further, the client 12 can use a packet length that differs from the packet length used by the server 40; packets transmitted from the client 12 to the server 40 may take a different route with different bandwidth capabilities than packets transmitted from the server 40 to the client 12.

When a network dropout occurs due to network congestion, repeated attempts may be made to reconnect a "dropped out" client 12 or server 40 to the subnet 10. If a network dropout occurs due to packet loss and attempts are made to reconnect the client 12 or the server 40 to the subnet 10, the overall performance of the subnet 10 may degrade to a point where the overall performance of the subnet 10 is unacceptable. That is, attempting to initiate a connection that in fact has not been lost may preclude other connections from being made, thereby preventing the transmission of data which would be made across those connections.

Although a variety of different methods may be used to actually determine if a network dropout is the result of network congestion or of packet loss, such a determination may be made using ongoing statistical measurements. Alternatively, the speed at which data is transmitted may be changed. Typically, when a network dropout is due to packet loss, changing the speed of data transmission often solves the network dropout. However, when network dropout is due to network congestion, changing the speed of data transmission may have no effect and may worsen the throughput.

In order to enable communications to be optimized to reflect actual network conditions, the client-server system may measure the roundtrip time for packet transmission. That is, the amount of time that elapses while a packet of data is transmitted from the client 12 to the server 40, or vice versa, may be measured. Although the measurements may be used for substantially any purpose, the measurements are often used to characterize the quality of a connection or route between the client 12 and the server 40. By way of example, for certain networks the duration of a roundtrip can indicate whether a connection is good; short roundtrips are associated with good connections, while long roundtrips are associated with poor connections. The measurements of roundtrip times for a variety of different packets may further be used to statistically determine how long to wait between attempts to resend an unsuccessfully sent packet.

Figure 17:
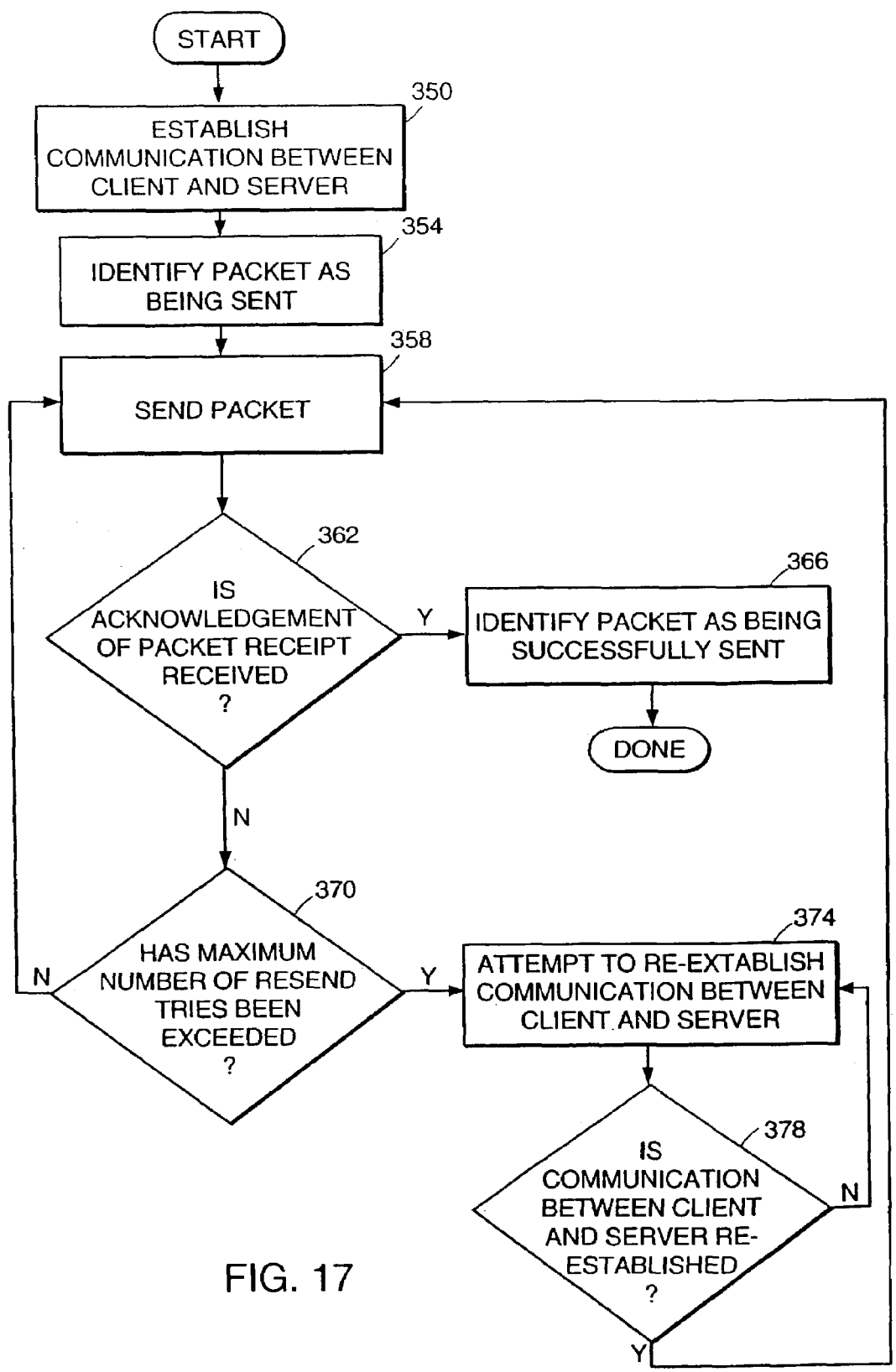
FIG. 17 is a flow diagram of an embodiment of a process by which a mobile node and a server exchange messages.

FIG. 17 shows an embodiment of a process used by the client 12 and the server 40 establish and maintain a persistent connection in a dynamically changing network environment using the above-described bandwidth adaptation techniques. Although the process is described generally from the perspective of the client 12 sending messages to the server 40, the process also applies to when the server 40 sends messages to the client 12. The process begins (step 350) by establishing communications between the client 12 and the server 40. Attempts to establish a connection with the server 40 can begin when the client 12 comes within range of the subnet 10. The client 12 sends a packet and awaits a reply from the server 40. The client 12 then waits a specified period of time. If that period elapses without a receiving a response, the client 12 attempts again to establish a connection with the server 40 by sending another packet. Again, the client 12 waits a specified period of time, but the current waiting period is longer than the previous waiting period. By waiting for a longer period (i.e., "backing off") on the subsequent connection attempt, the client 12 is accommodating the dynamic and intermittent quality of mobile wireless networks by giving any response from the server 40 additional time to arrive at the client 12. If the new waiting period also times out, the client 12 sends the packet to the server 40 yet again and waits a still longer period for the reply from the server 40 that establishes the connection.

Under some circumstances, numerous clients 12 (e.g., 200), may arrive within range of the subnet 10 simultaneously, each attempting to establish a connection with the server 40. For example, consider a military "invasion" scenario in which each participant is equipped with a portable computer capable of establishing a wireless connection to the subnet 10 and thus of communicating with the server 40. These computers are used to coordinate the military invasion and to assist in pinpointing the position of each individual during the operation. An onslaught of connection attempts could overwhelm the subnet 10 and the server 40 with packets such that only a portion of the computers are able to successfully establish a connection with the server 40. If each computer then backed off for approximately the same period of time before attempting again to connect to the server 40, the outcome might be the same; namely, another onslaught of connection packets that impedes some of the computers from establishing a connection. Thus, in one embodiment, the computers are configured so that the back-off period is not the same for each of computers, causing the attempts to connect to the server 40 to be staggered. That is, some computers 12 wait for longer periods than other computers before sending another connection packet to the server 40.

After communications are established over a route through the subnet 10 that includes one or more wireless links, the client 12 identifies (step 354) a packet of data that is to be sent to the server 40 as having been sent. After identifying the packet as having been sent, the client 12 transmits (step 358) the packet through the subnet 10 over a route determined by the routing nodes 14. The packet may be queued in a message queue and sent to the server 40 based on prioritization within the message queue. Similarly, in some embodiments, if a packet is being sent from the server 40 to the client 12, the packet may also be added to a message queue and sent to the client 12 as determined by priorities assigned within the message queue.

When the packet that is sent includes data that is to be updated, the data may be sent in a variety of different forms. That is, within an object based system, when an object is modified, either the entire object may be sent in a packet, or substantially only the changes to the object may be sent in a packet. By way of example, when an object has a size that is smaller than a predetermined threshold, the entire object is sent in a packet. Alternatively, when the object is larger than that threshold, the updates or changes to that object alone may be sent in a packet, although the entire object may also be sent.

The client 12 then determines (step 362) whether it has received an acknowledgement from the server 40 indicating that the server 40 received the packet. The client 12 may make the determination after a predetermined amount of time has elapsed. Receipt of the acknowledgment indicates that the packet has been successfully transmitted and received. Hence, the client 12 identifies (step 366) the packet as being successfully sent and received, and the process of sending data is completed.

If the client 12 instead determines that no acknowledgement of the packet has been received, then this is an indication that there may have been a failure in the network that prevented the server 40 from receiving the packet. Such failures may include, but are not limited to, failures such as a failure of the client 12, of the server 40, and a communication link in a route between the client 12 and the server 40. The failures may also be due to packet loss, and not to a physical failure of any component of the overall system.

When the packet has not been successfully received, then a determination is made (step 370) as to whether a maximum number of resend tries has been exceeded. The maximum number of attempts to send a packet between the client 12 and the server 40 may generally be widely varied, and is typically determined using statistical models based upon the measured behavior of the overall system. The maximum number of resend tries may be updated at any suitable time during the operation of the overall system. By way of example, the maximum number of resend tries may be calculated and, if necessary, revised, whenever the accumulation of statistical information reaches a certain level.

When the client 12 determines that the maximum number of resend tries has not been exceeded, another attempt is made (step 358) to send the packet. As mentioned above, the amount of time to wait between resend tries may be based upon statistical calculations based upon information that includes the average roundtrip time for a transmitted packet. An attempt to resend a packet can be successful when the initial failure in sending the packet was the result of packet loss.

On the other hand, if it is determined that the maximum number of resend tries has been exceeded, then attempts to send the packet over the potentially existing link are aborted. When the maximum number of resend tries has been exceeded, and acknowledgement of packet receipt still has not been received, then it is likely that there has been an interruption of the communications link, and that the unsuccessfully sending of data was likely not due to packet losses. Accordingly, an attempt is made (step 374) to reestablish communications between the client 12 and the server 40.

A determination is then made (step 378) as to whether communications between the client 12 and the server 40 have been successfully reestablished. If the determination is that communications have been successfully reestablished, the packet is sent (step 358). Alternatively, when it is determined that communications between the client 12 and the server 40 have not been reestablished, then another attempt is made (step 374) to reestablish communications. The number of attempts to reestablish communications between the client 12 and the server 40 may be limited in some cases. In one embodiment, attempts to re-establish communications may be aborted after a predetermined number of attempts have been reached. In other embodiments, when the number of attempts to re-establish communications is limited, the number of attempts that are made may be substantially dynamically determined based on statistical information gathered during the course of communications between client 12 and the server 40. In still another embodiment, after the number of attempts to establish a connection with the server 40 is reached, the attempts to establish a connection with the client 12 can continue with a different server upon which the data are replicated.

By limiting the number of times attempts made to send data and, further, by not first attempting to re-establish communications which may not actually have been interrupted, the amount of available communications bandwidth in a system may be substantially optimized. The bandwidth may be allocated to making actual connections which are required, rather than wasting the bandwidth by immediately attempting to re-establish communications when such re-establishment is not necessary.

In one embodiment, when an attempt is made to send data from the client 12 to the server 40, the data is queued on a message queue such that the data is prioritized for transmission to the server. Generally, a single message queue may be shared between multiple servers.

Figure 18A:
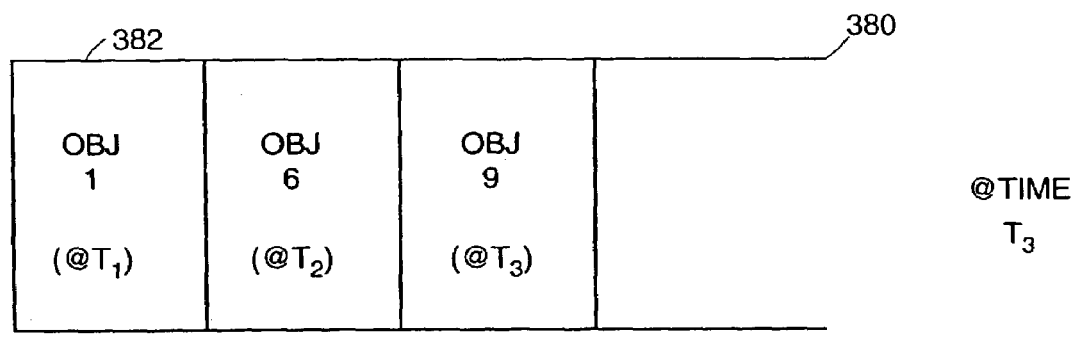
FIGS. 18A and 18B are diagrams illustrating an example of the operation of a message queue.
Figure 18B:
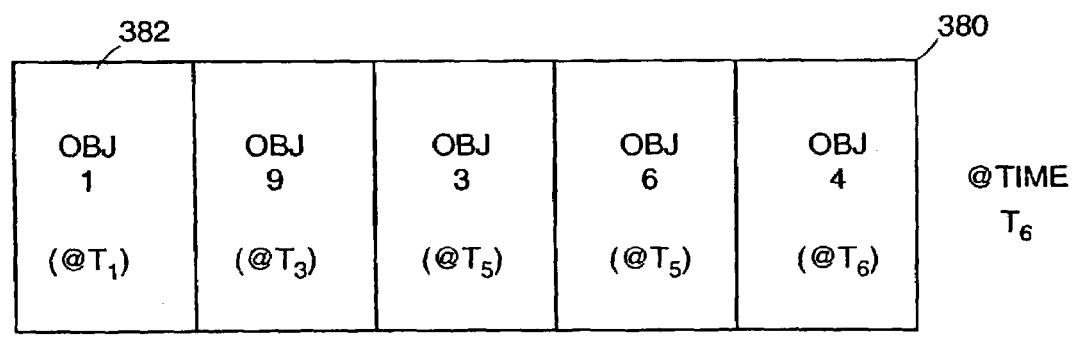

FIGS. 18A and 18B are a diagrammatic representation of the updating of an embodiment of a message queue 380 in accordance with an embodiment of the invention. As mentioned above, when data are created or modified, a timestamp accompanying the data is set or modified, respectively. A message queue 380 is shown at time t3 as including objects that were previously modified and have not yet been accepted by, (i.e., sent to and successfully received by), the server 40. At time t3, at the head 382 of the message queue 380 is an object "obj 1" that was modified at time ti, followed by an object "obj 6" that was modified at time t2, and an object "obj 9" that was modified at time t3. In the described embodiment, the queue 380 is prioritized in a first-in-first-out (FIFO) manner, although priority can instead be based on a variety of other factors.

At time t5, the queue 380 further includes an object "obj 3" that was modified at time t4. Also at time t5, object "obj 6" is being modified such that its corresponding timestamp is updated accordingly. Further, at time t6, an object "obj 4" is modified. In one embodiment, the object "obj 6" that was modified at time t2 is superceded by a version of object "obj 6" that is updated at time t5. That is, the object "obj 6" at timestamp t2 has been replaced with the object "obj 6" at timestamp t5. As shown in FIG. 18B, at time t6, the message queue 380 no longer includes the object "obj 6" that was modified at time t2 and, instead, includes object "obj 6" that was modified at time t5. Within the queue 380, object "obj 6" in one embodiment does not take the priority of object "obj6" at time t2, which has been removed. Instead, object "obj 6" takes a chronological position within the message queue 380, after object "obj 3" and before after the modification at time t5 of object "obj 6". A variety of techniques for prioritizing objects within the message queue 380 is described in co-pending patent application entitled "Method and Apparatus for Updating Information in a Low-Bandwidth Client/Server Object-Oriented System", U.S. Ser. No. 09/518,753, which is incorporated by reference herein in its entirety for all purposes.

Figure 19:
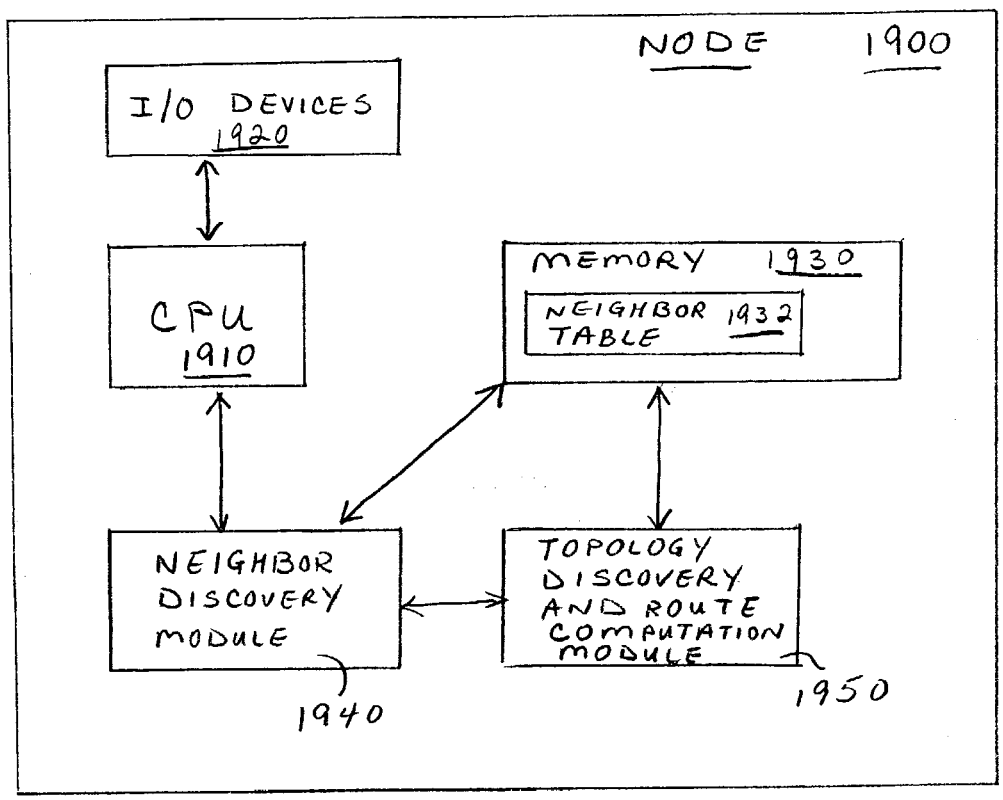
FIG. 19 illustrates a node of the present invention as implemented using a general processing device.

FIG. 19 illustrates a node 1900 of the present invention as implemented using a general processing device, e.g., a general purpose computer. The node 1900 can be a router, a host, a network or any networked devices. Specifically, the node 1900 comprises a processor (CPU) 1910, a memory 1930, e.g., random access memory (RAM) and/or read-only memory (ROM), a neighbor discovery module 1940, a topology discovery and route computation module 1950, and various input/output devices 1920, (e.g., storage devices, including but not limited to, a tape drive, a floppy drive, a hard disk drive, a compact disk (CD) drive or a digital videodisk (DVD) drive, a receiver, a transmitter, a speaker, a display, a speech signal input device, e.g., a microphone, a keyboard, a keypad, a mouse, an A/D converter, a chipset, a controller card, a graphics card, a sound card, and the like).

It should be understood that the neighbor discovery module 1940 and the topology discovery and route computation module 1950 can be implemented as one or more physical devices that are coupled to the CPU 1910 through a communication channel. Alternatively, the neighbor discovery module 1940 and the topology discovery and route computation module 1950 can be represented by one or more software applications (or even a combination of software and hardware, e.g., using application specific integrated circuits (ASIC)), where the software is loaded from a storage medium, (e.g., a magnetic or optical drive or diskette) and operated by the CPU in the memory 1930 of the computer. As such, the neighbor discovery module 1940 and the topology discovery and route computation module 1950 (including associated methods and data structures) of the present invention can be stored on a computer readable medium, e.g., RAM memory, magnetic or optical drive or diskette and the like.

In operation, the neighbor discovery module 1940 and the topology discovery and route computation module 1950 allow each node to quickly detect neighboring nodes and to perform topology discovery and route computation. To assist in performing these functions, a neighbor table 1932 is maintained by each node 1900 and its use will be further described below.

Various terms are defined below that are used to describe the present invention. Since some of these terms may have previously been defined above, the definitions below should be perceived as a supplement to those definitions or simply providing alternate descriptions.

Node: A router that implements TBRPF.

Interface: A network device that connects a node to the MANET. A node can have multiple interfaces. An interface can be wireless or wired, and can be broadcast (e.g., Ethernet) or point-to-point. Each interface is identified by an IP address (unless the interface is to an unnumbered point-to-point link).

Router ID: Each node is identified by a unique 32-bit Router ID (RID), also called a node ID, which for IPv4 is equal to the IP address of one of its interfaces. Link: A logical connection from one node to another, identified by a pair (u, v), where u and v represent nodes. Nodes u and v are called the "tail" and "head" of the link, respectively.

Bidirectional link: A link between two nodes u and v is said to be bidirectional, or 2-way, if node u has an interface I and node v has an interface J such that interface I can hear interface J and vice versa.

Neighbor node: A node j is said to be a neighbor of node i if node i can hear node j on some interface. Node j is said to be a 2-way neighbor if there is a bidirectional link between i and j.

MANET interface: Any wireless interface such that two neighbor nodes on the interface need not be neighbors of each other. MANET nodes typically have at least one MANET interface, but this is not a requirement.

Topology: The topology of the network is described by a graph G=(V, E), where V is the set of nodes u and E is the set of links (u,v) in the network.

Directed tree: A subset of (directed) links (u,v) that does not contain any loops. The root of a directed tree is the only node u such that the tree contains no link whose tail is u.

Source tree: The directed tree computed by each node that provides shortest paths to all other nodes. Not the same as a broadcast tree.

Topology update: A message or part of a message that reports a state change for one or more links.

Parent: The parent of a node i for an update source u is the next node on the computed shortest path to node u.

Figure 26:
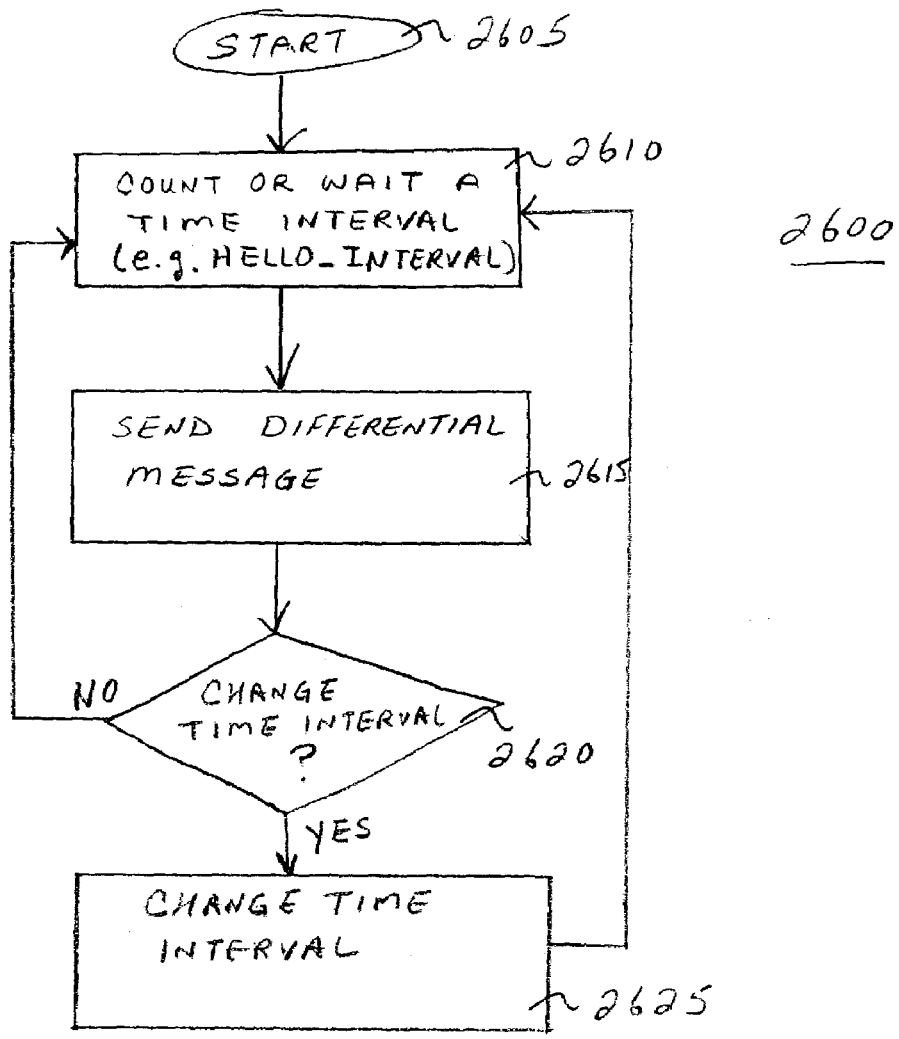
FIG. 26 is a flowchart diagram of a neighbor discovery method of the present invention.

FIG. 26 is a flowchart diagram of a neighbor discovery method 2600 of the present invention. A node that implements the present TBRPF Neighbor Discovery (TND) protocol allows each node to quickly detect the neighbor nodes with which the node has a direct, bidirectional link, i.e., such each node has an interface that can hear the other interface. The method also detects when a bidirectional link to a neighbor no longer exists.

Method 2600 starts in step 2605 and proceeds to step 2610, where a time interval or threshold (e.g., HELLO_INTERVAL) is allowed to elapse before a Hello message is sent to a neighbor node. Specifically, each node sends a HELLO message every HELLO_INTERVAL seconds, with a small jitter. This time duration is generally predefined for a node, but can be adaptively changed as described below.

In step 1615, a node will send a "differential" Hello message to its neighbor nodes. One important feature of the Neighbor Discovery Module is that it employs "differential" HELLO messages which report only the "changes" in the status of neighbor nodes. This results in HELLO messages that are much smaller than those of other link- state routing protocols such as OSPF, in which each HELLO message includes the IDs of all neighbors. As a result, HELLO messages can be sent more frequently in highly mobile networks without increasing overhead significantly.

More specifically, each HELLO message contains three (possibly empty) lists of router IDs, formatted as the following three message sub-types: NEIGHBOR REQUEST, NEIGHBOR REPLY, and NEIGHBOR LOST. Namely, a HELLO message is the concatenation of a NEIGHBOR REQUEST message, a NEIGHBOR REPLY message, and a NEIGHBOR LOST message, where each of the last two messages is omitted if its list of router IDs is empty.

A NEIGHBOR REQUEST message is a message sent by a "sending" node indicating to one or more neighbor nodes of its presence and will subsequently effect one or more "receiving" neighbor nodes who received the NEIGHBOR REQUEST message to acknowledge the sending node's presence. Thus, a NEIGHBOR REQUEST message is always included in a HELLO message, even if its list of router IDs is empty. Thus, a HELLO message always includes a (possibly empty) NEIGHBOR REQUEST.

A NEIGHBOR REPLY message is a message sent by a "receiving" neighbor node to indicate receipt of a NEIGHBOR REQUEST message, whereas a NEIGHBOR LOST message is a message to indicate the loss of a neighbor node. Thus, a NEIGHBOR REPLY or NEIGHBOR LOST message is included only if its list of router IDs is nonempty. Each HELLO message also contains the current HELLO sequence number (HSEQ), which is incremented with each transmitted HELLO. For convenience, we say that "node i sends a NEIGHBOR REQUEST message for node j" if node i sends such a message that includes the ID of node j, and similarly for NEIGHBOR REPLY and NEIGHBOR LOST messages.

Each node maintains a neighbor table 1932 for each interface, which stores the state information for neighbors heard on that interface. The status of each node can be "1-WAY", "2-WAY", or "LOST". When node i changes the state of a neighbor j, it sends the appropriate message (NEIGHBOR REQUEST/UP/LOST) in at most NBR_HOLD_COUNT (typically 3) consecutive HELLOs. This ensures that node j will either receive the message, or will miss NBR_HOLD_COUNT HELLOs and thus declare node i to be LOST. This technique also makes it unnecessary for a node to include each 1-WAY neighbor in HELLOs indefinitely, unlike other protocols such as OSPF. The NEIGHBOR REQUEST message includes a list of neighbors from which HELLO messages have recently been heard but for which a 2-WAY link is not currently established.

Returning to FIG. 26, in step 2620, method 2600 queries whether the HELLO_INTERVAL should be changed. If the query is positively answered, then method 2600 proceeds to step 2625 where the time interval is changed. If the query is negatively answered, then method 2600 returns to step 2610. It should be noted that steps 2620 and 2625 are optional steps.

More specifically, discovery services in networks generally send periodic updates. Receivers will wait for a fixed timing interval to obtain a new update message. If the time elapses without receiving an update, the receiver will likely declare the node or service lost. Update intervals are generally fixed parameters of networks at setup. To change the update interval, all nodes have to be removed from the network, instantiated with the new update interval time, and rebooted to join the network again. However, pro-active routing and other protocols for mobile ad hoc and peer-to-peer networks with frequent and periodic messages to discover services or objects can benefit from self-adaptation to the dynamic environment. In one embodiment of the present invention, the present method configures and tunes performance of the network on-the-fly (during operation) under different situations. For example, the update interval can depend on the current velocity of nodes (if mobile), the application, bandwidth demand, or network traffic.

In one embodiment, the update message itself contains the current update interval of the sending node. The update interval can be changed any time, such that the receiving node sets the timeout individually per message according to the value transmitted in it. The present approach adds a small data entry in the update messages to hold the next interval value. This allows nodes joining the network to advertise their own, possibly different update interval. All nodes can change their update intervals during operation to cope with dynamic, varying circumstances. Thus, the network supports devices with different update intervals and devices, which have the ability to change their update intervals during operation. For example, a mobile device can send updates more frequently when it moves faster.

This novel approach to changing update interval provides several advantages. The approach can help to avoid intruders detecting update messages. Having a fixed update interval, the intruders can seek after messages that occur regularly in equidistant times, even if these messages are encrypted. Employing a varying update interval hampers the picking of control messages. For example, when applying mobile ad hoc networks to battlefield situations, variable updates can enhance the safety of networked equipment or soldiers. If the update messages allow inference of the node's location or other sensitive data, the present approach can help to protect this information.

Figure 28:
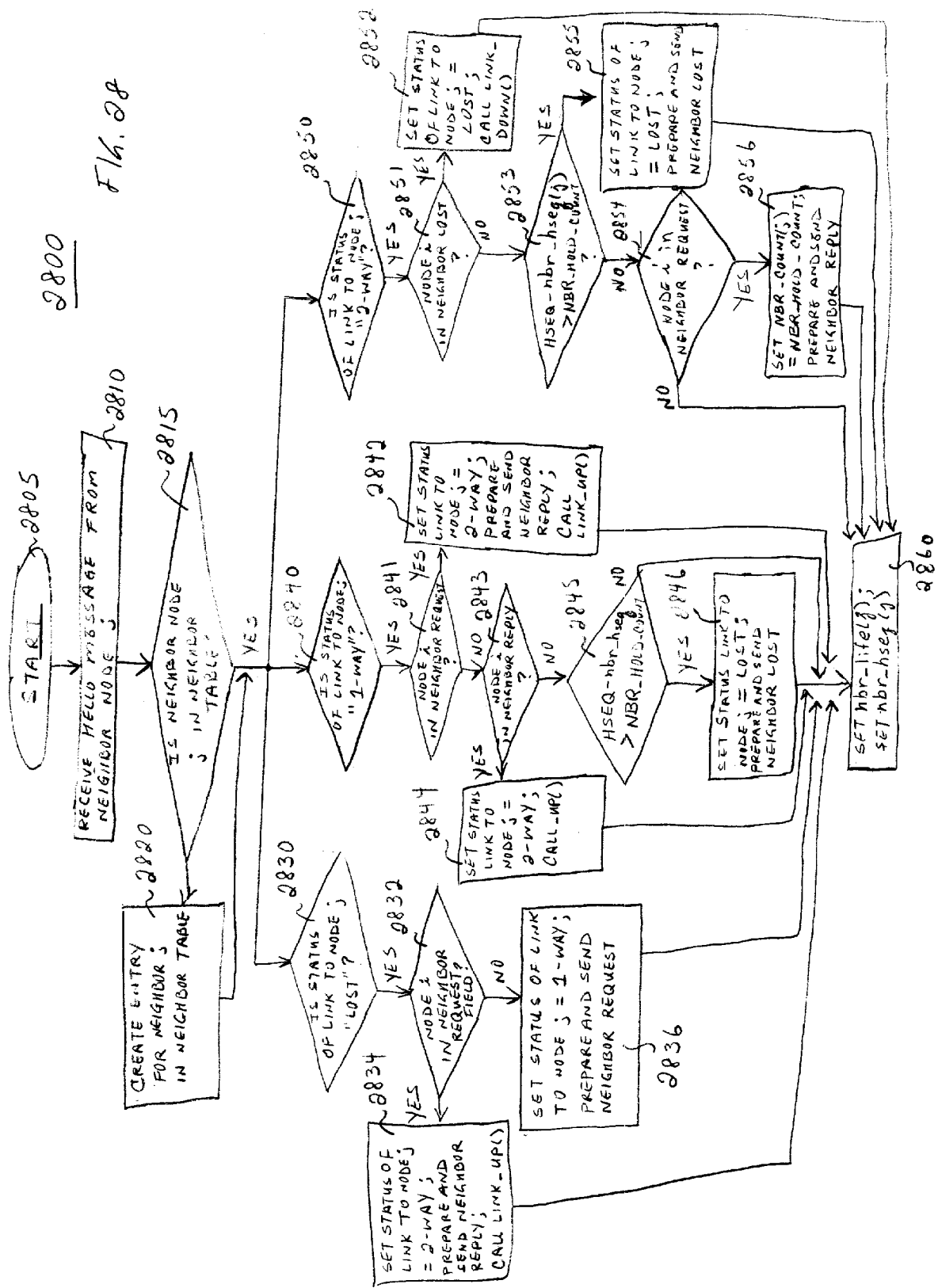
FIG. 28 is a detailed flowchart diagram of a neighbor discovery method of the present invention.

FIG. 28 is a detailed flowchart diagram of a neighbor discovery method 2800 of the present invention. Specifically, FIG. 28 illustrates in detail as to how a HELLO message is processed by a receiving node. It should be noted that each node maintains a neighbor table for each interface, which stores state information for each neighbor that has recently been heard on that interface. The definitions for various variables are now provided below to assist in the understanding of FIG. 28. The entry for neighbor node j contains the following variables:

nbr_rid(j): The Router ID of node j.
nbr_if_addr(j): The interface IP address of node j.
nbr_status(j): The current status of the link to node j, which can be LOST, 1-WAY, or 2-WAY.
nbr_life(j): The amount of time (in seconds) remaining before nbr_status(j) must be changed to LOST if no further HELLO message from node j is received. Set to NBR_HOLD_TIME whenever a HELLO is received from node j.
nbr_hseq(j): The last value of HSEQ received from node j. Used to determine the number of HELLOs have been missed.
nbr_count(j): The number of times a NEIGHBOR REQUEST/UP/LOST message has been sent for node j since nbr_status(j) has changed.
hello_history(j): A list of the sequence numbers of the last HELLO_ACQUIRE_WINDOW HELLO messages received from node j.
nbr_metric(j): An optional measure of the quality of the link to node j.
nbr_pri(j): The relay priority of node j.

The table entry for a neighbor j may be deleted if no HELLO message has been received from node j within the last 2*NBR_HOLD_TIME seconds. (It is kept while the NEIGHBOR LOST for node j is being transmitted.) The absence of an entry for a given node j is equivalent to an entry with nbr_status(j)=LOST and hello_history(j)=NULL. The three possible values of nbr_status(j) at node i have the following informal meanings:

LOST: Node i has not received a sufficient number of HELLO messages recently from node j.
1-WAY: Node i has received a sufficient number of HELLO messages recently from node j, but the link is not 2-WAY.
2-WAY: Nodes i and j have both received a sufficient number of HELLO messages recently from each other.

Each node sends a HELLO message periodically every HELLO_INTERVAL seconds, with a random jitter selected from the interval [0, MAX_JITTER]. Each HELLO message always includes a NEIGHBOR REQUEST message, even if its router ID list is empty. The NEIGHBOR REQUEST message includes the sequence number HSEQ, which is incremented (modulo 256) each time a HELLO is sent. The HELLO message also includes a NEIGHBOR REPLY message if its router ID list is nonempty, and a NEIGHBOR LOST message if its router ID list is nonempty. The contents of these three messages are determined by the following steps at node i:

1. For each node j such that nbr_status(j)=LOST and nbr_count(j)>0, include node j in the NEIGHBOR LOST message and decrement nbr_count(j).

2. For each node j such that nbr_status(j)=1-WAY and nbr_count(j)>0, include node j in the NEIGHBOR REQUEST message and decrement nbr_count(j).

3. For each node j such that nbr_status(j)=2-WAY and nbr_count(j)>0, include node j in the NEIGHBOR REPLY message and decrement nbr_count(j).

FIG. 28 illustrates the above processing of a HELLO message in greater detail. Specifically, method 2800 starts in step 2805 and proceeds to step 2810 where a HELLO message with sequence number HSEQ and relay priority PRI is received by node i from a neighbor node j. Method 2800 queries whether node j is currently in node i's neighbor table. If the query is positively answered, then method 2800 proceeds to either step 2830, step 2840 or step 2850 depending on the current status of node j as recorded by node i. If the query is negatively answered, then method 2800 proceeds to step 2820, where an entry for node j is created with nbr_rid(j) equal to the Router ID of node j, nbr_if_addr(j) equal to the interface address from which the message was sent, nbr_status(j)=LOST (temporarily set so that it will be processed by step 2830 below), nbr_count(j)=0, and nbr_hseq(j)=HSEQ. Update hello_history(j) to reflect the received HELLO message. If nbr_hseq(j)>HSEQ (due to wraparound), set nbr_hseq(j)=nbr_hseq(j)−256.

In step 2830, method 2800 queries whether the status of node j is "LOST" and whether hello_history(j) indicates that HELLO_ACQUIRE_COUNT of the last HELLO_ACQUIRE_WINDOW HELLO messages from node j have been received. If the query is positively answered, then method 2800 queries whether node i appears in the NEIGHBOR REQUEST list of the HELLO message. If the query is positively answered, then method proceeds to step 2834. If the query is negatively answered, then method proceeds to step 2836.

In step 2834, if node i appears in the NEIGHBOR REQUEST list, method 2800 will set nbr_status(j)=2-WAY and nbr_count(j)=NBR_HOLD_COUNT (a NEIGHBOR REPLY will be sent). Call Link_Up(j, I, metric). One possibility for this scenario is that node j has been deemed by node i as being LOST and may have received a HELLO message from node i indicating j's LOST status. In response, node j then sends a HELLO message to node i and lists node i in its NEIGHBOR REQUEST list within the HELLO message. Upon detecting the listing of node i in the NEIGHBOR REQUEST list, node i will now declare link with node j as being 2-WAY.

In step 2836, if node i does not appear in the NEIGHBOR REQUEST list, method 2800 will set nbr_status(j)=1-WAY and nbr_count(j)=NBR_HOLD_COUNT (a NEIGHBOR REQUEST will be sent). One possibility for this scenario is that node j is a new node entering the network. Thus, node i will attempt to verify 2-WAY communication with node j in a future HELLO message sent to node j where "node j" will be listed in the NEIGHBOR REQUEST list of the HELLO message.

In step 2840, method 2800 queries whether the status of node j is "1-WAY". If the query is positively answered, then method 2800 queries whether node i appears in the NEIGHBOR REQUEST list of the HELLO message. If the query is positively answered, then method 2800 proceeds to step 2842. If the query is negatively answered, then method 2800 proceeds to step 2843.

In step 2842, if node i appears in the NEIGHBOR REQUEST list, method 2800 will set nbr_status(j)=2-WAY, nbr_count(j)=NBR-HOLD_COUNT (a NEIGHBOR REPLY will be sent) and will call Link_Up(j, i, metric). Since node i already deems node j as having a status of 1-WAY, receiving a message from node j will change the status to 2-WAY. One possibility for this scenario is that node i recently sent a HELLO message (to all neighbors) indicating its presence and node j responded by sending a NEIGHBOR REQUEST as in step 2836.

In step 2843, method 2800 queries whether node i appears in the NEIGHBOR REPLY list. If the query is positively answered, then method 2800 proceeds to step 2845. If the query is negatively answered, then method 2800 proceeds to step 2844.

In step 2844, if node i appears in the NEIGHBOR REPLY list, then set nbr_status(j)=2-WAY and nbr_count(j)=0. Call Link-Up(j, I, metric). One possibility for this scenario is that node i recently sent a HELLO message to node j indicating its presence and node j has now replied by placing node i in its NEIGHBOR REPLY list.

In step 2845, method 2800 queries whether HSEQ−nbr_hseq(j)>NBR_HOLD_COUNT. If the query is positively answered, then method 2800 proceeds to step 2846. If the query is negatively answered, then method 2800 proceeds to step 2860.

In step 2846, if HSEQ−nbr_hseq(j)>NBR_HOLD_COUNT, then set nbr_status(j)=LOST and nbr_count(j)=NBR_HOLD_COUNT (a NEIGHBOR LOST will be sent). One possibility for this scenario is that node i has waited a long time for a response from node j and now has detected that node i has actually missed many messages from node j above an established or acceptable threshold. The NEIGHBOR LOST message will notify node j that a problem may exist between the link with node i.

In step 2850, method 2800 queries whether the status of node j is "2-WAY". If the query is positively answered, then method 2800 queries whether node i appears in the NEIGHBOR LOST list of the HELLO message. If the query is positively answered, then method 2800 proceeds to step 2852. If the query is negatively answered, then method 2800 proceeds to step 2853.

In step 2852, if node i appears in the NEIGHBOR LOST list, method 2800 sets nbr_status(j)=LOST and nbr_count(j)=0. Call Link_Down(j). One possibility for this scenario is that node j has waited a long time for a response from node i and is now indicating that its link with node i is LOST.

In step 2853, method 2800 queries whether HSEQ−nbr_hseq(j)>NBR_HOLD_COUNT. If the query is positively answered, then method 2800 proceeds to step 2855. If the query is negatively answered, then method 2800 proceeds to step 2854.

In step 2855, if HSEQ−nbr_hseq(j)>NBR_HOLD_COUNT, then method 2800 sets nbr_status(j)=LOST and nbr_count(j)=NBR_HOLD_COUNT (a NEIGHBOR LOST will be sent). One possibility for this scenario is that node i has waited a long time for a response from node j and now has detected that node i has actually missed many messages from node j above an established or acceptable threshold and is now indicating that its link with node j is LOST.

In other words, if node i receives a HELLO from a 1-WAY or 2-WAY neighbor j whose HSEQ indicates that at least NBR_HOLD_COUNT HELLOs were missed, or if node i receives no HELLO from node j within NBR_HOLD_TIME seconds, then node i changes the state of node j to LOST, and sends a NEIGHBOR LOST message for node i in its next NBR_HOLD_COUNT transmitted HELLO messages (unless the link changes state before these transmissions are complete). Node j will either receive the message or will miss NBR_HOLD_COUNT HELLOs; in either case it will declare node i to be LOST. In this manner, both nodes will agree that the link is no longer bidirectional, even if node j can still hear HELLOs from node i.

In step 2854, method 2800 queries whether node i appears in the NEIGHBOR REQUEST list and nbr_count(j)=0. If the query is positively answered, then method 2800 proceeds to step 2856. If the query is negatively answered, then method 2800 proceeds to step 2860.

In step 2856, if node i appears in the NEIGHBOR REQUEST list and nbr_count(j)=0, then method 2800 sets nbr_count(j)=NBR_HOLD_COUNT (a NEIGHBOR REPLY will be sent). One possibility for this scenario is that node j is simply sending a standard HELLO message where a 2-WAY link has already being declared.

Finally, in step 2860, method 2800 set nbr_life(j)= NBR_HOLD_TIME, nbr_hseq(j)=HSEQ, and nbr_pri(j)= PRI.

It should be noted that upon expiration of the timer nbr_life(j), node i will perform the following steps:

If nbr_status(j)=1-WAY or 2-WAY, set nbr_status(j)= LOST and nbr_count(j)=NBR_HOLD_COUNT (a NEIGHBOR LOST will be sent). Call Link_Down(j).

Optionally, to avoid establishing a link that is likely to be short lived (i.e., to employ hysteresis), a node i must receive at least HELLO_ACQUIRE_COUNT (e.g., 2) of the last HELLO_ACQUIRE_WINDOW (e.g., 3) HELLOs from another node j before declaring the node to be 1-WAY. In this case, node i sends a NEIGHBOR REQUEST message for node j in each of its next NBR_HOLD_COUNT HELLO messages, or until a NEIGHBOR REPLY message for node i is received from node j. If node j receives a NEIGHBOR REQUEST from node i, then node j declares the link to node i to be 2-WAY (if it is not already 2-WAY), and includes a NEIGHBOR REPLY message for node i in its next NBR_HOLD_COUNT transmitted HELLO messages. Upon receiving the NEIGHBOR REPLY message, node i declares the link to node j to be 2-WAY.

Each node may optionally maintain and update one or more link metrics to each neighbor j for each interface I, representing the quality of the link. Such link metrics described below can be used as additional conditions for changing the state of a neighbor, based on the link metric going above or below some threshold. TBRPF also allows link metrics to be advertised in topology updates and used for computing shortest paths.

TND 1940 is designed to be fully modular and independent of the routing module 1950. Thus, TND performs only neighbor sensing, i.e., it determines which nodes are (1-hop) neighbors. In particular, it does not discover 2-hop neighbors (which is handled by the routing module 1950). As a result, TND can be used by other routing protocols, and TBRPF can use another neighbor discovery protocols in place of TND, e.g., one provided by the link layer.

Nodes with multiple interfaces can run TND separately on each interface, similar to OSPF. Thus, a neighbor table is maintained for each interface, and a HELLO sent on a particular interface contains only the RIDs of neighbors for that interface.

Figure 27:
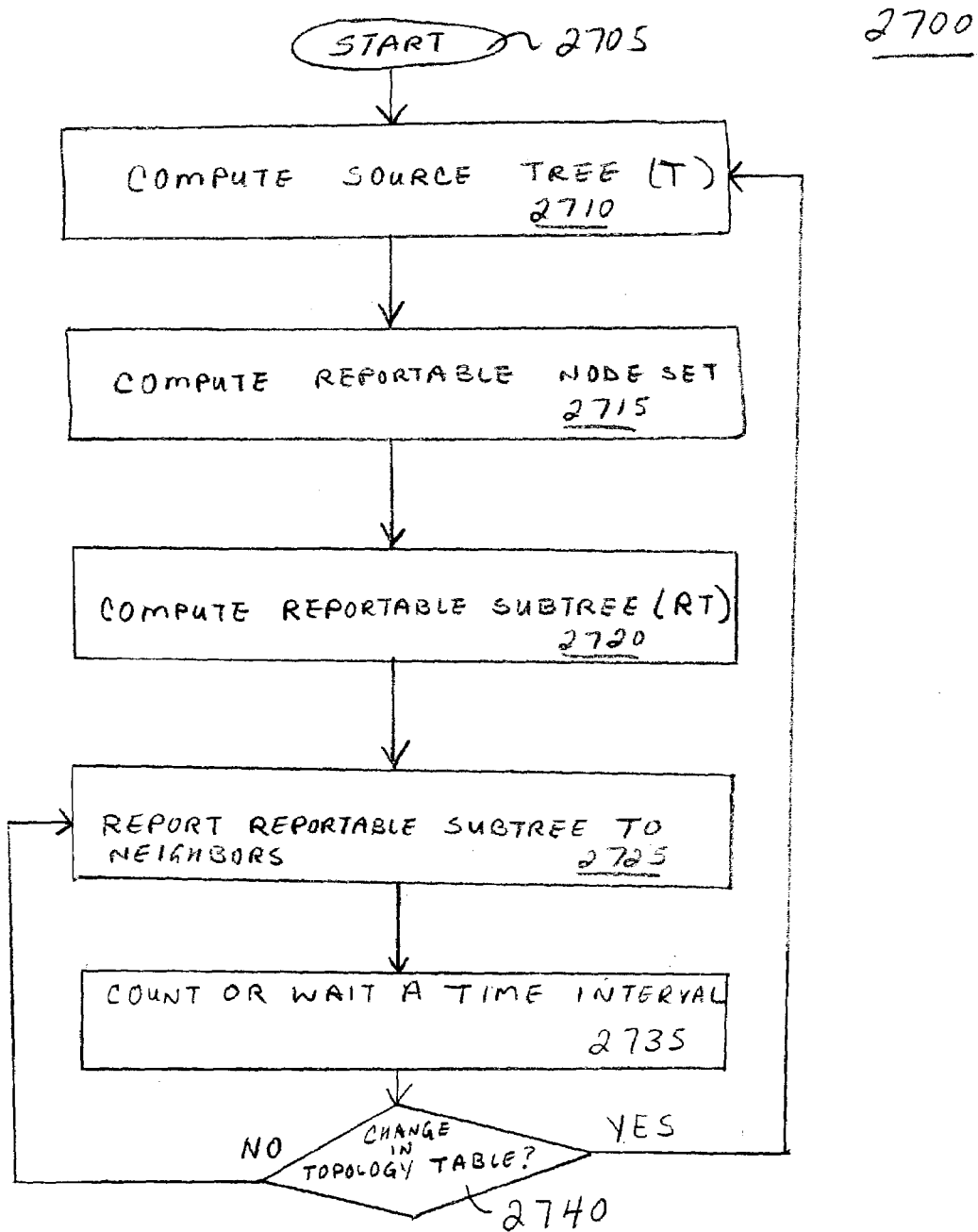
FIG. 27 illustrates a flowchart of a method for disseminating topology information by a node.

FIG. 27 illustrates a flowchart of a method 2700 for disseminating topology information by a node. Specifically, each node of the present invention computes a source tree (providing shortest paths to all reachable nodes) based on partial topology information stored in its topology table, e.g., using a modification of Dijkstra's algorithm. To minimize overhead, each node reports only part of its source tree to neighbors. This is in contrast to other protocols such as FTSP and STAR, in which each node reports its entire source tree to neighbors, which is redundant since the source trees of different neighbors often overlap considerably.

Method 2700 starts in step 2705 and proceeds to step 2710 where a node will compute a source tree (T), i.e., the directed tree computed by each node that provides shortest paths to all other nodes, and will update its topology graph TG which consists of links that are believed to be up (operational).

In step 2715, method 2700 computes a "reportable node set" (RN). Namely, to decide which part of its source tree T to report to neighbors, a node first computes its reportable node set. Roughly speaking, node i includes node u in RN if it estimates that the minimum-hop path from some neighbor j (of node i) to destination u goes through node i. In other words, node i includes node u in RN if it estimates that it is the next hop (or parent) of some neighbor to destination u. To make this determination, node i computes the shortest paths, up to 2 hops, from each neighbor to each other neighbor, using relay priority (included in HELLO messages) and node ID to break ties. After a node determines which neighbors are in RN, each reachable node u is included in RN if and only if the next hop to u (on the path defined by T) is in RN. A node also includes itself in RN. As a result, the reportable subtree RT includes the subtrees of T that are rooted at neighbors in RN, and also includes all local links to neighbors. This method avoids the need for the NEW PARENT messages.

In step 2720, method 2700 computes a reportable substree (RT). Namely, the part of T that a node reports to neighbor nodes is called the "reportable subtree". The reportable subtree RT consists of links (u,v) of T such that u is in the "reportable node set" RN. Each node reports RT to neighbors in "periodic" topology updates (e.g., every 5 seconds), and reports changes (additions and deletions) to RT in more frequent "differential" updates (e.g., every 1 second). Periodic updates inform new neighbors of RT, and ensure that each neighbor eventually learns RT even if it does not receive all updates. Differential updates ensure the fast propagation of each topology update to all nodes that are affected by the update. A received topology update is not forwarded, but may result in a change to RT, which will be reported in the next differential update.

In step 2725, the reportable subtree is reported to its neighbor nodes. If possible, topology updates are included in the same packet as a HELLO message as disclosed above, to minimize the number of control packets sent. If it is time to send a periodic update, then the entire reportable subtree is reported in step 2725; otherwise only changes to the reportable subtree in a "differential update".

In step 2735, method 2700 waits or counts a time interval and then queries whether a change has been detected in a node's topology table, e.g., receiving a topology update from a neighbor node indicating some change in the network topology, or detecting a status change for a link to one of its neighbors. If the query is positively answered, then method 2700 returns to step 2710 and steps 2710-2725 are repeated. If the query is negatively answered, then method 2700 proceeds to step 2725 to again issue another topology report to its neighbors. The time interval(s) can be selected to implement the "periodic" topology updates and the "differential" updates as disclosed above.

In one embodiment, the TBRPF does not require reliable or sequenced delivery of messages, and does not use ACKs or NACKs. TBRPF supports multiple interfaces, associated hosts, and network prefixes. Information regarding associated interfaces, hosts, and prefixes is disseminated efficiently in periodic and differential updates, similar to the dissemination of topology updates.

TBRPF does not use sequence numbers for topology updates, thus reducing message overhead and avoiding wraparound problems. Instead, a technique is used in which, for each link (u,v) reported by one or more neighbors, only the next hop p(u) to u is believed regarding the state of the link. However, in other protocols, such as SPTA each node reports the full topology. Using this technique, each node maintains a topology graph TG, consisting of "believable" links that are reported by neighbors, and computes T as the shortest-path tree within TG. To allow immediate rerouting, the restriction that each link (u,v) in TG must be reported by p(u) is relaxed temporarily if p(u) changes to a neighbor that is not reporting the link. Each node is required to report RT, but may report additional links, e.g., to provide increased robustness in highly mobile networks. More specifically, a node may maintain any subgraph H of TG that contains T, and report the reportable subgraph RH, which consists of links (u,v) of H such that u is in RN.

For example, H can equal TG, which would provide each node with the full network topology if this is done by all nodes. H can also be a biconnected subgraph that contains T, which would provide each node with two disjoint paths to each other node, if this is done by all nodes.

TBRPF also allows the option to include link metrics in topology updates, and to compute paths that are shortest with respect to the metric. This allows packets to be sent along paths that are higher quality than minimum-hop paths. TBRPF allows path optimality to be traded off in order to reduce the amount of control traffic in networks with a large diameter, where the degree of approximation is determined by the configurable parameter NON_TREE_PENALTY.

In a MANET, some nodes, called non-relay nodes, may choose not to forward packets received from other nodes. Non-relay nodes are supported by TBRPF in a very simple manner: they run TBRPF (and transmit HELLOs) but do not transmit topology update messages. As a result, no node will compute a path that uses a non-relay node as an intermediate node.

Figure 29:
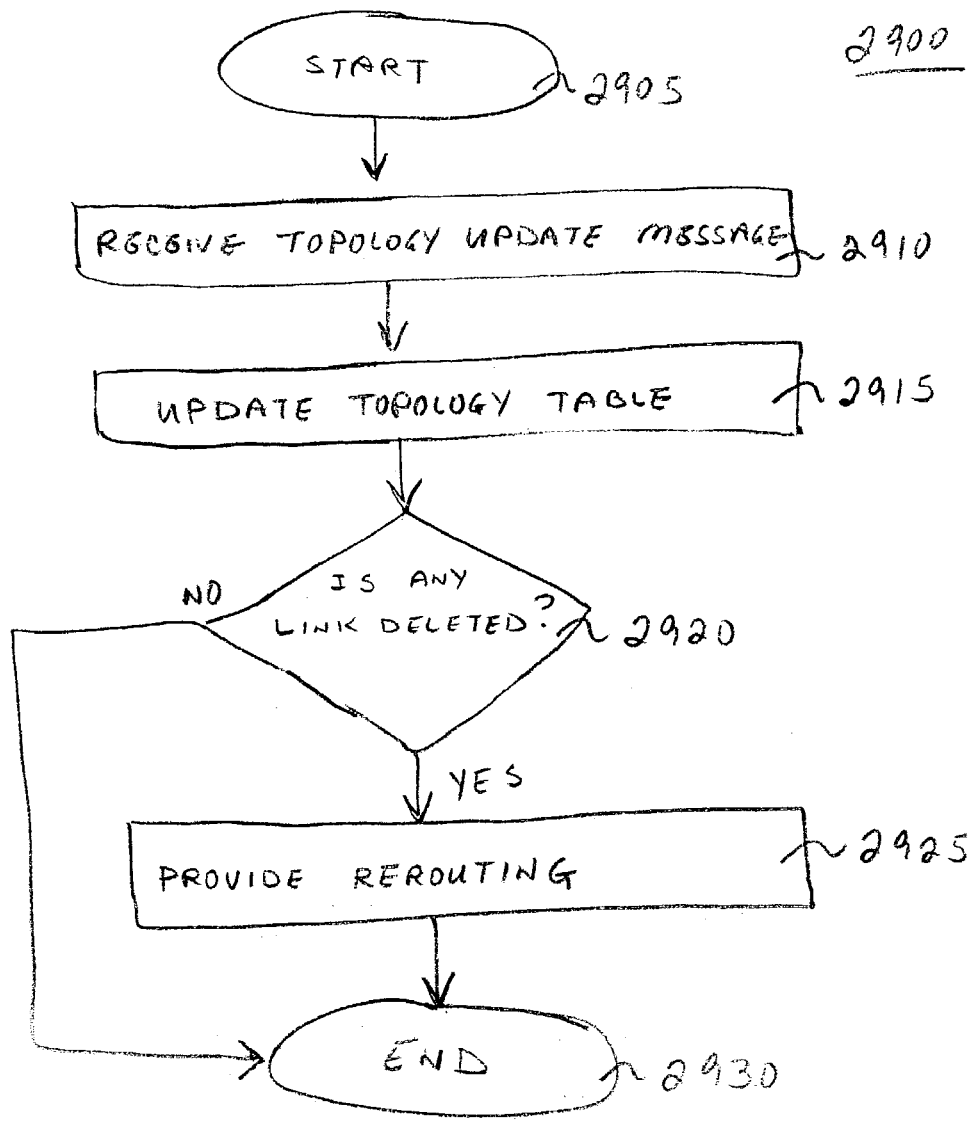
FIG. 29 illustrates a flowchart of a method for processing a topology update message.

FIG. 29 illustrates a flowchart of a method 2900 for processing a topology update message. Method 2900 starts in step 2905 and proceeds to step 2910 where a topology update message is received.

In step 2915, method 2900 updates the node's topology table. Specifically, when a packet containing TOPOLOGY UPDATE messages is received, a procedure, Process_Updates( ), is called to update the topology table TT, in particular to update TG and the reporting neighbor lists r(u) and r(u,v).

In step 2920, method 2900 queries whether any link of the source tree T has been deleted from TG. If the query is affirmative answered, then method 2900 proceeds to step 2925 and the procedures Update_Source_Tree( ) and Update_Routing_Table( ) are called to provide immediate rerouting, as indicated in the procedure Process_Updates( ) below. Otherwise, method 2900 ends in step 2930. The routing operation will be further described below in various procedures Various data structures such as packet headers, message formats and software procedures are now disclosed below. It should be understood that these structures, formats and procedures are only illustrative and should not be deemed as limiting the scope of the present invention. Those skilled in the art will realize that these packet headers, message formats and software procedures can be adapted or changed accordingly to meet specific implementation requirements.

TBRPF Packets

Nodes send TBRPF protocol data in contiguous units known as packets. Each packet includes a header, optional header extensions, and a body comprising one or more "message(s)" and padding options as needed. The total length of all packet elements should be less than the maximum length represented by an unsigned 16-bit integer, i.e. 64 KB. To facilitate efficient receiver processing, senders should insert padding options as necessary to align multi-octet words within the TBRPF packet on "natural" boundaries (i.e. modulo-8/4/2 addresses for 64/32/16-bit words, respectively). Receivers should be capable of processing multi-octet words. The following sections specify elements of the TBRPF packet in more detail in one embodiment.

TBRPF Packet Header

TBRPF packet headers are variable-length (minimum one octet), and should begin on a modulo-8 boundary to provide a base for multi-octet word alignment. The format for the first octet of the header is shown in FIG. 20.

Bits (4 Bits):
Interpreted based on the sense of the 'E' flag.

Version (3 Bits):
A 3-bit unsigned integer value that identifies the TBRPF protocol version; the following values are defined:

| TBRPFVERSION_1 | 1 |
| TBRPFVERSION_2 | 2 |
| TBRPFVERSION_3 | 3 |

Implementations of this protocol description should encode the value TBRPFVERSION_3 in the version field. (Implementations may provide backwards-compatibility for older protocol versions.)

Mode (1 Bit):
Specifies simple mode (E=0) or extended mode (E=1) for the current TBRPF packet header as described below.

Simple-mode Packet Headers (E=0)
Senders may encode TBRPF packet headers in simple-mode when no header extensions are required, such as when the lower-level delivery service provides requisite fields (e.g. length; checksum). Simple-mode packet headers are 1-octet in length and coincide with the TYPE field of the first message in the TBRPF packet body (see below). Simple-mode packet headers may only be used when 0←TYPE←4 for the first message of the packet body. (This is usually the case, since the first message is usually a HELLO message.) Simple-mode packet headers are illustrated in FIG. 21

TYPE (4 Bits):
  A 4-bit unsigned integer with value 0-15 that encodes the low-order 4 bits of the TYPE field in the first element of the TBRPF packet body.

Extended-Mode Packet Headers (E=1)

Senders should encode TBRPF packet headers in extended-mode when header extensions are required, such as when the lower-level delivery service omits requisite fields. Extended-mode packet headers are illustrated in FIG. 22

Flags (4 Bits):
  One bit (F) specifies whether a 1-octet flag extension field follows. Three bits (C, L, R) specify which header extension fields (if any) follow. Any extension fields specified by these bits should occur in canonical order (i.e. first F, then C, then L, then R) as follows:
  F—Flag extension field included:
    When F='1', a 1-octet flag extension field immediately follows the first octet of the TBRPF packet header. Currently, all bits in the flag extension field are RESERVED for future use; senders may set F='1' to insert a single octet of padding for alignment purposes.
  C—Checksum field included:
    If the underlying delivery service provides a checksum facility the sender may set C='0' and omit the checksum extension field. Otherwise, the sender should set C='1' and include a 16-bit checksum field beginning in the first octet of the header extension. The checksum is calculated and written into the checksum field. The checksum is calculated across all data bytes in the packet header and body, but does not include a pseudo-header of the underlying delivery service. If other header extension fields are also included (see below), the sender should fill them in before calculating the checksum. Receivers should examine the C bit to determine whether the checksum field is present. If C='1', a receiver must verify the checksum encoded in the 16-bit message checksum field "regardless" of whether the underlying delivery service also performed a checksum. Receivers should discard TBRPF packets that contain an incorrect checksum.
  L—Length field included:
    If the underlying delivery service provides a length field, the sender may set L='0' and omit the length extension field. Otherwise, the sender should set L='1' and include a 16-bit unsigned integer length field immediately after any previous header fields. The length includes all header and data bytes and is written into the length field in network byte order. Receivers should examine the L bit to determine whether the length field is present. If L='1', a receiver should convert the length field to host byte order to determine the length of the TBRPF packet, including the TBRPF packet header. Receivers should discard any TBRPF packet if neither the underlying delivery service nor the TBRPF packet header provide packet length.
  R—Router ID (RID) included:
    If the underlying delivery service encodes the sender's RID, the sender may set R='0' and omit the RID field. Otherwise, the sender should set R='1' and include a 32-bit unsigned integer RID immediately after any previous header fields. The RID option provides a mechanism for implicit Network-level Address Resolution (NARP). A receiver that detects an RID option should create a NARP binding between the RID and the source address that appears in the network-level header.

TBRPF Packet Body

The TBRPF packet body consists of the concatenation of one or more TBRPF message(s) (and padding options where necessary) encoded using a method similar to the type-length-value (TLV) encoding method. Messages and padding options within the TBRPF packet body are encoded using the format shown in FIG. 23

TYPE (4 Bits):
  A 4-bit identifier with value 0-15 that identifies the element.

Value:
  Variable-length field. (Format and length depend on TYPE, as described in the following sections.)

Options:
  Four option bits that depend on TYPE.
  The sequence of elements should be processed strictly in the order they appear within the TBRPF packet body; a receiver must not, for example, scan through the packet body looking for a particular type of element prior to processing all preceding elements. TBRPF packet elements include "padding options" and "messages" as described below.

Padding Options (TYPE=0 thru 1)

Senders may insert two types of padding options where necessary to satisfy alignment requirements for other elements. Padding options may occur anywhere within the TBRPF packet body. The following two padding options are illustrated in FIGS. 24 and 25.

Pad1 option (TYPE=0)
  The Pad1 option inserts one octet of padding into the TBRPF packet body; the VALUE field is omitted. If more than one octet of padding is required, the PadN option (described next) should be used, rather than multiple Pad1 options.

PadN Option (TYPE=1)
  The PadN option inserts two or more octets of padding into the TBRPF packet body. The first octet of the VALUE field contains an 8-bit unsigned integer length containing a value between 0-253 which specifies the number of zero-valued octets that immediately follow, yielding a maximum total of 255 padding octets.

Messages (TYPE=2 thru 15)

Message are described as they occur in the TBRPF protocol specification in the following sections, including the message name, type code and a detailed message format diagram. Senders should encode messages as specified by the individual message formats. Receivers should detect errors in message construction, such as messages with a non-integral number of elements or with fewer elements than indicated. In all cases, upon detecting an error receivers should discontinue processing the current TBRPF packet and discard any unprocessed elements.

TBRPF Neighbor Discovery

This section describes the TBRPF Neighbor Discovery (TND) protocol, which allows each node to quickly detect the neighboring nodes with which the node has a direct, bidirectional (2-WAY) link, and to quickly detect the loss of such a link. TND is run separately on each interface.

TND is designed to be independent of the TBRPF routing module. The interface between these two modules is defined simply by the three functions Link_Up(j, I, metric), Link_Down(j, I), and Link_Change(j, I, metric), which are called by TND to report a new neighbor, the loss of a neighbor, or a change in the link metric on a given inter-face.

HELLO Message Format

The HELLO message has the following three subtypes:
NEIGHBOR REQUEST (TYPE=2)
NEIGHBOR REPLY (TYPE=3)
NEIGHBOR LOST (TYPE=4)

Each HELLO subtype has the format as illustrated in FIG. 30.

The message body contains N 4-octet router IDs.
HSEQ is the 8-bit HELLO sequence number.
PRI is the relay priority. A node with higher relay priority is more likely to be selected as the next hop on a route.
A HELLO message is the concatenation of a NEIGHBOR REQUEST message, a NEIGHBOR REPLY message, and a NEIGHBOR LOST message, where each of the last two messages is omitted if its list of router IDs is empty. Thus, a HELLO message always includes a (possibly empty) NEIGHBOR REQUEST.

Link-Layer Failure Notification

Some link-layer protocols (e.g., IEEE 802.11) provide a notification that the link to a particular neighbor has failed, e.g., after attempting a maximum number of retransmissions. If such an notification is provided by the link layer, then node i should perform the following step upon receipt of a link-layer failure notification for the link to node j:
If nbr_status(j)=2-WAY, set nbr_status(j)=LOST and nbr_count(j)=NBR_HOLD_COUNT (a NEIGHBOR LOST will be sent). Call Link_Down(j);

Optional Link Metrics

Each node may maintain and update one or more link metrics to each neighbor j for each interface I, representing the quality of the link, e.g., signal strength, number of HELLOs received over some time interval, reliability, stability, bandwidth, etc. Each node should declare a neighbor to be LOST if either NBR_HOLD_COUNT HELLOs are missed or if no HELLO is received within NBR_HOLD_TIME seconds. However, a node may also declare a neighbor to be LOST based on a link metric being above or below some threshold. Each node should receive at least HELLO_ACQUIRE_COUNT of the last HELLO_ACQUIRE_WINDOW HELLOs from a neighbor before declaring the neighbor 1-WAY or 2-WAY.

However, a node may require an additional condition based on a link metric being above or below some threshold, before declaring the neighbor 1-WAY or 2-WAY. One example of a metric is the signal strength of the packets received from the neighbor.

If USE_METRICS=1, one of the link metrics computed by TND, denoted nbr_metric(j,I) for neighbor j and interface I, is reported to the routing module via the functions Link_Up(j,I,metric) and Link_Change(j,I,metric). The latter function is called whenever nbr_metric(j,I) changes significantly. As described below, if USE_METRICS=1, this link metric is advertised in topology updates and used for computing shortest paths.

Configurable Parameters

This section lists the parameters used in the description of the neighbor discovery protocol, and their proposed default values.

HELLO_INTERVAL (1 second)
MAX_JITTER (0.1 second)
NBR_HOLD_TIME (3 seconds)
NBR_HOLD_COUNT (3)
HELLO_ACQUIRE_COUNT (2)
HELLO_ACQUIRE_WINDOW (3)

TBRPF Routing Module

This section describes the TBRPF routing module (which performs topology discovery and route computation). The interface of this module with the neighbor discovery module (TND) is defined by the three functions Link_Up( ), Link_Down( ), and Link_Change( ), which are called by TND. Therefore, it is possible to use another neighbor discovery mechanism in place of TND, e.g., one that is provided by the link layer.

Data Structures

In addition to the information required by the neighbor discovery protocol, each node running TBRPF contains a topology table TT, which stores information for each known link and node in the network. The following information is stored at node i for each known link (u,v) and node u:

$T(u,v)$—Equal to 1 if (u,v) is in node i's source tree T, and 0 otherwise. The previous source tree is also maintained as old_T.

$RN(u)$—Equal to 1 if u is in node i's reportable node set RN, and 0 otherwise. The previous reportable node set is also maintained as old_RN.

$RT(u,v)$—Equal to 1 if (u,v) is in node i's reportable subtree RT, and 0 otherwise. Since RT is defined as the set of links (u,v) in T such that u is in RN, this variable need not be maintained explicitly.

$TG(u,v)$—Equal to 1 if (u,v) is in node i's topology graph TG, and 0 otherwise.

N_I—The set of 2-way neighbors for interface I.

N—The set of 2-way neighbors of node i, equal to the union of N_I for all interfaces.

$r(u,v)$—The list of neighbors that are reporting link (u,v) in their reportable subtree RT. The set of links (u,v) reported by neighbor j is denoted RT_j.

$r(u)$—The list of neighbors that are reporting node u in their reportable node set RN.

$p(u)$—The current parent for node u, equal to the next node on the shortest path to u.

nbr_if(j)—The ID of the preferred interface for forwarding packets to neighbor j.

pred(u)—The node preceding node u in node i's source tree T. Equal to NULL if node u is not reachable.

pred(j,u)—The node preceding node u in the subtree RT_j reported by neighbor j.

$d(u)$—The length of the shortest path to node u. If USE_METRICS=0, $d(u)$ is the number of hops to node u.

reported(u,v)—Equal to 1 if link (u,v) in TG is reported by $p(u)$.

tg_expire(u)—Expiration time for links (u,v) in TG.

rt_expire(j,u)—Expiration time for links (u,v) in RT_j.

nr_expire(u,v)—Expiration time for a link (u,v) in TG such that reported(u,v)=0. Such non-reported links can be used temporarily during rerouting and usually have an earlier expiration time than tg_expire(u).

if_metric(j,l)—The metric (or cost) for reaching neighbor j through interface I.

metric(j,u,v)—The metric for link (u,v) reported by neighbor j.

metric(u,v)—The metric for link (u,v) in TG. For a neighbor j, metric(i,j) is the minimum of if_metric(j,I) over all interfaces I such that j is in N_I.

cost(u,v)—The cost for link (u,v), equal to 1+METRIC_COEFF*metric(u,v). Used for computing routes if USE_METRICS=1.

The routing table consists of a list of tuples of the form (rt_dest, rt_next, rt_dist, rt_if_id), where rt_dest is the destination IP address or prefix, rt_next is the interface address of the next hop of the route, rt_dist is the length of the route, and rt_if_id is the ID of the local interface through which the next hop can be reached.

Each node also maintains three tables that describe associated IP addresses or prefixes: the "interface table", which associates interface IP addresses with router IDs, the "host table", which associates host IP addresses with router IDs, and the "network prefix table", which associates network prefixes with router IDs.

The "interface table" consists of tuples of the form (if_addr, if_rid, if_expire), where if_addr is an interface IP address associated with the router with RID=if_rid, and if_expire is the time at which the tuple expires and MUST be removed. The interface table at a node does NOT contain an entry in which if_addr equals the node's own RID; thus, a node does not advertise its own RID as an associated interface.

The "host table" consists of tuples of the form (h_addr, h_rid, h_expire), where h_addr is a host IP address associated with the router with RID=h_rid, and h_expire is the time at which the tuple expires and MUST be removed.

The "network prefix table" consists of tuples of the form (net_prefix, net_length, net_rid, net_expire), where net_prefix and net_length describe a network prefix associated with the router with RID=net_rid, and net_expire is the time at which the tuple expires and MUST be removed. A MANET may be configured as a "stub" network, in which case one or more gateway routers may announce a default pre-fix such that net_prefix=net_length=0. Two copies of each table are kept: an "old" copy that was last reported to neighbors, and the current copy that is updated when association messages are received.

TOPOLOGY UPDATE Message Format

The TOPOLOGY UPDATE message has the format illustrated in FIG. 31. The message body contains the N+1 router IDs for nodes u, v_1, . . . , v_n, which represent the links (u,v_1), . . . , (u,v_n). The first NRL of the v_k are "reported leaf nodes", the next NRNL of the v_k are "non-reported leaf nodes", and the last n−(NRL+NRNL) of the v_k are "non-reported non-leaf nodes". (The meanings of these terms are defined below.)

The M bit indicates whether or not link metrics are included in the message. If M=1, then a 1-octet metric is included for each of the links (u,v_1), . . . , (u,v_n), following the last router ID.

The D bit indicates whether or not implicit deletion is used, and must be set to 1 if and only if IMPLICIT_DELETION=1.

The TOPOLOGY UPDATE message has the following three subtypes:

FULL (TYPE=5)
A FULL update (FULL, n, NRL, NRNL, u, v_1, . . . , v_n) reports that the links (u,v_1), . . . , (u,v_n) belong to the sending router's reportable subtree RT, and that RT contains no other links with tail u.

ADD (TYPE=6)
An ADD update (ADD, n, NRL, NRNL, u, v_1, . . . , v_n) reports that the links (u,v_1), . . . , (u,v_n) have been added to the sending router's reportable subtree RT.

DELETE (TYPE=7)
A DELETE update (DELETE, n, NRL, NRNL, u, v_1, . . . , v_n) reports that the links (u,v_1), . . . , (u,v_n) have been deleted from the sending router's reportable subtree RT.

Interface, Host, and Network Prefix Association Message Formats

The INTERFACE ASSOCIATION (TYPE=8) and HOST ASSOCIATION (TYPE=9) messages have the format as illustrated in FIG. 32. The message body contains the router ID of the originating node, and N IP addresses of interfaces (TYPE=8) or hosts (TYPE=9) that are associated with the router ID. The ST field is defined below.

The NETWORK PREFIX ASSOCIATION message (TYPE=10) has the format as illustrated in FIG. 32. The message body contains the router ID of the originating node, and N network prefixes, each specified by a 1-octet prefix length followed immediately by the prefix, using the minimum number of whole octets required. To minimize overhead, the prefix lengths and prefixes are not aligned along word boundaries The INTERFACE ASSOCIATION, HOST ASSOCIATION, and NETWORK PREFIX ASSOCIATION messages each have the following three subtypes (similar to those for the TOPOLOGY UPDATE message):

FULL (ST=0)
Indicates that this is a FULL update that includes all interface addresses, host addresses, or network prefixes associated with the given router ID.

ADD (ST=1)
Indicates that the included IP addresses or network prefixes are associated with the router ID, but may not include all such IP addresses or network prefixes.

DELETE (ST=2)
Indicates that the included IP addresses or network prefixes are no longer associated with the router ID.

TBRPF Routing Operation

This section describes the operation of the TBRPF routing module. The operation is divided into the following subsections: periodic processing, updating the source tree and topology graph, updating the routing table, updating the reportable node set, generating periodic updates, generating differential updates, processing topology updates, optional reporting of redundant topology information, local topology changes, generating association messages, processing association messages, and non-relay operation. The operation is described in terms of procedures (e.g., Update_All), which may be executed periodically or in response to some event, and may be called by other procedures. In all procedures, node i is the node executing the procedure.

Periodic Processing

Each node executes the procedure Update_All( ) periodically, every MIN_UPDATE_INTERVAL seconds, which is typically equal to HELLO_INTERVAL. This procedure is defined as follows:

Update_All( )
1. For each interface I, create an empty message list msg_list(I).
2. For each interface I, generate a HELLO message for interface I and add it to msg_ist(I).
3. Expire_Links( ).

4. Update_Source_Tree( ).
5. Update_Routing_Table( ).
6. If REPORT_FULL_TREE=0, execute Update_RN( ); otherwise (the full source tree is reported) Update_RN_Simple( ).
7. If current_time>=next_periodic:
   7.1. Generate_Periodic_Update( ).
   7.2. Set next_periodic=current_time+PER_UPDATE_INTERVAL.
8. Otherwise, Generate_Diff_Update( ).
9. Generate_Association_Messages( ).
10. For each interface I, send the msg_list(I) on interface I.
11. Set old_T=T and old_RN=RN.

Updating the Source Tree and Topology Graph

The procedure Update_Source_Tree( ) is a variant of Dijkstra's algorithm, which is called periodically and in response to topology changes, to update the source tree T and the topology graph TG. This algorithm computes shortest paths subject to two link cost penalties. The penalty NON_REPORT_PENALTY is added to the cost of links (u,v) that are not currently reported by the parent p(u) so that, whenever possible, a link (u,v) is included in T only if it is currently reported by the parent. To allow immediate rerouting when p(u) changes, it may be necessary to temporarily use a link (u,v) that is not currently reported by the new parent. The penalty NON_TREE_PENALTY is added to the cost of links (u,v) that are not currently in T, to reduce the number of changes to T. When there exist multiple paths of equal cost to a given node, node ID is used to break ties.

The algorithm is defined as follows (where node i is the node executing the procedure):

Update_Source_Tree( )
1. For each node v in TT, set $d(v)$=INFINITY, $pred(v)$=NULL, $old\_p(v)$=$p(v)$, and $p(v)$=NULL.
2. Set $d(i)$=0, $p(i)$=i, $pred(i)$=i.
3. Set S={i}. (S is the set of labeled nodes.)
4. For each node j in N, set $d(j)$=$c(i,j)$, $pred(j)$=i, and $p(j)$=j. (If USE_METRICS=0, then all link costs $c(i,j)$ are 1.)
5. While there exists an unlabeled node u in TT such that $d(u)$<INFINITY:
   5.1. Let u be an unlabeled node in TT that minimizes $d(u)$. (A heap should be used to find u efficiently.)
   5.2. Add u to S (u becomes labeled).
   5.3. If $p(u)$ is not equal to $old\_p(u)$ (the parent has changed):
      5.3.1. For each link (u,v) in TG with tail u, if reported(u,v)=1, set reported(u,v)=0 and nr_expire(u,v)=current_time+PER_UPDATE_INTERVAL.
      5.3.2. If $p(u)$ is in $r(u)$ ($p(u)$ is reporting u):
         5.3.2.1. Set tg_expire(u)=rt_expire(p(u),u).
         5.3.2.2. If $p(u)$=u (u is a neighbor), remove all links (u,v) with tail u from TG.
         5.3.2.3. For each link (u,v) such that $p(u)$ is in $r(u,v)$:
            5.3.2.3.1. Add (u,v) to TG and set reported(u,v)=1.
            5.3.2.3.2. If USE_METRICS=1, set the link metric and cost based on the metric reported by $p(u)$, i.e., set metric(u,v)=metric(p(u),u,v) and $c(u,v)$=1+METRIC_COEFF*metric(u,v).
   5.4. For each node v such that (u,v) is in TG:
      5.4.1. If reported(u,v)=0, set cost=$c(u,v)$+NON_REPORT_PENALTY. (This penalizes (u,v) if not reported by p(u).)
      5.4.2. Otherwise, if $p(u)$=u AND u is not in $r(v)$, set cost=$c(u,v)$+NON_REPORT_PENALTY. (This penalize (u,v) if u is a neighbor and is not reporting v.)
      5.4.3. If (u,v) is not in old_T, set cost=cost+NON_TREE_PENALTY. (This penalizes (u,v) if it is not in the old source tree.)
      5.4.4. If ($d(u)$+cost, RID(u)) is lexicographically less than ($d(v)$, RID(pred(v))), set $d(v)$=$d(u)$+$c(u,v)$, pred(v)=u, and $p(v)$=$p(u)$.
6. Update the source tree T as follows:
   6.1. Remove all links from T.
   6.2. For each node u other than i such that pred(u) is not NULL, add the link (pred(u), u) to T.

Updating the Routing Table

The routing table is updated following any change to the source tree or the association tables (interface table, host table, or network prefix table). The routing table is updated according to procedure Update_Routing_Table( ), which is defined as follows:

Update_Routing_Table( )
1. Remove all tuples from the routing table.
2. For each node u in TT (other than this node) such that $p(u)$ is not NULL, add the tuple (rt_dest, rt_next, rt_dist, rt_if-id) to the routing table, where:
   rt_dest=RID(u),
   rt_if_id=nbr_if(p(u)),
   rt_next=nbr_if_addr(p(u)) (obtained from the neighbor table for rt_if_id),
   rt_dist=$d(u)$.
3. For each tuple (if_addr, if_rid, if_expire) in the interface table, if there exists a routing table entry (rt_dest, rt_next, rt_dist, rt_if_id) such that rt_dest=if_rid, add the tuple (if_addr, rt_next, rt_dist, rt_if_id) to the routing table.
4. For each tuple (h_addr, h_rid, h_expire) in the host table, if there exists a routing table entry (rt_dest, rt_next, rt_dist, rt_if_id) such that rt_dest=h_rid, add the tuple (h_addr, rt_next, rt_dist, rt_if_id) to the routing table, unless an entry already exists with the same value for h_addr and a lexicographically smaller value for (rt_dist, rt_dest).
5. For each tuple (net_prefix, net_length, net_rid, net_expire) in the network prefix table, if there exists a routing table entry (rt_dest, rt_next, rt_dist, rt_if_id) such that rt_dest=net_rid, add the tuple (net_prefix/net_length, rt_next, rt_dist, rt_if_id) to the routing table, unless an entry already exists with the same value for net_prefix/net_length and a lexicographically smaller value for (rt_dist, rt_dest).

Updating the Reportable Node Set

Recall that the reportable subtree RT is defined to be the set of links (u,v) in T such that u is in the reportable node set RN. Each node updates its RN immediately before generating a periodic or differential topology update. If REPORT_FULL_TREE=1 (so that a node reports its entire source tree), then RN simply consists of all reachable nodes, i.e., all nodes u such that pred(u) is not NULL. The rest of this section describes how RN is computed assuming REPORT_FULL_TREE=0.

A node first determines which of its neighbors belong to RN. Node i includes a neighbor j in RN if and only if node i determines that one of its neighbors may select i to be its next hop on its shortest path to j. To make this determination, node i computes the shortest paths, up to 2 hops, from each neighbor to each other neighbor, using relay priority (included in HELLO messages) and node ID to break ties. If a link metric is used, then shortest paths are computed with respect to the link metric; otherwise min-hop paths are computed.

After a node determines which neighbors are in RN, each node u in the topology table is included in RN if and only if the next hop p(u) to u is in RN. Equivalently, node u is included in RN if and only if u is in the subtree of T rooted at some neighbor j that is in RN. Thus, the reportable subtree RT consists of the subtrees of T that are rooted at neighbors in RN. The precise procedure for updating RN is defined as follows:

Update_RN( )
1. Set RN=empty.
2. For each neighbor s in N such that s is in r(s), i.e., such that s is reporting itself: (Initialize to run Dijkstra for source s, for 2 hops.)
    2.1. For each node j in N+{i}, set d(j)=INFINITY and par(j)=NULL.
    2.2. Set d(s)=0 and par(s)=s.
    2.3. For each node j in N+{j} such that s is in r(s,j):
        2.3.1. Set d(j)=metric(s,j), par(j)=j.
        2.3.2. For each k in N such that j is in r(j,k):
            2.3.2.1. Set cost=metric(j,k).
            2.3.2.2. If (d(j)+cost, nbr_pri(j), RID(j)) is lexicographically less than (d(k), nbr_pri(par(k)), RID(par(k))), set d(k)=d(j)+cost and par(k)=j.
    2.4. For each neighbor j in N, add j to RN if par(j)=i.
3. Add i to RN. (Node i is always in RN.)
4. For each node u in the topology table, add u to RN if p(u) is in RN.

Generating Periodic Updates

Every PER_UPDATE_INTERVAL seconds, each node generates and transmits, on each interface, a set of FULL TOPOLOGY UPDATE messages (one message for each node in RN that is not a leaf of T), which describes the reportable subtree RT. Whenever possible, these messages are included in a single packet, in order to minimize the number of control packets transmitted. These messages are generated according to procedure Generate_Periodic_Update( ), defined as follows (where node i is the node executing the procedure):

Generate_Periodic_Update( )

For each node u in RN (including node i) that is not a leaf of T, add the update (FULL, n, NRL, NRNL, u, v_1, . . . , v_n) to msg_list(I) for each interface I, where:
    (a) v_1, . . . , v_n are the nodes v such that (u,v) is in T, the first NRL of these are nodes in RN that are leaves of T, the next NRNL of these are nodes in RN that are not leaves of T, and the last n-(NRL+NRNL) of these are not in RN.
    (b) If USE_METRICS=1, then the M (metrics) bit is set to 1 and the link metrics metric(u,v_1), . . . , metric(u,v_n) are included in the message.

Generating Differential Updates

Every MIN_UPDATE_INTERVAL seconds, if it is not time to generate a periodic update, and if RT has changed since the last time a topology update was generated, a set of TOPOLOGY UPDATE messages describing the changes to RT is generated and transmitted on all interfaces. These messages are constructed according to procedure Generate_Differential_Update( ), defined as follows:

Generate_Differential_Update( )
    For each node u in RN:
    1. If u is not in old_RN (u was added to RN) and is not a leaf of T, add the update (FULL, n, NRL, NRNL, u, v_1, . . . , v_n) to msg_list(I) for each I, where:
        (a) v_1, . . . , v_n, NRL, and NRNL are defined as above for periodic updates.
        (b) If USE_METRICS=1, then the M (metrics) bit is set to 1 and the link metrics metric(u,v_1), . . . , metric(u,v_n) are included in the message.
    2. Else if u is in old_RN and is not a leaf of T:
        2.1. Let v_1, . . . , v_n be the nodes v such that (u,v) is in T AND [(u,v) is not in old_T] OR [v is in old_RN but not in RN] OR [v is a leaf and is in RN but not in old_RN].
        2.2. If this set of nodes is nonempty, add the update (ADD, n, NRL, NRNL, u, v_1, . . . , v_n) to msg_list(I) for each interface I, where:
            (a) NRL and NRNL are defined as above.
            (b) If USE_METRICS=1, then the M (metrics) bit is set to 1 and the link metrics metric(u,v_1), . . . , metric(u,v_n) are included in the message.
    3. If u is in old_RN:
        3.1. Let v_1, . . . , v_n be the nodes v such that (u,v) is in old_T but not in TG, and either IMPLICIT_DELETION=0 or pred(v) is not in RN (or is NULL). (If IMPLICIT_DELETION=1 and pred(v) is in RN, then the deletion of (u,v) is implied by an ADD update for another link (w,v).)
        3.2. If this set of nodes is nonempty, add the update (DELETE, n, u, v_1, . . . , v_n) to msg_list(I) for each I.

Processing Topology Updates

When a packet containing a list (msg_list) of TOPOLOGY UPDATE messages is received from node j, the list is processed according to the procedure Process_Updates(j, msg_list), defined as follows. In particular, this procedure updates TT, TG, and the reporting neighbor lists r(u) and r(u,v). If any link in T has been deleted from TG, then Update_Source_Tree(j) and Update_Routing_Table( ) are called to provide immediate rerouting.

Process_Updates(j, msg_list)
    1. For each update=(subtype, n, NRL, NRNL, u, v_1, . . . , v_n) in msg_list:
        1.1. Create an entry for u in TT if it does not exist.
        1.2. Create an entry for u in TT_j if it does not exist.
        1.3. If subtype=FULL, Process_Full_Update(j, update).
        1.4. If subtype=ADD, Process_Add_Update(j, update).
        1.5. If subtype=DELETE, Process_Delete_Update(j, update).
    2. If there exists any link in T that is not in TG:
        2.1. Update_Source_Tree( ).
        2.2. Update_Routing_Table( ).

Process_Full_Update(j, update)
    1. Add j to r(u).
    2. Set rt_expire(j,u)=current_time+TOP_HOLD_TIME.
    3. For each link (u,v) s.t. j is in r(u,v):
        3.1. Remove j from r(u,v).
        3.2. If pred(j,v)=u, set pred(j,v)=NULL.

4. If j=p(u) OR p(u)=NULL:
   4.1. Set tg_expire(u)=current_time+TOP_HOLD_TIME.
   4.2. For each v s.t. (u,v) is in TG, If reported(u,v)=1, remove (u,v) from TG.
5. Process_Add_Update(j, update).

Process_Add_Update(j, update)
For m=1, . . . , n:
((u,v m) is the mth link in update.)
1. Let v=v_m.
2. Create an entry for v in TT if it does not exist, and create an entry for v in TT_j if it does not exist.
3. Add j to r(u,v).
4. If j=p(u) OR p(u)=NULL:
   4.1. Add (u,v) to TG.
   4.2. Set reported(u,v)=1.
5. If the M (metrics) bit in update is 1:
   5.1. Set metric(j,u,v) to the m-th metric in the update.
   5.2. If j=p(u) OR p(u)=NULL:
      5.2.1. Set metric(u,v)=metric(j,u,v).
      5.2.2. Set c(u,v)=1+METRIC_COEFF*metric(u,v).
6. If the D (implicit deletion) bit in update is 1:
   6.1. Set w=pred(j,v).
   6.2. If (w!=NULL AND w!=u):
      6.2.1. Remove j from r(w,v).
      6.2.2. If j=p(w), remove (w,v) from TG.
7. Set pred(j,v)=u. (Set new predecessor.)
8. If m<=NRL (v=v_m is a reported leaf):
   8.1. Set leaf_update=(FULL, 0, 0, 0, u).
   8.2. Process_Full_Update(j, leaf_update).
9. If m>NRL+NRNL (v=v_m is not reported by j):
   9.1. Remove j from r(v).
   9.2. Set rt_expire(j,v)=0.
   9.3. For each node w s.t. j is in r(v,w), remove j from r(v,w).
   9.4. If j=p(v), then for each node w s.t. (v,w) is in TG, set reported(v,w)=0 and set nr_expire(u,v)=current_time+PER_UPDATE_INTERVAL.

Process_Delete_Update(j, update)
For m=1, . . . , n:
((u,v_m) is the mth link in update.)
1. Let v=v_m.
2. Remove j from r(u,v).
3. If pred(j,v)=u, set pred(j,v)=NULL.
4. If j=p(u), remove (u,v) from TG.

Optional Reporting of Redundant Topology Information

Each node is required to report its reportable subtree RT to neighbors. However, each node (independently of the other nodes) may report additional links, e.g., to provide increased robustness in highly mobile networks. For example, a node may compute any subgraph H of TG that contains T, and may report the "reportable subgraph" RH which consists of links (u,v) of H such that u is in RN. In this case, each periodic update describes RH instead of RT, and each differential update describes changes to RH. If this option is used, then the parameter IMPLICIT_DELETION should be set to 0, since the deletion of a link cannot be implied by the addition of another link if redundant topology information is reported.

Local Topology Changes

This section describes the procedures that are followed when the neighbor discovery module detects a new neighbor, the loss of a neighbor, or a change in the metric for a neighbor. When a link to neighbor j on interface I is discovered (via the neighbor discovery module), the procedure Link_Up(j, I, metric) is executed, which is defined as follows. Note that the preferred interface nbr_if(j) for a given neighbor j is updated so that it always has the minimum metric among all interfaces through which a link to j exists.

Link_Up(j, I, metric)
1. If j is in N_I, return.
2. Add j to N_I.
3. If j is not in N:
   3.1. Add j to N.
   3.2. Add (i,j) to TG.
   3.3. Set report(i,j)=1.
4. Set if_metric(j,I)=metric.
5. If metric<metric(j,K) for all interfaces K not equal to I, set nbr_if(j)=I and metric(i,j)=metric.
6. If USE_METRICS=1, set cost(i,j)=1+METRIC COEFF*metric(i,j).

When the loss of a link to neighbor j on interface I is detected (via the neighbor discovery module), the procedure Link_Down(j, I) is executed, which is defined as follows. Note that routes are updated immediately when a link is lost, and if the lost link is due to a link-layer failure notification, a differential topology update is sent immediately.

Link_Down(j,I)
1. If j is not in N_I, return.
2. Remove j from N_I.
3. If j does not belong to N_K for any interface K:
   3.1. Remove j from N.
   3.2. Remove (i,j) from TG.
4. If j is in N:
   4.1. Let K be an interface such that j is in N_K and if_metric(j,K) is minimum.
   4.2. Set nbr_if(j)=K and metric(i,j)=if_metric(j,K).
   4.3. If USE_METRICS=1,set cost(i,j)=1+METRIC_COEFF*metric(i,j).
5. Update_Source_Tree( ).
6. Update_Routing_Table( ).
7. If j is not in N and lost link is due to link-layer failure notification:
   7.1. If (REPORT_FULL_TREE=0) Update_RN( ).
   7.2. Else Update_RN_Simple( ).
   7.3. Set msg_list=empty.
   7.4. Generate_Diff_Update( ).
   7.5. Send msg_list on all interfaces.
   7.6. Set old_T=T and old_RN=RN.

If the metric of a link to neighbor j on interface I changes, the procedure Link_Change(j, I, metric) is executed, which is defined as follows:

Link_Change(j,I,metric)
1. If j is not in N_I, return.
2. Set if_metric(j,I)=metric.
3. Let K be an interface such that j is in N_K and if_metric(j,K) is minimum.
4. Set nbr_if(j)=K and metric(i,j)=if_metric(j,K).
5. If USE_METRICS=1, set cost(i,j)=1+METRIC_COEFF*metric(i,j).

Generating Association Messages

This section describes the procedures used to generate INTERFACE ASSOCIATION, HOST ASSOCIATION, and NETWORK PREFIX ASSOCIATION messages. Addresses or prefixes in the interface table, host table, and network prefix table are reported to neighbors periodically every IA_INTERVAL, HA_INTERVAL, and NPA_INTERVAL seconds, respectively. In addition, differential changes to the tables are reported every MIN_UPDATE_INTERVAL seconds if it is not time for a periodic update (similar to differential topology updates). Each node reports only addresses or prefixes that are associated with nodes in the reportable node set RN; this ensures the efficient broadcast of all associated addresses and prefixes to all nodes in the network.

The generated messages are sent on each interface. Whenever possible, these messages are combined into the same packet, in order to minimize the number of control packets transmitted.

Generate_Association_Messages( )
1. Generate_Interface_Association_Messages( ).
2. Generate_Host_Association_Messages( ).
3. Generate_Network_Prefix_Association_Messages( ).

Generate_Interface_Association_Messages( )
1. If current_time>next_ia_time:
   1.1. Set next_ia_time=current_time+IA_INTERVAL.
   1.2. For each node u in RN:
      1.2.1. Let addr_1, ..., addr_n be the interface IP addresses associated with RID u in the current interface table.
      1.2.2. If this list is nonempty, add the INTERFACE ASSOCIATION message (FULL, n, u, addr_1, ..., addr_n) to msg_list(I) for each I.
2. Otherwise, for each node u in RN:
   2.1. Add the INTERFACE ASSOCIATION message (ADD, n, u,addr_1, ..., addr_n) to msg_list(I) for each I, where addr_1, ..., addr_n are the interface IP addresses that are associated with RID u in the current interface table but not in the old interface table.
   2.2. Add the INTERFACE ASSOCIATION message (DELETE, n, u, addr_1, ..., addr_n) to msg_list(I) for each I, where addr_1, ..., addr_n are the interface IP addresses that are associated with RID u in the old interface table but not in the current interface table.

Generate_Host_Association_Messages( )
1. If current_time>next_ha_time:
   1.1. Set next_ha_time=current_time+HA_INTERVAL.
   1.2. For each node u in RN:
      1.2.1. Let addr_1, ..., addr_n be the host IP addresses associated with RID u in the current host table.
      1.2.2. If this list is nonempty, add the HOST ASSOCIATION message (FULL, n, u, addr_1, ..., addr_n) to msg_list(I) for each I.
2. Otherwise, for each node u in RN:
   2.1. Add the HOST ASSOCIATION message (ADD, n, u, addr_1, ..., addr_n) to msg_list(I) for each I, where addr_1, ..., addr_n are the host IP addresses that are associated with RID u in the current host table but not in the old host table.
   2.2. Add the HOST ASSOCIATION message (DELETE, n, u, addr_1, ..., addr_n) to msg_list(I) for each I, where addr_1, ..., addr_n are the host IP addresses that are associated with RID u in the old host table but not in the current host table.

Generate_Network_Prefix_Association_Messages( )
1. If current_time>next_npa_time:
   1.1. Set next_npa_time=current_time+NPA_INTERVAL.
   1.2. For each node u in RN:
      1.2.1. Let length_1, prefix_1, ..., length_n, prefix_n be the network prefix lengths and prefixes associated with RID u in the current network prefix table.
      1.2.2. If this list is nonempty, add the NETWORK PREFIX ASSOCIATION message (FULL, n, u, length_1, prefix_1, ..., length_n, prefix_n) to msg_list(I) for each I.
2. Otherwise, for each node u in RN:
   2.1. Add the NETWORK PREFIX ASSOCIATION message (ADD, n, u, prefix_1, ..., prefix_n) to msg_list(I) for each I, where prefix_1, ..., prefix_n are the network prefixes that are associated with RID u in the current prefix table but not in the old prefix table.
   2.2. Add the NETWORK PREFIX ASSOCIATION message (DELETE, n, u, prefix_1, ..., prefix_n) to msg_list(I) for each I, where prefix_1, ..., prefix_n are the network prefixes that are associated with RID u in the old prefix table but not in the current prefix table.

Processing Association Messages

When an INTERFACE ASSOCIATION, HOST ASSOCIATION, or NETWORK PREFIX ASSOCIATION message is received from node j, the interface table, host table, or network prefix table, respectively, is updated as described in the following three procedures.

Process_Interface_Association_Messages(j, msg_list)
For each message (subtype, n, u, addr_1, ..., addr_n) in msg_list:
1. If subtype=FULL, remove all entries with if_rid=u from the interface table.
2. If subtype=FULL or ADD, then for m=1, ..., n, add the tuple (if_addr, if_rid, if_expire) to the interface table, where:
   if_addr=addr_m,
   if_rid=u,
   if_expire=current_time+IA_HOLD_TIME.
3. If subtype=DELETE, then for m=1, ..., n, remove the tuple (if addr, if_rid, if_expire) from the interface table, where if_addr=addr_m and if_rid=u.

Process_Host_Association_Messages(j, msg_list)
For each message (subtype, n, u, addr_1, ..., addr_n) in msg_list:
1. If subtype=FULL, remove all entries with h_rid=u from the host table.
2. If subtype=FULL or ADD, then for m=1, ..., n, add the tuple (h_addr, h_rid, h_expire) to the host table, where:
   h_addr=addr_m,
   h_rid=u,
   h_expire=current_time+HA_HOLD_TIME.
3. If subtype=DELETE, then for m=1, ..., n, remove the tuple (h_addr, h_rid, h_expire) from the host table, where h_addr=addr_m and h_rid=u.

Process_Network_Prefix_Association_Messages(j, msg_list)
  For each message (subtype, n, u, length_1, prefix_1, ..., length_n, prefix_n) in msg list:
  1. If subtype=FULL, remove all entries with net_rid=u from the prefix table.
  2. If subtype=FULL or ADD, then for m=1, ..., n, add the tuple (net_prefix, net_length, net_rid, net_expire) to the network prefix table, where:
     net_prefix=prefix_m,
     net_length=length_m,
     net_rid=u,
     net expire=current_time+NPA_HOLD_TIME.
  3. If subtype=DELETE, then for m=1, ..., n, remove the tuple (net_prefix, net_length, net_rid, net_expire) from the network prefix table, where net_prefix=prefix_m, net_length=length_m, and net_rid=u.

Non-Relay Operation

Non-relay nodes are MANET nodes that do not forward packets (of any type) that are received from other MANET nodes. A non-relay node is implemented simply by not generating or transmitting any TOPOLOGY UPDATE messages. A non-relay node may report, in association messages, addresses or prefixes that are associated with itself, but not those associated with other nodes. HELLO messages must be transmitted in order to establish links with neighbor nodes. The following procedures can be omitted in non-relay nodes: Update_RN( ), Generate_Periodic_Update( ), and Generate_Diff_Update( ).

Configurable Parameters

This section lists the configurable parameters used in the description of the protocol, and their proposed default values.
  MIN_UPDATE_INTERVAL (1 second)
  PER_UPDATE_INTERVAL (5 seconds)
  TOP_HOLD_TIME (15 seconds)
  NON_REPORT_PENALTY (1.01)
  NON_TREE_PENALTY (0.01)
  IA_INTERVAL (10 seconds)
  IA_HOLD_TIME (3×IA_INTERVAL)
  HA_INTERVAL (10 seconds)
  HA_HOLD_TIME (3×HA_INTERVAL)
  NPA_INTERVAL (10 seconds)
  NPA_HOLD-TIME (3×NPA_INTERVAL)
  USE_METRICS (0)
  METRIC_COEFF (TBD)
  REPORT_FULL_TREE (0)
  IMPLICIT_DELETION (1)

TBRPF Flooding Mechanism

This section describes a mechanism for the efficient best-effort flooding (or network-wide broadcast) of packets to all nodes of a connected ad-hoc network. These may include TBRPF packets, non-TBRPF packets, and data packets. This mechanism can be considered a special case of the flooding mechanism, in which information provided by TBRPF is used to decide whether a given received flooded packet should be forwarded, i.e., to perform selective retransmission. By performing selective retransmission, each packet is transmitted by only a relatively small subset of nodes, thus consuming much less bandwidth than full flooding.

For the purpose of this description, the flooding address is ALL_MANET_NODES. Every node maintains a duplicate cache to keep track of which flooded packets have already been received. When a node receives a packet whose destination IP address is ALL_MANET_NODES, it checks its duplicate cache for an entry that matches the packet. If such an entry exists, the node silently discards the flooded packet since it has already been received. Otherwise, the node retransmits the packet on all interfaces (see the exception below) if and only if the following conditions hold:
  1. The TBRPF node associated with the source IP address of the packet belongs to the set RN of reportable nodes computed by TBRPF.
  2. When decremented, the 'ip_ttl' in the IPv4 packet header (respectively, the 'hop_count' in the IPv6 packet header) is greater than zero. If the packet is to be retransmitted, it is sent after a small random time interval in order to avoid collisions. If the interface on which the packet was received is not a MANET interface, then the packet need not be retransmitted on that interface.

Application of TBRPF In Mobile Ad-Hoc Networks

The TBRPF routing protocols provide efficient proactive topology discovery with dynamic adaptation to link state changes in both fixed and mobile environments whether the topology is relatively static or highly dynamic in nature. TBRPF is particularly well suited to MANETs consisting of mobile nodes with wireless network interfaces operating in peer-to-peer fashion over a multiple access communications channel (e.g. the IEEE 802.11 Distributed Coordination Function (DCF) [13].) Although applicable across a much broader field of use, TBRPF is particularly well suited for supporting the standard DARPA Internet protocols as per current practices advocated by the IETF MANET working group.

While the invention has been shown and described with reference to specific preferred embodiments, it should be understood by those skilled in the art that various changes in form and detail may be made therein without departing from the spirit and scope of the invention as defined by the following claims. For example, although the described embodiments illustrate the principles of the invention with respect to wireless networks, such also apply to wire-line networks.

-121-
APPENDIX A

Network-Level Procedures

The notation LSU(update_list) represents a link-state-update message that includes the updates (u, v, c, sn) in the update_list.

```
Process_Update(i, nbr, in_message){
    // Called when an update message in_message is received from nbr.
    Update_Topology_Table(i, nbr, in_message, update_list).
    Update_Parents(i).
    For each node src in TT_i {
        Let update_list(src) consist of all tuples (k, l, c, sn) in update_list
        such that k = src.
        If update_list(src) is nonempty
            Send message LSU(update_list(src)) to children_i(src).}}

Update_Topology_Table(i, nbr, in_message, update_list){
    Set update_list to empty list.
    For each ((u,v,c,sn) in in_message) {
        If (p_i(u) == nbr) {
            If ((u,v) is in TT_i and sn > TT_i(u,v).sn) {
                Add (u,v,c,sn) to update_list.
                Set TT_i(u,v).sn = sn.
                Set TT_i(u,v).c = c.
                If (sn > sn_i(u)) Set sn_i(u) = sn.}
            If ((u,v) is not in TT_i) {
                Add (u,v,c,sn) to TT_i.
                Add (u,v,c,sn) to update_list.
                If (sn > sn_i(u)) Set sn_i(u) = sn.}}}

Link_Change(i,j){
    // Called when the cost of link (i,j) changes.
    If (|TT_i(i,j).c - cost(i,j)|/TT_i(i,j).c > epsilon) {
        Set TT_i(i,j).c = cost(i,j).
```

Set TT_i(i,j).sn = current time stamp SN_i.

Set update_list = {(i, j, TT_i(i, j).c, TT_i(i, j).sn)

Send message LSU(update_list) to children_i(i).}}

Link_Down(i,j){

// Called when link (i,j) goes down.

Remove j from N_i.

Set TT_i(i,j).c = infinity.

Set TT_i(i,j).sn = current time stamp SN_i.

Update_Parents(i).

For each (node src in TT_i) remove j from children_i(src).

Set update_list = {(i,j, infinity, TT_i(i,j).sn)}.

Send message LSU(update_list) to children_i(i).}

Link_Up(i,j){

// Called when link (i,j) comes up.

Add j to N_i.

Set TT_i(i,j).c = cost(i,j).

Set TT_i(i,j).sn = current time stamp SN_i.

Update_Parents(i).

Set update_list = {(i, j, TT_i(i,j).c, TT_i(i,j).sn)}.

Send message LSU(update_list) to children_i(i).}

Update_Parents(i){

Compute_New_Parents(i)

For each (node k in N_i){

Set cancel_src_list(k), src_list(k), and sn_list(k) to empty.}

For each (node src in TT_i such that src != i){

If (new_p_i(src) != p_i(src)){

If (p_i(src) != NULL){

Set k = p_i(src).

Add src to cancel_src_list(k).}

Set p_i(src) = new_p_i(src).

If (new_p_i(src) != NULL){

Set k = new_p_i(src).

Add src to src_list(k).

Add sn_i(src) to sn_list(k).}}}

For each (node k in N_i){

If (src_list(k) is nonempty){

Send message NEW PARENT(src_list(k), sn_list(k)) to k.}

If (cancel_src_list(k) is nonempty{

Send message CANCEL PARENT(cancel_src_list(k)) to k.}}}

Compute_New_Parents(i){

For each (node src in TT_i such that src != i){

Set new_p_i(src) = NULL.}

Compute min-hop paths using Dijkstra.

For each (node src in TT_i such that src != i){

Set new_p_i(src) equal to the neighbor of node i along the minimum-hop path from i to src.}}

Process_New_Parent(i, nbr, src_list, sn_list){

// Called when node i receives a NEW PARENT(src_list, sn_list) message from nbr.

Set update_list to empty list.

For each (node src in src_list) {

Let sn_list.src denote the sequence number corresponding to src in sn_list.

Add nbr to children_i(src).

Set new_updates = {(k, l, c, sn) in TT_i such that k = src and sn > sn_list.src}.

Add new_updates to update_list.}

Send message LSU(update_list) to nbr.}

Process_Cancel_Parent(i,nbr,src_list ){

// Called when node i receives a CANCEL PARENT(src_list) message from nbr.

For each (node src in src_list) remove nbr from children_i(src).}

Send_Periodic_Updates(i){

Set update_list to empty.

For each (j in N_i such that TT_i(i,j). c != infinity){

Set TT_i(i,j).sn = current time stamp SN_i.

Add (i, j, TT_i(i,j).c, TT_i(i,j).sn) to update_list. }

Send message LSU(update_list) to children_i(i).}

Compute_New_Parents2(i){

$S \leftarrow \emptyset$;

For each (v ∈ TT_i) {

Set d(v) = infinity;

Set pred(v) = NULL;

Set new_p_i(v) = NULL; }

$d(i) \leftarrow 0$;

While (there exists w ∈ TT_i − S such that d(w) < infinity){

Set u = node w ∈ TT_i − S that minimizes d(w);

Set S = S ∪ {u};

For each (v such that (u, v) ∈ TT_i) {

If (d(u) + 1 < d(v) or [d(u) + 1 = d(v) and new_p_i(u) = p_i(v)])

{

Set d(v) = d(u) + 1;

Set pred(v) = u;

If (u = i) Set new_p_i(v) = v;

Else Set new_p_i(v) = new_p_i(u); }}}

Partial-Topology 1

The function Mark_Special_Links() is called whenever the parent p_i(src) or the set of children children_i(src) for any source src changes. The notation LSU(update_list) represents a link-state-update message that includes the updates (u, v, c, sn, sp) in the update_list, where sp is a single bit that indicates whether the link is "special", i.e., whether it should be broadcast to all nodes.

```
Mark_Special_Links(i){
    For all (outgoing links (i,j)) {Set TT_i(i,j).sp = 0;}
    For all (nodes src != i){
        if (p_i(src) != NULL and p_i(src) != src){
            Set TT_i(i, p_i(src)).sp = 1;}  //Link is special.
            For all (nodes j in children_i(src)){
                Set TT_i(i,j).sp = 1;}  //Link is special.
        }
    }
}

Update_Topology_Table(i, nbr, in_message, update_list){
    Set update_list to empty list.
    For each ((u,v,c,sn,sp) in in_message) {
        If (p_i(u) = nbr) {
            If ((u,v) is in TT_i and sn > TT_i(u,v).sn) {
                Set TT_i(u,v).sn = sn.
                Set TT_i(u,v).c = c.
                Set TT_i(u,v).sp = sp.
                (Only links marked as special are forwarded.)
                If (sp = 1) Add (u,v,c,sn,sp) to update_list.
                If (sn > sn_i(u)) Set sn_i(u) = sn.}
            If ((u,v) is not in TT_i) {
                Add (u,v,c,sn,sp) to TT_i.
                If (sp = 1) Add (u,v,c,sn,sp) to update_list.
                If (sn > sn_i(u)) Set sn_i(u) = sn.}}}
```

```
Process_Update(i, nbr, in_message){
    // Called when an update message in_message is received from nbr.
    Update_Topology_Table(i, nbr, in_message, update_list).
    Update_Parents(i).
    Mark_Special_Links(i).
    For each node src in TT_i {
        Let update_list(src) consist of all tuples (k, l, c, sn, sp) in update_list
        such that k = src.
        If update_list(src) is nonempty
            Send message LSU(update_list(src)) to children_i(src).}}

Link_Change(i,j){
    // Called when the cost of link (i,j) changes.
    If (|TT_i(i,j).c - cost(i,j)|/TT_i(i,j).c > epsilon) {
        Set TT_i(i,j).c = cost(i,j).
        Set TT_i(i,j).sn = current time stamp SN_i.
        Set update_list = {(i, j, TT_i(i, j).c, TT_i(i, j).sn, TT_i(i,j).sp)}.
        Send message LSU(update_list) to children_i(i).}}

Link_Down(i,j){
    // Called when link (i,j) goes down.
    Remove j from N_i.
    Set TT_i(i,j).c = infinity.
    Set TT_i(i,j).sn = current time stamp SN_i.
    Update_Parents(i).
    For each (node src in TT_i) remove j from children_i(src).
    Mark_Special_Links(i).
    Set update_list = {(i,j, infinity, TT_i(i,j).sn, TT_i(i,j).sp)}.
    Send message LSU(update_list) to children_i(i).}

Link_Up(i,j){
```

// Called when link (i,j) comes up.

Add j to N_i.

Set TT_i(i,j).c = cost(i,j).

Set TT_i(i,j).sn = current time stamp SN_i.

Update_Parents(i).

Mark_Special_Links(i).

Set update_list = {(i, j, TT_i(i,j).c, TT_i(i,j).sn, TT_i(i,j).sp)}.

Send message LSU(update_list) to children_i(i).}

Update_Parents(i){

Compute_New_Parents(i).

For each (node k in N_i)

Set cancel_src_list(k), src_list(k), and sn_list(k) to empty.

For each (node src in TT_i such that src != i){

If (new_p_i(src) != p_i(src)){

If (p_i(src) != NULL){

Set k = p_i(src).

Add src to cancel_src_list(k).}

Set p_i(src) = new_p_i(src).

If (new_p_i(src) != NULL){

Set k = new_p_i(src).

Add src to src_list(k).

Add sn_i(src) to sn_list(k).}}}

For each (node k in N_i){

If (src_list(k) is nonempty){

Send message NEW PARENT(src_list(k), sn_list(k)) to k.}

If (cancel_src_list(k) is nonempty{

Send message CANCEL PARENT(cancel_src_list(k)) to k.}}}

Compute_New_Parents(i){

For each (node src in TT_i such that src != i){

Set new_p_i(src) = NULL.}

Compute min-hop paths using Dijkstra.

For each (node src in TT_i such that src != i){

Set new_p_i(src) equal to the neighbor of node i along the minimum-hop path from i to src.}}

Process_New_Parent(i, nbr, src_list, sn_list){

//Called when node i receives a NEW PARENT(src_list, sn_list) message from nbr.

Set update_list to empty list.

For each (node src in src_list) {

Let sn_list.src denote the sequence number corresponding to src in sn_list.

Add nbr to children_i(src).

If (src != i) Set TT_i(i, nbr).sp = 1. //Link to nbr is special.

If (src = i) Set new_updates = {(src, v, c, sn, sp) in TT_i such that sn > sn_list.src}.

If (src != i) Set new_updates = {(src, v, c, sn, sp) in TT_i such that sn > sn_list.src and sp = 1}. //Only special links are sent.

Add new_updates to update_list.}

Send message LSU(update_list) to nbr.}

Process_Cancel_Parent(i,nbr,src_list ){

// Called when node i receives a CANCEL PARENT(src_list) message from nbr.

For each (node src in src_list) remove nbr from children_i(src).

Mark_Special_Links(i). }

Send_Periodic_Updates(i){

Set update_list to empty.

For each (j in N_i such that TT_i(i,j).c != infinity){

Set TT_i(i,j).sn = current time stamp SN_i.

Add (i, j, TT_i(i,j).c, TT_i(i,j).sn, TT_i(i,j).sp) to update_list. }

Send message LSU(update_list) to children_i(i).}

Partial-Topology 2

```
Update(i, k, in_message){
    Update_Topology Table(i, k, in_message);
    Lex_Dijkstra;  // Uses lexicographic Dijkstra to compute Ti
    Generate_Updates(i, update_list);
    if (k does not equal i and update_list is non-empty){
        Send_Updates_Children(i, update_list);
    Update_Parents(i);
}

Send_Updates_Children(i, update_list){
    For each (node k ∈ Ni) {out_message(k) ← 0;}
    For each (node src ∈ TT_i s.t. src does not equal i){
        update_list(src) ← {(k, l, c) ∈ update_list s.t. k = src};
        for each (node k ∈ children_i(src)){
            Add update_list(src) to out_message(k);}
    }
    For each (node k ∈ Ni s.t. out_message(k) is non-empty){
        Send the message out_message(k) to node k;}
}

Update_Topology_Table(i, k, in_message){
    For each ((u, v, c) ∈ in_message{
        // Process only updates received from the parent p_i(u)
        if (p_i(u) = k or k = i){
            if ((u, v) ∉ TT_i or c! = TT_i(u, v).c{
                TT_i(u, v) ← (u, v, c);
                Mark (u, v) as changed in TT_i;}
        }
```

```
}
if (in_message is a PARENT_RESPONSE){
    For each (u such that in_message includes source u){
        if (p_i(u) = k and pending_i(u) = 1){
            pending_i(u) = 0;
            For each (v such that TT_i contains an entry for (u, v)){
                if (in_message does not contain update for link (u, v)){
                    TT_i(u, v).c ← -∞;
                    // indicates link should be deleted
                    Mark (u, v) as changed in TT_i;
                }
            }
        }
    }
}

Process_Cancel_Parent(i, nbr, src_list){
    For each (src ∈ src_list)
        children_i(src) ← children_i(src) - {nbr};
}

Generate_Updates(i, update_list){
    update_list ← 0;
    for each (entry (u, v, c, c') ∈ TT_i){
        if ((u, v) is in new Ti and ((u, v) is marked as changed or is not in old Ti)){
            Add (u, v, c) to update_list;
            Ti(u, v).c' ← Ti(u, v).c;
```

```
                Ri ← Ri ∪{(u, v)};
        }
        else if ((u, v) is in Ri but not in new Ti and c > c'){
                Add (u, v, ∞) to update_list;  // delete update
                Ti(u, v).c' ← ∞;
                Remove (u, v) from Ri;
        }
        if (TT_i(u, v).c = ∞)
                Remove (u, v) from TT_i;
    }
}

Update_Parents(i){
    For each (node k ∈ Ni){
        cancel_src_list(k) ← 0;
        src_list(k) ← 0;}
    For each (node src ∈ TT_i such that src ≠ i) {
        new_p_i(src) ← next node on shortest path to src;
        if (new_p_i(src) ≠ p_i(src)){
            if (new_p_i(src) ≠ NULL) {
                k ← p_i(src);
                cancel_src_list(k) ← cancel_src_list(k) ∪ {src};
            }
            if (new_p_i(src) ≠ NULL){
                k ← new_p_i(src);
                src_list(k) ← src_list(k) ∪ {src};
            }
            p_i(src) ← new_p_i(src);
        }
    }
}
```

```
        For each (node k ∈ Ni){
    if (src_list(k) ≠ 0)
            Send NEW_PARENT(src_list(k)) to node k;
    if(cancel_src_list(k) ≠ 0)
            Send CANCEL_PARENT(cancel_src_list(k)) to node k;
    }
}

Process_New_Parent(i, nbr, src_list){
    update_list ← 0;
    for each (node u ∈ u_list) {
        children_i(u) ← children_i(u) ∪ {nbr};
        updates(u) ← {(u, v, c) ∈ TT_i such that (u, v) ∈ Ti};
        update_list ← update_list ∪ updates (u);
    }
    Send PARENT RESPONSE(src_list, update_list) to nbr;}
```

What is claimed is:

1. Method for communicating between a plurality of nodes, said method comprising the steps of:
   a) allowing a predefined time interval to elapse; and
   b) sending a differential message by a sending node to at least one neighboring node of said sending node, wherein said differential message comprises only changes in link state status of neighboring nodes of said sending node with respect to link state statuses reported in a last differential message sent by the sending node.

2. The method of claim 1, further comprising the step of:
   c) sending said differential message for a certain number of times for ensuring that said at least one neighboring node will either receive said differential messages or will deem a link to said sending node is lost for failing to receive said differential messages.

3. The method of claim 1, wherein said differential message comprises a plurality of message subtypes.

4. The method of claim 3, wherein said plurality of message subtypes comprise a neighbor request subtype that indicates said sending node's presence to a receiving neighbor node.

5. The method of claim 4, wherein said plurality of message subtypes further comprise a neighbor reply subtype that indicates a receipt of a neighbor node's neighbor request message.

6. The method of claim 5, wherein said plurality of message subtypes further comprise a neighbor lost subtype that indicates a loss of a neighbor node by said sending node.

7. The method of claim 1, wherein said predefined time interval defines a duration between successive differential messages that are sent to one or more neighbor nodes and wherein said predefined time interval is dynamically adjusted.

8. The method of claim 7, wherein said predefined time interval is dynamically adjusted in accordance with a current velocity of said sending node.

9. The method of claim 7, wherein said predefined time interval is dynamically adjusted in accordance with a bandwidth demand of said sending node.

10. he method of claim 7, wherein said predefined time interval is dynamically adjusted in accordance with a measure of network traffic of a network where said plurality of nodes are members of said network.

11. The method of claim 1, wherein an adjustment of said predefined time interval is communicated within said differential message.

12. Method for communicating between a plurality of nodes, said method comprising the steps of:
   a) receiving a differential message from a sending neighbor node, wherein said differential message comprises only changes in link state status of neighboring nodes of said sending neighbor node with resoect to link state statuses respect in a last differential message sent by the sending neighbor node; and
   b) sending a reply message to said sending neighbor node.

13. The method of claim 12, wherein said differential message comprises a plurality of message subtypes.

14. The method of claim 13, wherein said plurality of message subtypes comprise a neighbor request subtype that indicates saId sending node's presence to a receiving neighbor node.

15. The method of claim 14, wherein said plurality of message subtypes further comprise a neighbor reply subtype that indicates a receipt of a neighbor node's neighbor request message.

16. The method of claim 15, wherein said plurality of message subtypes further comprise a neighbor lost subtype that indicates a loss of a neighbor node of said sending neighbor node.

17. The method of claim 12, further comprising the step of:
   c) waiting for a predefined time interval for a subsequent message from said sending neighbor node.

18. The method of claim 17, wherein said predefined time interval is dynamically adjusted.

19. The method of claim 18, wherein said predefined time interval is dynamically adjusted in accordance with a current velocity of said sending neighbor node.

20. The method of claim 18, wherein said predefined time interval is dynamically adjusted in accordance with a bandwidth demand of said sending neighbor node.

21. The method of claim 18, wherein said predefined time interval is dynamically adjusted in accordance with a measure of network traffic of a network where said plurality of nodes are members of said network.

22. The method of claim 18, wherein an adjustment of said predefined time interval is communicated within said differential message.

23. Apparatus for communicating with a plurality of nodes, said apparatus comprising:
   means for allowing a predefined time interval to elapse; and
   means for sending a differential message to at least one neighboring node of said apparatus, wherein said differential message comprises only changes in link state status of neighboring nodes of said apparatus with resriect to link state statuses reported in a last differential message sent by the apparatus.

24. The apparatus of claim 23, wherein said differential message is sent for a certain number of times for ensuring that said at least one neighboring node will either receive said differential messages or will deem a link to said apparatus is lost for failing to receive said differential messages.

25. The apparatus of claim 23, wherein said differential message comprises a plurality of message subtypes.

26. The apparatus of claim 25, wherein said plurality of message subtypes comprise a neighbor request subtype that indicates said apparatus presence to a receiving neighbor node.

27. The apparatus of claim 26, wherein said plurality of message subtypes further comprise a neighbor reply subtype that indicates a receipt of a neighbor node's neighbor request message.

28. The apparatus of claim 27, wherein said plurality of message subtypes further comprise a neighbor lost subtype that indicates a loss of a neighbor node by said apparatus.

29. The apparatus of claim 23, wherein said predefined time interval defines a duration between successive differential messages that are sent to one or more neighbor nodes and wherein said predefined time interval is dynamically adjusted.

30. The apparatus of claim 29, wherein said predefined time interval is dynamically adjusted in accordance with a current velocity of said apparatus.

31. The apparatus of claim 29, wherein said predefined time interval is dynamically adjusted in accordance with a bandwidth demand of said apparatus.

32. The apparatus of claim 29, wherein said predefined time interval is dynamically adjusted in accordance with a measure of network traffic of a network where said apparatus is a member of said network.

33. The apparatus of claim 23, wherein an adjustment of said predefined time interval is communicated within said differential message.

34. The apparatus of claim 23, wherein said apparatus is a router.

35. Apparatus for communicating with a plurality of nodes, said apparatus comprising:
   means for receiving a differential message from a sending neighbor node, wherein said differential message comprises only changes in link state status of neighboring nodes of said sending neighbor node with resDect to link state statuses reported in a last differential message also sent by the sending neighbor node; and
   means for sending a reply message to said sending neighbor node.

36. The apparatus of claim 35, wherein said differential message comprises a plurality of message subtypes.

37. The apparatus of claim 36, wherein said plurality of message subtypes comprise a neighbor request subtype that indicates said sending node's presence to a receiving neighbor node, a neighbor reply subtype that indicates a receipt of a neighbor node's neighbor request message and a neighbor lost subtype that indicates a loss of a neighbor node of said sending neighbor node.

38. The apparatus of claim 35, further comprising:
   means for waiting for a predefined time interval for a subsequent message from said sending neighbor node.

39. The apparatus of claim 38, wherein said predefined time interval is dynamically adjusted.

40. The apparatus of claim 39, wherein said predefined time interval is dynamically adjusted in accordance with a current velocity of said sending neighbor node, a bandwidth demand of said sending neighbor node or a measure of network traffic of a network where said apparatus is a member of said network.

41. The apparatus of claim 39, wherein an adjustment of said predefined time interval is communicated within said differential message.

42. A computer-readable medium having stored thereon a plurality of instructions, the plurality of instructions including instructions which, when executed by a computer, cause the computer to perform the steps comprising of:
   a) allowing a predefined time interval to elapse; and
   b) sending a differential message by a sending node to at least one neighboring node of said sending node, wherein said differential message comprises only changes in link state status of neighboring nodes of said sending node with respect to link state statuses reported in a last differential message sent by the sending node.

43. A computer-readable medium having stored thereon a plurality of instructions, the plurality of instructions including instructions which, when executed by a computer, cause the computer to perform the steps comprising of:
   a) receiving a differential message from a sending neighbor node, wherein said differential message comprises only changes in link state status of neighboring nodes of said sending neighbor node with respect to link state statuses reported in a last differential message sent by the sending neighbor node; and
   b) sending a reply message to said sending neighbor node.

44. Method for a sending node in a communication network to report topology information to one or more neighbor nodes, said method comprising the steps of:
   a) computing a source tree providing paths to all reachable nodes in the communication network using a minimum-hop path tree;
   b) computing a reportable node set comprising only a part of the source tree that the sending node reports to the one or more neighbor nodes to minimize overhead;
   c) computing a reportable subtree of said source comprising one or more links in accordance with said reportable node set; and
   d) reporting said reportable subtree to said one or more neighbor nodes, wherein said reportable subtree is reported to said one or more neighbor nodes in a differential update, wherein said differential update is generated in accordance with only a change in a node's topology table.

45. The method of claim 44, wherein said change in a node's topology table is caused by receiving a topology update from a neighbor node.

46. The method of claim 44, wherein said change in a node's topology table is caused by detecting a status change for a link to one of its neighbor nodes.

47. Apparatus for a sending node in a communication network to report topology information to one or more neighbor nodes, said apparatus comprising:
   means for computing a source tree providing paths to all reachable nodes in the communication network using a minimum-hop path tree;
   means for computing a reportable node set comprising only a part of the source tree that the sending node reports to the one or more neighbor nodes to minimize overhead;
   means for computing a reportable subtree of said source comprising one or more links in accordance with said reportable node set; and
   means for reporting said reportable subtree to said one or more neighbor nodes, wherein said reportable subtree is reported to said one or more neighbor nodes in a differential update, wherein said differential update is generated in accordance with only a change in a node's topology table.

* * * * *

UNITED STATES PATENT AND TRADEMARK OFFICE
CERTIFICATE OF CORRECTION

PATENT NO. : 7,327,683 B2
APPLICATION NO. : 10/307267
DATED : February 5, 2008
INVENTOR(S) : Richard G. Ogier, Fred L. Templin and Mark G. Lewis It is certified that error appears in the above-identified patent and that said Letters Patent is hereby corrected as shown below:

Title Page; item (56);

Page 2, Column 1, (Other Publications), Line 6, delete "1pv6" and insert -- Ipv6 --, therefor.

Page 2, Column 1, (Other Publications), Line 11, delete "o4" and insert -- 04 --, therefor.

Page 2, Column 2, (Other Publications), Line 21, delete "Depolyment" and insert -- Deployment --, therefor.

Page 2, Column 2, (Other Publications), Line 31, delete "Identifer" and insert -- Identifier --, therefor.

Sheet 19 of 28 (Reference Numeral 374) (Fig. 17), delete "RE-EXTABLISH" and insert -- RE-ESTABLISH --, therefor.

Column 14, line 8, after "If (new_p_i(src)" insert -- != --, therefor.

Column 16, line 35, delete "procedure-for" and insert -- procedure for --, therefor.

Column 31, line 20, after "follows" delete "." and insert -- : --, therefor.

Column 35, line 36, after "address of" insert -- : --.

Column 36, line 44, delete "IPv6 -IPv4" and insert -- IPv6-IPv4 --, therefor.

Column 38, line 3, delete "IPv6 - IPv4" and insert -- IPv6-IPv4 --, therefor,

Column 38, line 27, delete "IPv4 ." and insert -- IPv4. --, therefor.

Column 38, line 37, after "source" insert -- . --.

Column 38, line 50, delete "IPv6Deployment" and insert -- IPv6 Deployment --, therefor.

Column 38, line 51, delete "IPv6node" and insert -- IPv6 node --, therefor.

Column 38, line 52, delete "IPv4 ," and insert -- IPv4, --, therefor.

Column 46, line 52, delete "ti" and insert -- t1 --, therefor.

Column 56, line 5, after "procedures" insert -- . --.

Column 56, line 67, after "21" insert -- . --.

Column 57, line 10, after "22" insert -- . --.

Signed and Sealed this
Twenty-seventh Day of September, 2011

David J. Kappos
*Director of the United States Patent and Trademark Office*

Column 58, line 11, after "23" insert -- . --.

Column 59, line 35, after "(j)" delete ";" and insert -- . --, therefor.

Column 62, line 26, after "boundaries" insert -- . --.

Column 62, line 66, delete "msg_ist" and insert -- msg_list --, therefor.

Column 64, line 26, delete "if-id" and insert -- if_id --, therefor.

Column 65, line 67, after "procedure" insert -- . --.

Column 66, line 44, delete "(j)" and insert -- ( ) --, therefor.

Column 70, line 50, delete "if addr" and insert -- if_addr --, therefor.

Column 71, line 4, delete "msg list" and insert -- msg_list --, therefor.

Column 97, line 41, in Claim 10, delete "he" and insert -- The --, therefor.

Column 97, line 54, in Claim 12, delete "resoect" and insert -- respect --, therefor.

Column 97, line 55, in Claim 12, delete "respect" and insert -- reported --, therefor.

Column 97, line 62, in Claim 14, delete "saId" and insert -- said --, therefor.

Column 98, line 32, in Claim 23, delete "resriect" and insert -- respect --, therefor.

Column 99, line 11, in Claim 35, delete "resDect" and insert -- respect --, therefor.

Column 99, line 12, in Claim 35, before "sent" delete "also".